US008481166B2

(12) United States Patent
Takahashi et al.

(10) Patent No.: US 8,481,166 B2
(45) Date of Patent: *Jul. 9, 2013

(54) HYDROGENATED NORBORNENE-BASED RING-OPENING POLYMERIZATION POLYMER, RESIN COMPOSITION, AND MOLDED OBJECT

(75) Inventors: Haruhiko Takahashi, Tokyo (JP); Teiji Kohara, Tokyo (JP); Nobuhiro Kudo, Tokyo (JP); Koichi Ikeda, Tokyo (JP); Tokudai Ogawa, Tokyo (JP); Takeshi Hirata, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,522

(22) Filed: Dec. 23, 2011

(65) Prior Publication Data

US 2012/0208950 A1 Aug. 16, 2012

Related U.S. Application Data

(62) Division of application No. 12/439,360, filed as application No. PCT/JP2007/067043 on Aug. 31, 2007.

(30) Foreign Application Priority Data

| Aug. 31, 2006 | (JP) | 2006-236627 |
|---|---|---|
| Aug. 31, 2006 | (JP) | 2006-237000 |
| Sep. 29, 2006 | (JP) | 2006-266680 |
| Sep. 29, 2006 | (JP) | 2006-266683 |
| Sep. 29, 2006 | (JP) | 2006-266889 |
| Sep. 29, 2006 | (JP) | 2006-269332 |
| Dec. 20, 2006 | (JP) | 2006-342808 |
| Dec. 20, 2006 | (JP) | 2006-342872 |
| Dec. 28, 2006 | (JP) | 2006-355191 |

(51) Int. Cl.
*B32B 27/32* (2006.01)
*C08F 32/08* (2006.01)

(52) U.S. Cl.
USPC .......... 428/500; 428/35.7; 428/515; 428/516; 526/280; 526/281; 526/283

(58) Field of Classification Search
USPC ................ 428/35.7, 500, 515, 516; 526/280, 526/281, 283
See application file for complete search history.

(56) References Cited

U.S. PATENT DOCUMENTS

| 5,686,156 A | 11/1997 | Matsui et al. |
| 5,932,664 A | 8/1999 | Chen et al. |

(Continued)

FOREIGN PATENT DOCUMENTS

| EP | 1203656 A1 | 5/2002 |
| JP | 60-026024 A | 2/1985 |

(Continued)

OTHER PUBLICATIONS

European Search Report date Jun. 14, 2010, issued in corresponding European Patent Application No. 07806516.6.

(Continued)

*Primary Examiner* — Michele L Jacobson
(74) *Attorney, Agent, or Firm* — Westerman, Hattori, Daniels & Adrian, LLP

(57) ABSTRACT

A hydrogenated norbornene ring-open polymer obtained by hydrogenating 80% or more of main-chain carbon-carbon double bonds of a ring-open polymer obtained by ring-opening polymerization of 2-norbornene. The hydrogenated norbornene ring-open polymer has a weight average molecular weight determined by gel permeation chromatography (GPC) of 50,000 to 200,000, a molecular weight distribution of 1.5 to 10.0, and a melting point of 110 to 145° C. A hydrogenated norbornene ring-open polymer obtained by hydrogenating 80% or more of carbon-carbon double bonds of a ring-open polymer obtained by ring-opening copolymerization of 2-norbornene and a substituent-containing norbornene monomer, wherein the proportion of a repeating unit (A) derived from the 2-norbornene with respect to all repeating units is 90 to 99 wt % and the proportion of a repeating unit (B) derived from the substituent-containing norbornene monomer with respect to all repeating units is 1 to 10 wt %. A resin composition and a molding material.

20 Claims, 1 Drawing Sheet

U.S. PATENT DOCUMENTS

| | | |
|---|---|---|
| 6,682,797 B1 | 1/2004 | Otoi et al. |
| 7,781,035 B2 | 8/2010 | Jimbo et al. |
| 2004/0224110 A1 | 11/2004 | Jimbo et al. |

FOREIGN PATENT DOCUMENTS

| | | |
|---|---|---|
| JP | 04-276253 A | 10/1992 |
| JP | 06-278706 A | 10/1994 |
| JP | 07-178884 A | 7/1995 |
| JP | 09-263627 A | 10/1997 |
| JP | 10-195182 A | 7/1998 |
| JP | 11-074337 A | 3/1999 |
| JP | 2000-313090 A | 11/2000 |
| JP | 2002-020464 A | 1/2002 |
| JP | 2002-127315 A | 5/2002 |
| JP | 2002-194067 A | 7/2002 |
| JP | 2002-217279 A | 8/2002 |
| JP | 2002-249554 A | 9/2002 |
| JP | 2003-183361 A | 7/2003 |
| JP | 2003329834 A | 11/2003 |
| JP | 2006-052333 A | 2/2006 |
| JP | 2006063231 A | 3/2006 |
| WO | 03/021665 A1 | 3/2003 |

OTHER PUBLICATIONS

Abboud W et al. "Thermal properties of hydrogenated polynorbornen" New Polymeric Materials, NL, vol. 1, No. 3, Jan. 1, 1989, pp. 155-164, XP009133424, ISSN: 0169-6424.

European Search Report dated Mar. 1, 2011, issued in corresponding European Patent Application No. 10195888.2.

Lee L-B W et al., "Equilibrium Control of Crystal Thickness and Melting Point through Block Copolymerzation" Macromolecules, American Chemical Society, US, vol. 37, Jan. 1, 2004, pp. 7278-7284, XP003021280.

International Preliminary Report on Patentability (Form PCT/IB/373) of International Application No. PCT/JP2007/067043 issued Mar. 17, 2009.

Written opinion of the International Searching Authority of International Application No. PCT/JP2007/067043, Form PCT/ISA/237.

Cataldo, Franco; "FTIR Spectroscopic Characterization of Hydrogenated Polyoctenamer and Polynorbomene and DSC Study of their Thermal Properties"; Polymer International, 1994, pp. 49-57, vol. 34.

Lee, Li-Bong et al.; "Equilibrium Control of Crystal Thickness and Melting Point through Block Copolymerization"; Polymeric Materials: Science & Engineering, vol. 91, 2004, pp. 839-840.

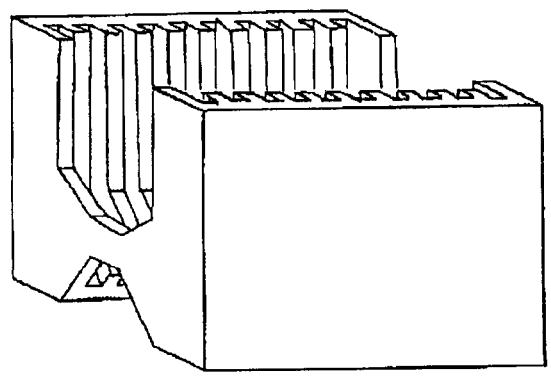

HYDROGENATED NORBORNENE-BASED RING-OPENING POLYMERIZATION POLYMER, RESIN COMPOSITION, AND MOLDED OBJECT

This application is a divisional of U.S. application Ser. No. 12/439,360, filed on Feb. 27, 2009, which is a National Stage of International Application No. PCT/JP2007/67043, filed on Aug. 31, 2007, which claims priority to Japanese priority application No. 2006-236627 filed on Aug. 31, 2006, Japanese priority application No. 2006-237000 filed on Aug. 31, 2006, Japanese priority application No. 2006-266680 filed on Sep. 29, 2006 and Japanese priority application No. 2006-266683 filed on Sep. 29, 2006, Japanese priority application No. 2006-266889 filed Sep. 29, 2006, Japanese priority application No. 2006-269332 filed Sep. 29, 2006, Japanese priority application No. 2006-342808 filed Dec. 20, 2006, Japanese priority application No. 2006-342872 filed Dec. 20, 2006, Japanese priority application No. 2006-355191 filed Dec. 28, 2006, which are hereby incorporated by reference.

TECHNICAL FIELD

The present invention relates to a hydrogenated norbornene ring-open polymer exhibiting excellent steam barrier properties, heat resistance, oil resistance, mechanical properties, processability, and the like which are properties demanded in recent years in the fields of information processing, food industries, medical supplies, engineering works, and the like, a resin composition comprising the hydrogenated norbornene ring-open polymer and an antioxidant, and a molded article obtained by molding the hydrogenated norbornene ring-open polymer or the resin composition.

BACKGROUND ART

Since a hydrogenated norbornene ring-open polymer has excellent transparency and a low birefringence, application of the polymer as a resin material for optical lenses or optical sheets has been proposed (Patent Documents 1 and 2). In addition, since the polymer exhibits excellent fluidity in a molten state and also has excellent elusion properties and chemical resistance, application of the polymer as a resin material for other than optical application such as a packing film, a medical container, and the like has been proposed (Patent Documents 3 and 4). However, since many hydrogenated norbornene ring-open polymers are amorphous, their moisture proofing properties, anti-sebum properties, solvent resistance, and the like are insufficient. Improvement of these properties has been desired.

As a hydrogenated norbornene ring-open polymer having crystallinity (i.e. having a melting point), crystalline hydrogenated products of a norbornene ring-open polymer containing a repeating unit of norbornene monomers having 3 or more rings are known (Patent Documents 5 to 7). Resin films or sheets obtained from the hydrogenated norbornene ring-open polymers described in these documents are excellent in transparency, heat resistance, and chemical resistance, as well as mechanical strength. However, these crystalline hydrogenated norbornene ring-open polymers have poor solubility in solvents and deposit from the solvent after hydrogenating the ring-open polymer, sometimes making it difficult to sufficiently purify the polymer by removing residual catalysts and the like. In addition, the film molded from the hydrogenated norbornene ring-open polymer did not fully satisfy the requirement for moisture permeability.

Non-patent Documents 1 and 2 propose hydrogenated norbornene ring-open polymers possessing a certain degree of crystallinity. However, these documents do not specifically describe the properties of the polymers. Among the specifically disclosed polymers, those having a high molecular weight and a narrow molecular weight distribution exhibited difficulty in controlling the film thickness when the film is produced. Films made from the polymer having a small molecular weight had a small tensile breaking elongation, indicating that the polymer has a problem of mechanical properties when made into a film. Furthermore, since the hydrogenation degree is not necessarily enough, molded products made from the polymer are easily burned.

Along with high integration of semiconductor chips and liquid crystal display devices in the electronic fields, quality degradation due to mixing of contaminants such as fine particles, moisture, and organic substances during the manufacturing process poses a serious problem. Therefore, it is necessary to store and transport precision substrates such as a silicon wafer substrate, a liquid crystal display substrate, and the like used for production of these parts under an environment where the above-mentioned contaminants are reduced to an amount as small as possible. For this reason, a method of storing and transporting these precision substrates in a state isolated from the outside environment by utilizing an airtight container of which the inside is highly purified (a wafer carrier for semiconductor production) is used.

A method of filling the container with clean air or an inert gas in order to prevent contaminants such as fine particles from adhering to the precision substrate stored in the container has also been employed. In order to respond to the recent demand for further low contamination, a method of evacuating the internal atmosphere of the container to provide vacuum or reduced pressure conditions has been proposed. The container of which the internal atmosphere is evacuated not only must be airtight and pressure resistant, but also the container material itself must not discharge contaminants such as moisture and organic substances.

As a container satisfying these requirements, a metal container and a container made from a thermoplastic resin having excellent chemical resistance and low water absorptivity such as polypropylene (PP), polytetrafluoroethylene (PTFE), perfluoroalkoxy fluororesin (PFA), or the like are known.

However, a metal container is heavy, cannot allow observation of the precision substrates stored therein, and has a high manufacturing cost. PP is opaque and has poor dimensional accuracy and heat resistance. PTFE is not only opaque and has poor dimensional accuracy, but also does not allow injection molding, making mass production difficult. The PTFE product is therefore expensive. PFA has insufficient transparency and poor dimensional accuracy, and it is difficult to synthesize PFA and to manufacture the product in a large scale. The PFA product is thus also expensive.

As a molding material which solves these problems, a thermoplastic norbornene resin which can be molded by injection molding and has excellent heat resistance, moisture resistance, chemical resistance, transparency, and the like is attracting attention in recent years.

For example, a thermoplastic resin container formed from a cycloolefin resin is proposed in Patent Document 8. The Patent Document 8 describes that a hydrogenated norbornene ring-open polymer is preferable as a cycloolefin resin due to the small content of impurities such as low molecular weight components, catalyst residues, metals, and the like in the resin and also due to high transparency.

Patent Document 9 proposes a material for producing semiconductors formed from a thermoplastic saturated norbornene resin having a contact surface of 18.6 kgf/cm² at a load deflecting temperature of 70° C. Patent Document 10 proposes a container for precision substrates made from a thermoplastic resin and having one or more components which have specific properties. A hydrogenated norbornene ring-open polymer and the like are given as a preferable thermoplastic resin.

However, when a wafer carrier for semiconductor production is fabricated using the thermoplastic resin molding material described in these Patent Documents, there is a problem that the surface of the semiconductors in the carrier is contaminated with an organic substance discharged from the molded article. In addition, when the wafer is inserted into or removed from the carrier, the carrier may be caused to come into contact with the wafer and produce a resin powder (foreign matter) which contaminates the wafer.

In the field of medical supplies and food packing, packing materials for medical supplies such as an infusion solution bag, a blood bag, a bottle for medicine, a cell used for analysis, and a medical test tube, as well as packing materials for food such as bean paste, soy sauce, and mayonnaise are widely used. These packing materials are required to possess transparency, chemical resistance, impact resistance, capability of being repeatedly sterilized, steam barrier properties, and the like. In order to satisfy these requirements, a number of packing materials for medical supplies and foods using a synthetic resin such as a thermoplastic norbornene resin having excellent transparency or chemical resistance have been proposed.

For example, Patent Document 11 proposes a packing container for medical supplies and foods of which the wall is made of a multilayer laminate, at least one layer being made of a thermoplastic norbornene polymer.

Patent Document 12 discloses a molded article prepared by laminating a gas barrier resin layer of a partially saponified polyvinyl acetate on the surface of a thermoplastic norbornene resin molded article.

However, all the thermoplastic norbornene resins described in these Documents are amorphous materials which have insufficient impact resistance and oil resistance when used as a packing material for medical supplies. Moreover, the packing container for medical supplies and foods described in Patent Document 11 has poor steam barrier properties. The molded article described in Patent Document 12, in which thermoplastic norbornene resin has poor steam barrier properties, has a problem of degradation of oxygen barrier properties due to denaturing of the gas barrier resin layer by water in a high temperature and high humidity environment.

On the other hand, Patent Document 13 proposes a film or a sheet obtained by molding a norbornene ring-open polymer having a melting point or a hydrogenated norbornene ring-open polymer having a melting point obtained by hydrogenating the carbon-carbon double bonds in the ring-open polymer.

However, the hydrogenated dicyclopentadiene ring-open polymer having a melting point which is specifically disclosed in this Patent Document can be molded only with difficulty due to unduly high melting point of 270° C. or more. In addition, the resulting molded product has poor steam barrier properties and mechanical properties such as impact resistance.

Blister molded articles such as a press-through package (PTP) have been manufactured by producing a resin sheet (sheet for blister mold) and molding the sheet by a heat molding method such as vacuum molding or pressure molding.

Outstanding moldability, damp proofing (steam barrier) properties, impact resistance, oil resistance, and the like are required for such blister molded articles. In order to satisfy these requirements, a number of blister molded articles made of a synthetic resin such as a thermoplastic norbornene resin have been proposed.

For example, Patent Document 14 discloses a press through package (PTP) with a packed material contained therein. The package is prepared by enclosing the material to be packed in a pocket provided on a sheet of a thermoplastic norbornene resin and blocking the pocket opening of the sheet with another sheet.

Patent Document 15 discloses a multilayer sheet for packing drugs requiring high moisture proofing properties. The sheet is made from (A) an amorphous polyolefin having a heat distortion temperature of 100° C. or less, which is a copolymer of a product of the Diels-Alder addition reaction of cyclopentadiene (or a derivative thereof) and norbornadiene (or a derivative thereof) and an unsaturated monomer and (B) polypropylene, wherein a layer of the polypropylene (B) is laminated on at least one side of the amorphous polyolefin resin layer (A).

However, all thermoplastic norbornene resins described in these Documents are amorphous resins, which may sometimes have insufficient mechanical strength, heat resistance, and oil resistance when used as a blister molded article. The PTP described in Patent Document 14 may become whitened by adhesion of sebum during use, and the high moisture proofing multilayer sheet for packing drugs described in Patent Document 15 has a problem of poor steam barrier properties.

In order to obviate these problems, Patent Document 16 proposes a film or a sheet formed from a norbornene ring-open polymer having a melting point or a hydrogenated norbornene ring-open polymer having a melting point obtained by hydrogenating the carbon-carbon double bonds in the ring-open polymer.

However, the hydrogenated dicyclopentadiene ring-open polymer having a melting point which is specifically disclosed in this Patent Document can be molded only with difficulty due to unduly high melting point of 270° C. or more. In addition, the resulting molded product may have poor steam barrier properties and mechanical properties.

On the other hand, Patent Document 17 discloses a blow-molded article prepared by blow molding of a norbornene polymer having a melting point. The norbornene polymer having a melting point described in Patent Document 17 is a crystalline polymer. Various hydrogenated ring-open polymers of norbornene monomers are mentioned as the norbornene polymer having a melting point in Patent Document 17. However, the Document specifically describes only a hydrogenated ring-open polymer of dicyclopentadiene. The hydrogenated dicyclopentadiene ring-open polymer is a polymer having a high melting point of 200 to 400° C.

Therefore, in the blow molding process shown in examples of Patent Document 17, the hydrogenated dicyclopentadiene ring-open polymer is extruded from a biaxial extruder at a barrel temperature of 290 to 300° C. and a die temperature of about 320° C. to produce a molten parison. Molding at such a high temperature not only subjects the molding machine to a significant load, but also tends to produce resin burning (discoloration). Although the resulting blow-molded container is excellent in heat resistance, oil resistance, chemical resistance, and the like, the steam barrier properties are not necessarily sufficient. In addition, since the hydrogenated dicyclopentadiene ring-open polymer can be dissolved in an organic solvent only with difficulty, purification of the product is difficult and the product has a problem of elution of metals derived from the catalyst.

The above-mentioned Non-patent Document 1 reports that a crystalline thermoplastic polymer with a melting point of 141° C. was obtained by hydrogenating an amorphous polynorbornene having a trans content of 80% and a weight average molecular weight (Mw) of 2,000,000.

Non-patent Document 2 reports the crystal structure and melting point of a block copolymer of hydrogenated polynorbornene and hydrogenated polyethylidene norbornene (hPN/hPEN).

However, since the hydrogenated norbornene ring-open polymers disclosed by Non-patent Documents 1 and 2 have a large number average molecular weight (Mn) and a narrow molecular weight distribution (Mw/Mn), it is difficult to precisely control the thickness of the container formed if the polymers are molded by blow molding. In fact, neither Non-patent Document 1 nor Non-patent Document 2 describes production of a molded article by blow molding of the hydrogenated polymers.

[Patent Document 1] JP-A-60-26024
[Patent Document 2] JP-A-9-263627
[Patent Document 3] JP-A-2000-313090
[Patent Document 4] JP-A-2003-183361
[Patent Document 5] JP-A-2000-201826
[Patent Document 6] JP-A-2000-393316
[Patent Document 7] JP-A-2006-52333
[Patent Document 8] JP-A-11-74337
[Patent Document 9] JP-A-2002-217279
[Patent Document 10] WO 2003/021665
[Patent Document 11] JP-A-4-276253
[Patent Document 12] JP-A-2002-127315
[Patent Document 13] JP-A-2002-194067
[Patent Document 14] JP-A-6-278706
[Patent Document 15] JP-A-7-178884
[Patent Document 16] JP-A-2002-194067
[Patent Document 17] JP-A-2002-249554
[Non-patent Document 1] Polymer International, Vol. 34, pp. 49-57 (1994)
[Non-patent Document 2] Macromolecules, Vol. 37, pp. 7278-7284 (2004)

DISCLOSURE OF THE INVENTION

Problems to be Solved by the Invention

The present invention has been achieved in view of this situation in general technology and has an object of providing the following (a) to (g):

(a) a hydrogenated norbornene ring-open polymer which can be used as a resin material exhibiting excellent steam barrier properties, heat resistance, oil resistance, mechanical properties, processability, and the like which are properties demanded in recent years in the fields of information processing, food industries, medical supplies, engineering works, and the like in recent years, and a resin composition comprising the hydrogenated norbornene ring-open polymer, (b) a resin film or sheet obtainable by molding the above hydrogenated norbornene ring-open polymer or resin composition, (c) a molded article useful as a material for processing electronic parts obtainable by molding the above hydrogenated norbornene ring-open polymer or resin composition, (d) a multilayer laminate having excellent damp proofing (steam barrier) properties, mechanical properties such as impact resistance, and oil resistance, as well as excellent gas barrier properties in a high temperature and high humidity environment (when the multilayer laminate includes at least one layer containing a gas barrier resin), and a packing material obtained by fabricating the multilayer laminate, (e) a medical supply packing material having steam barrier properties, mechanical properties, oil resistance, pliability, and moldability, and particularly excellent steam barrier properties at a high temperature, (f) a blister molding sheet having excellent steam barrier properties, oil resistance, and processability, particularly having excellent steam barrier properties at a high temperature, and a blister-molded article obtained by molding the blister molding sheet, and (g) a monolayer or multilayer blow-molded container, each layer containing a hydrogenated norbornene ring-open polymer, having excellent steam barrier properties, heat resistance, oil resistance, mechanical properties, processability, and the like, and having a small haze.

In order to achieve the above object, a first aspect of the present invention provides a hydrogenated norbornene ring-open polymer, a resin composition, a resin sheet, a resin film, and a sheet described in (1) to (7) below.

(1) A hydrogenated norbornene ring-open polymer obtained by hydrogenating 80% or more of main-chain carbon-carbon double bonds of a ring-open polymer which is obtained by ring-opening polymerization of 2-norbornene, the hydrogenated norbornene ring-open polymer having a weight average molecular weight (Mw) determined by gel permeation chromatography (GPC) of 50,000 to 200,000, a molecular weight distribution (Mw/Mn) of 1.5 to 10.0, and a melting point of 110 to 145° C.

(2) A hydrogenated norbornene ring-open polymer obtained by hydrogenating 80% or more of carbon-carbon double bonds of a ring-open polymer which is obtained by ring-opening copolymerization of 2-norbornene and a substituent-containing norbornene monomer, the proportion of a repeating unit (A) derived from the 2-norbornene with respect to all repeating units being 90 to 99 wt % and the proportion of a repeating unit (B) derived from the substituent-containing norbornene monomer with respect to all repeating units being 1 to 10 wt %, and the hydrogenated norbornene ring-open polymer having a melting point of 110 to 145° C.

(3) The hydrogenated norbornene ring-open polymer according to (2), having a weight average molecular weight (Mw) determined by gel permeation chromatography (GPC) of 50,000 to 200,000.

(4) The hydrogenated norbornene ring-open polymer according to (2), having a ratio (Mw/Mn) of the weight average molecular weight (Mw) to the number average molecular weight (Mn) of 1.5 to 10.0.

(5) A resin composition comprising the hydrogenated norbornene ring-open polymer of (1) or (2).

(6) The resin composition according to (5), further comprising 0.01 to 1 part by weight of an antioxidant per 100 parts by weight of the hydrogenated norbornene ring-open polymer.

(7) A resin film or sheet obtained by molding the hydrogenated norbornene ring-open polymer described in (1) or (2) or the resin composition described in (5).

According to a second aspect of the present invention, molding materials and molded articles described in (8) to (12) below are provided.

(8) A molding material comprising a hydrogenated norbornene ring-open polymer obtained by hydrogenating 80% or more of carbon-carbon double bonds of a ring-open polymer which is obtained by ring-opening polymerization of 2-norbornene or a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C., and the amount of organic substances discharged from the molding material when heated at 80° C. for 60 minutes being not more than 1 ppm.
(9) The molding material according to (8), wherein the content of transition metals is not more than 1 ppm.
(10) A molded article obtained by molding the molding material according to (8).
(11) The molded article according to (10), which is a material for processing electronic parts.
(12) The molded article according to (11), which is a wafer carrier for semiconductor production.

According to a third aspect of the present invention, multilayer laminates and packing materials described in (13) to (17) below are provided.
(13) A multilayer laminate having two or more resin layers of which at least one layer is a layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C.
(14) The multilayer laminate according to (13), wherein at least one layer is a layer containing a gas barrier resin.
(15) The multilayer laminate according to (13), wherein the gas barrier resin is an ethylene-vinyl alcohol copolymer.
(16) The multilayer laminate according to (13), wherein at least one layer is a layer containing at least one resin selected from the group consisting of a polyolefin resin, a polyamide resin, and a polyester resin.
(17) A packing material obtained by fabricating the multilayer laminate according to (13).

According to a fourth aspect of the present invention, a medical supply packing material described in (18) to (21) below is provided.
(18) A medical supply packing material having at least one resin layer which is a layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C.
(19) The medical supply packing material according to (18), further comprising at least one polyolefin resin layer.
(20) The medical supply packing material according to (19), wherein the polyolefin resin layer is a polyethylene resin layer.
(21) The medical supply packing material according to (18), which is an infusion solution bag.

According to a fifth aspect of the present invention, a blister molding sheet and a blister molded article described in (22) to (25) below are provided.
(22) A blister molding sheet having at least one resin layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C.
(23) The blister molding sheet according to (22), which is a multilayer laminate comprising at least one polyolefin resin layer.
(24) The blister molding sheet according to (23), wherein the polyolefin resin is a polypropylene resin.
(25) A blister molded article obtained by molding the blister molding sheet according to (22).

According to a sixth aspect of the present invention, a blow-molded container described in (26) below is provided.
(26) A blow-molded container having at least one resin layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C.

Effect of the Invention

According to the present invention, a hydrogenated norbornene ring-open polymer which can be used as a resin material exhibiting excellent steam barrier properties, heat resistance, oil resistance; mechanical properties, processability, and the like which are properties demanded in recent years in the fields of information, food industries, medical supplies, engineering works, and the like, a resin composition comprising the hydrogenated norbornene ring-open polymer, and a resin film or resin sheet obtained by molding the resin composition can be obtained.

According to the present invention, a molding material having excellent heat resistance, discharging only a minimal amount of organic compounds, and generating only a very slight amount of foreign matters by friction from a molded article, as well as a molded article obtained by molding the molding material can be provided.

The multilayer laminate and the packing material of the present invention have excellent steam barrier properties, mechanical properties such as impact resistance, and oil resistance, and when possessing at least one layer containing a gas barrier resin, have excellent gas barrier properties in a high temperature and high humidity environment.

The medical supply packing material of the present invention has excellent steam barrier properties, mechanical properties, oil resistance, pliability, and moldability. The medical supply packing material particularly exhibits superior steam barrier properties at a high temperature.

The blister molding sheet and the blister-molded article of the present invention have excellent steam barrier properties, oil resistance, and processability. The steam barrier properties of the blister molding sheet and the blister-molded article at a high temperature is particularly excellent.

According to the present invention, a monolayer or multilayer blow-molded container, each layer containing a hydrogenated norbornene ring-open polymer, having excellent steam barrier properties, heat resistance, oil resistance, mechanical properties, processability, and the like, and having a small haze can be provided.

BRIEF DESCRIPTION OF THE DRAWING

FIG. 1 is a perspective diagram of a wafer carrier for producing a semiconductor according to the present invention.

BEST MODE FOR CARRYING OUT THE INVENTION

The present invention will be described in detail below.
1) Hydrogenated Norbornene Ring-Open Polymer The hydrogenated norbornene ring-open polymer of the present invention is a polymer described in either (I) or (II) below.
(I) A hydrogenated norbornene ring-open polymer obtained by hydrogenating 80% or more of main-chain carbon-carbon double bonds of a ring-open polymer which is obtained by ring-opening polymerization of 2-norbornene (hydrogenated 2-norbornene ring-open polymer), the hydrogenated 2-norbornene ring-open polymer having a weight average molecular weight (Mw) determined by gel permeation chromatography (GPC) of 50,000 to 200,000, a molecular weight distribution (Mw/Mn) of 1.5 to 10, and a melting point of 110 to 145° C. (hereinafter may be referred to from time to time as "hydrogenated norbornene ring-open polymer (I)").
(II) A hydrogenated norbornene ring-open polymer obtained by hydrogenating 80% or more of carbon-carbon double bonds of a ring-open polymer which is obtained by ring-opening polymerization of 2-norbornene and a substituent-containing norbornene monomer, the proportion of a repeating unit (A) derived from the 2-norbornene with respect to all repeating units being 90 to 99 wt % and the proportion of a repeating unit (B) derived from the substituent-containing norbornene monomer with respect to all repeating units being 1 to 10 wt %, and the hydrogenated norbornene ring-open polymer having a melting point of 110 to 145° C. (hereinafter may be referred to from time to time as "hydrogenated norbornene ring-open polymer (II)").

The proportion of the repeating unit (A) derived from 2-norbornene with respect to all repeating units in the hydrogenated norbornene ring-open polymer (II) of the present invention is 90 to 99 wt %, preferably 95 to 99 wt %, and more preferably 97 to 99 wt %. The proportion of the repeating unit (B) derived from substituent-containing norbornene monomer with respect to all repeating units is 1 to 10 wt %, preferably 1 to 5 wt %, and more preferably 1 to 3 wt %.

If the proportion of the repeating unit (A) and the repeating unit (B) is in this range, the hydrogenated norbornene ring-open polymer has good solubility in solvents. Therefore, the polymer can be obtained with excellent productivity and can be purified with ease. In addition, the resulting molded article may have good mechanical properties, transparency, heat resistance, and steam barrier properties. Furthermore, the resin discharges only a very small amount of organic substances and generates resin powder (foreign matter) by friction and the like only with difficulty.

If the amount of the repeating unit (B) is too large, the heat resistance and steam barrier properties of the molded article may be impaired. In addition, the amount of organic substances discharged from the resin may increase and the molded article tends to easily generate resin powder (foreign matter) by friction.

If the amount of the repeating unit (B) is too small, the solubility of the hydrogenated polymer in solvents decreases, resulting in poor productivity of the polymer and difficulty in polymer purification. In addition, the mechanical properties of the molded article may be impaired. Moreover, the resulting molded article may more easily generate resin powder (foreign matter) by friction.

2-Norbornene used in the present invention is a known compound. This compound may be obtained by reacting cyclopentadiene and ethylene, for example. Industrially available 2-norbornene usually contains impurities.

As examples of the impurities, cyclopentadiene, norbornane, methylnorbornene, dimethyldicyclopentadiene, and the like can be given. Of these, methylnorbornene, dimethylcyclopentadiene, and the like are monomers copolymerizable with 2-norbornene by ring-opening copolymerization.

The impurities in 2-norbornene is usually less than 1 wt %, preferably less than 0.8 wt %, and more preferably less than 0.5 wt %. The heat resistance of the hydrogenated norbornene ring-open polymer is maintained at a high level when the content of impurities is within this range.

Since the 2-norbornene used may contain other monomers copolymerizable with 2-norbornene by ring-opening copolymerization as mentioned above, the hydrogenated norbornene ring-open polymer (I) also contains a ring-open copolymer which contains a small amount of other monomers copolymerizable with 2-norbornene by ring-opening copolymerization. The amount of the monomers copolymerizable with 2-norbornene in the polymer is usually not more than 1 wt %, preferably not more than 0.8 wt %, and more preferably not more than 0.5 wt %.

The substituent-containing norbornene monomer used in the present invention is a compound which has a norbornene skeleton in the molecule (excluding 2-norbornene). The term "substituent-containing norbornene monomer" used in the present invention includes norbornene compounds possessing a condensed ring, in addition to 2-norbornene derivatives having a substituent.

As the substituent-containing norbornene monomer, a norbornene monomer not containing a ring condensable with a norbornene ring in the molecule, a polycyclic norbornene monomer having three or more rings, and the like can be given.

As examples of the norbornene monomer not containing a ring condensable with a norbornene ring in the molecule, norbornenes having an alkyl group such as 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes having an alkenyl group such as 5-ethylidenenorbornene, 5-vinylnorbornene, 5-propenylnorborne, 5-cyclohexenylnorbornene, and 5-cyclopentenylnorbornene; norbornenes having an aromatic ring such as 5-phenylnorbornene; norbornenes having a polar group containing an oxygen atom such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxy-1-propylnorbornene, 5,6-dicarboxynorbornene, and 5-methoxycarbonyl-6-carboxynorbornene; norbornenes having a polar group containing a nitrogen atom such as 5-cyanonorbornene; and the like can be given.

The polycyclic norbornene monomer having three or more rings is to a norbornene monomer having a norbornene ring and one or more rings condensed with the norbornene ring in the molecule. As specific examples, monomers shown by the following formulas (2) and (3) can be given.

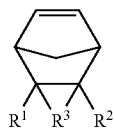

(2)

wherein $R^1$ and $R^2$ individually represent a hydrogen atom, a halogen atom, a substituted or unsubstituted hydrocarbon group having 1 to 20 carbon atoms, or a substituent containing a silicon atom, an oxygen atom, or a nitrogen atom, $R^1$ and $R^2$ may bond together to form a ring, and $R^3$ represents a substituted or unsubstituted divalent hydrocarbon group having 1 to 20 carbon atoms.

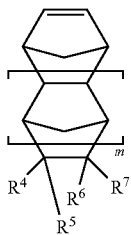

(3)

wherein $R^4$ to $R^7$ individually represent a hydrogen atom, a halogen atom, a substituted or unsubstituted hydrocarbon group having 1 to 20 carbon atoms, or a substituent containing a silicon atom, an oxygen atom or a nitrogen atom, wherein $R^4$ and $R^6$ may bond together to form a ring, and m is an integer of 1 or 2.

As specific examples of the monomer shown by the above formula (2), dicyclopentadiene, methyldicyclopentadiene, dimethyldicyclopentadiene, and tricyclo[5.2.1.0$^{2,6}$]dec-8-ene can be given. Norbornene derivatives having an aromatic ring such as tetracyclo[9.2.1.0$^{2,10}$.0$^{3,8}$]tetradeca-3,5,7,12-tetraene (also called 1,4-methano-1,4,4a,9a-tetrahydro-9H-fluorene) and tetracyclo[10.2.1.0$^{2,11}$.0$^{4,9}$]pentadeca-4,6,8,13-tetraene (also called 1,4-methano-1,4,4a,9,9a,10-hexahydroanthracene) can also be given.

As examples of the monomer shown by the above formula (3), tetracyclododecenes which are the compounds of the formula (3) in which m=1 and hexacycloheptadecenes which are compounds of the formula (3) in which m=2 can be given.

As specific examples oftetracyclododecenes, tetracyclododecenes unsubstituted or substituted with an alkyl group such as tetracyclododecene, 8-methyltetracyclododecene, 8-ethyltetracyclododecene, 8-cyclohexyltetracyclododecene, and 8-cyclopentyltetracyclododecene; tetracyclododecenes having a double bond outside of the ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes having an aromatic ring such as 8-phenyltetracyclododecene; tetracyclododecenes having an oxygen-containing substituent such as 8-methoxycarbony ltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; tetracyclododecenes having a nitrogen-containing substituent such as 8-cyanotetracyclododecene and tetracyclododecene-8,9-dicarboxylic acid imide; tetracyclododecenes having a halogen-containing substituent such as 8-chlorotetracyclododecene; and tetracyclododecenes having a silicon-containing substituent such as 8-trimethoxysilyltetracyclododecene can be given.

As specific examples of hexacycloheptadecenes, hexacycloheptadecenes unsubstituted or substituted with an alkyl group such as hexacycloheptadecene, 12-methylhexacycloheptadecene, 12-ethylhexacycloheptadecene, 12-cyclohexylhexacycloheptadecene, and 12-cyclopentylhexacycloheptadecene; hexacycloheptadecenes having a double bond outside of the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes having an aromatic ring such as 12-phenylhexacycloheptadecene; hexacycloheptadecenes having an oxygen-containing substituent such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; hexacycloheptadecenes having a nitrogen-containing substituent such as 12-cyanohexacycloheptadecene and hexacycloheptadecene-12,13-dicarboxylic acid imide; hexacycloheptadecenes having a halogen-containing substituent such as 12-chlorohexacycloheptadecene; and hexacycloheptadecenes having a silicon-containing substituent such as 12-trimethoxysilylhexacycloheptadecene can be given. These norbornene monomers may be used either individually or in combination of two or more.

In the case of providing the hydrogenated norbornene ring-open polymer (II), other monomers copolymerizable with the 2-norbornene and substituent-containing norbornene monomers may be used in combination.

As examples of the other monomer copolymerizable with 2-norbornene monomer and substituent-containing norbornene monomers, monocyclic olefins such as cyclohexene, cycloheptene, and cyclooctene, and derivatives thereof; cyclic dienes such as cyclohexadiene and cycloheptadiene, and derivatives thereof; and the like can be given.

(Ring-Opening Polymerization)

The ring-opening polymerization of 2-norbornene or the ring-opening copolymerization of 2-norbornene and a substituent-containing norbornene monomer may be carried out in the presence of a metathesis polymerization catalyst in a solvent or without using a solvent.

As the metathesis polymerization catalyst, a general metathesis polymerization catalyst which essentially consists of (a) a transition metal compound catalyst component and (b) a metallic compound co-catalyst component described in JP-B-41-20111, JP-A-46-14910, JP-B-57-17883, JP-B-57-61044, JP-A-54-86600, JP-A-58-127728, and JP-A-1-240517; a living ring-opening metathesis catalyst such as Schrock-type polymerization catalyst (JP-A-7-179575, Schrock et al., J. Am. Chem. Soc., 1990, vol. 112, from page 3875), Grubbs polymerization catalyst (Fu et al., J. Am. Chem. Soc., 1993, Vol. 115, from page 9856), Nguyen et al., J. Am. Chem. Soc., 1992, vol 114, from page 3974; Grubbs et al. WO 98/21214, etc.); and the like can be given.

Taking the molecular weight distribution of the polymer into consideration, a metathesis polymerization catalyst comprising (a) a transition metal compound catalyst component and (β) a metallic compound co-catalyst component is preferable among these catalysts.

The transition metal compound catalyst components (a) are transition metal compounds of the groups 3 to 11 of the Periodic Table. As examples of the specific transition metal compound, a halide, an oxyhalide, an alkoxyhalide, an alkoxide, a carbonate, an (oxy)acetylacetonate, a carbonyl complex, an acetonitrile complex, and an hydride complex of these transition metals, derivatives of these compounds, and complex compounds of these, which are obtained by a complexing agent such as $P(C_6H_5)_5$ and the like can be given.

As specific examples, $TiCl_4$, $TiBr_4$, $VOCl_3$, $WBr_3$, $WCl_6$, $WOCl_4$, $MoCl_5$, $MoOCl_4$, $WO_2$, and $H_2WO_4$ can be given. Among these compounds, compounds of W, Mo, Ti, or V, particularly a halide, an oxyhalide, or an alkoxyhalide are preferable from the viewpoint of polymerization activity.

The metallic compound co-catalyst component (β) is a compound having at least one metal element-carbon atom bond or at least one metal element-hydrogen bond of a metal belonging to the groups 1 to 2 and the groups 12 to 14 of the Periodic Table. For example, an organic compound of Al, Sn, Li, Na, Mg, Zn, Cd, and B can be given.

As specific examples, organoaluminum compounds such as trimethylaluminum, triisobutylaluminum, diethylaluminum monochloride, methylaluminum sesquichloride, and ethylaluminum dichloride; organotin compounds such as tetramethyltin, diethyldimethyltin, tetrabutyltin, and tetraphenyltin; organiolithium compounds such as n-butyllithium; organosodium compounds such as n-pentylsodium; organomagnesium compounds such as methylmagnesium iodide; organozinc compounds such as diethylzinc; organocadmium compounds such as diethyl cadmium; and organoboron compounds such as trimethylboron can be given. Of these, compounds of elements belonging to the group 13, particularly organoaluminum compounds of Al, are preferable.

It is possible to increase the metathesis polymerization activity by adding a third component in addition to the component (α) and the component (β). Examples of the third component used include aliphatic tertiary amines, aromatic tertiary amines, molecular oxygen, alcohols, ethers, peroxides, carboxylic acids, acid anhydrides, acid chlorides, esters, ketones, nitrogen-containing compounds, halogen-containing compounds, and other Lewis acids.

The ratio of the component (α) to the component (β), in terms of molar ratio of metals, is usually in a range of 1:1 to 1:100, and preferably 1:2 to 1:10. The molar ratio of the component (α) to the third component is usually in a range of 1:0.005 to 1:50, and preferably 1:1 to 1:10.

The amount of the polymerization catalyst used, in terms of molar ratio of the transition metals in the polymerization catalyst to the total amount of monomers, is usually 1:100 to 1:2,000,000, preferably 1:1,000 to 1:20,000, and more preferably 1:5,000 to 1:8,000. If the amount of the catalyst is too large, the catalyst removal after the polymerization reaction will become difficult and there is a possibility that the molecular weight distribution may be broadened. If too small, sufficient polymerization activity may not be obtained.

It is preferable to carry out in the ring-opening polymerization in an appropriate solvent, although a non-solvent reaction is possible. There are no specific limitations to the organic solvent used insofar as the solvent can dissolve or disperse the polymer or hydrogenated polymer and does not affect the polymerization reaction and the hydrogenation reaction. A common industrially available solvent is preferable.

As specific examples of such an organic solvent, aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbons such as benzene, toluene, and xylene; halogen-containing aliphatic hydrocarbons such as dichloromethane, chloroform, and 1,2-dichloroethane; halogen-containing aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and the like can be given. These organic solvents may be used either individually or in combinations of two or more.

Of these, common industrial solvents such as aromatic hydrocarbons, aliphatic hydrocarbons, alicyclic hydrocarbons, and ethers are preferably used.

When the polymerization is carried out in an organic solvent, the concentration of 2-norbornene or the monomer mixture consisting of 2-norbornene and substituent-containing norbornene monomers is preferably 1 to 50 wt %, more preferably 2 to 45 wt %, and particularly preferably 3 to 40 wt %. If the concentration of 2-norbornene or the monomer mixture is less than 1 wt %, the productivity may be reduced; if more than 50 wt %, the solution viscosity after polymerization is too high, and there is a possibility that the subsequent hydrogenation reaction may become difficult.

It is preferable to add a molecular weight controlling agent to the ring-opening polymerization reaction system. The molecular weight of the ring-open polymer may be adjusted by adding a molecular weight controlling agent.

Any molecular weight controlling agent conventionally used may be used without a particular limitation.

As examples, α-olefins such as 1-butene, 1-pentene, 1-hexene, and 1-octene; styrenes such as styrene and vinyltoluene; ethers such as ethyl vinyl ether, isobutyl vinyl ether, and allyl glycidyl ether; halogen-containing vinyl compounds such as allylchloride; oxygen-containing vinyl compounds such as glycidyl methacrylate; nitrogen-containing vinyl compounds such as acrylamide; nonconjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; conjugated dienes such as 1,3-butadiene, 2-methyl-1,3-butadiene, 2,3-dimethyl-1,3-butadiene, 1,3-pentadiene, and 1,3-hexadiene can be given. Of these, α-olefins are preferable due to their capability of easily adjusting the molecular weight.

The amount of the molecular weight controlling agent may be the amount by which the polymers with a desired molecular weight can be obtained. Such an amount, in terms of molar ratio of the molecular weight controlling agent to the total amount of all monomers used, may be usually 1:50 to 1:1,000,000, preferably 1:100 to 1:5,000, and more preferably 1:300 to 1:3,000.

The polymerization reaction is initiated by mixing 2-norbornene or a monomer mixture of 2-norbornene and substituent-containing norbornene monomers with a polymerization catalyst.

Although not particularly limited, the polymerization temperature is usually −20° C. to +100° C., preferably 10° C. to 80° C., and more preferably 30° C. to 60° C. If the temperature of the polymerization reaction is too low, the reaction rate may be reduced. When the polymerization temperature is too high, there is a possibility that the molecular weight distribution may be broadened.

Although not particularly limited, the polymerization reaction time is usually from one minute to 100 hours.

The pressure conditions are also not particularly limited. The polymerization reaction is usually carried out under pressure of 0 to 1 MPa.

After the reaction, the target 2-norbornene ring-open polymer or 2-norbornene ring-open copolymer (hereinafter referred to from time to time collectively as "norbornene ring-open polymer") may be isolated by an ordinary post treatment operation.

The resulting norbornene ring-open polymer is supplied to the next hydrogenation reaction step.

The hydrogenation reaction may also be continuously performed by adding a hydrogenation catalyst to the ring-opening polymerization or ring-opening copolymerization reaction solution without isolating the norbornene ring-open polymer as described later.

(Hydrogenation Reaction)

The hydrogenation reaction of the norbornene ring-open polymer is a reaction of adding hydrogen to the carbon-carbon double bonds in the main chain of the norbornene ring-open polymer. The hydrogenation reaction is carried out by adding a hydrogenation catalyst to a solution of 2-norbornene ring-open (co)polymer in an inert solvent while supplying hydrogen to the reaction system.

Any hydrogenation catalyst commonly used for hydrogenating olefin compounds may be used without specific limitations. The catalyst may be either a homogeneous catalyst or a heterogeneous catalyst. A heterogeneous catalyst is preferred when removal of metals from the resulting polymer or the like is considered.

As homogeneous catalysts, a catalyst system consisting of a combination of a transition metal compound and an alkali metal compound, for example, cobalt acetate and triethylaluminum, nickel acetylacetonate and triisobutylaluminum, titanocene dichloride and n-butyllithium, zirconocene dichloride and sec-butyllithium, and tetrabutoxy titanate and dimethyl magnesium; a noble metal complex catalyst such as dichloro-bis(triphenylphosphine)palladium, chlorohydridocarbonyl tris(triphenylphosphine)ruthenium, and chlorotris(triphenylphosphine)rhodium; and the like can be given.

As heterogeneous catalysts, nickel, palladium, platinum, rhodium, and ruthenium, or solid catalysts with these metals supported on a carrier such as carbon, silica, diatomaceous earth, alumina, or titania, for example, nickel on silica, nickel on diatomaceous earth, nickel on alumina, palladium on carbon, palladium on silica, palladium on diatomaceous earth, and palladium on alumina can be given.

The amount of the catalyst used is usually 0.05 to 10 parts by weight for 100 parts by weight of the norbornene ring-open polymer.

As the inert organic solvent used for the hydrogenation reaction, the same organic solvents as previously mentioned in connection with the ring-opening polymerization of 2-norbornene or the ring-opening copolymerization of 2-norbornene and substituent-containing norbornene monomers may be given.

The hydrogenation reaction temperature varies according to the hydrogenation catalyst used. The reaction temperature is usually from −20 to +300° C., preferably from 0 to +250° C., and more preferably from 100 to 200° C. If the temperature of the hydrogenation reaction is too low, the reaction rate may be small. When the hydrogenation reaction temperature is too high, a side reaction may occur.

After the hydrogenation reaction, the reaction solution is filtered to remove the hydrogenation catalyst and volatile components such as a solvent are removed from the polymer solution after the filtration to obtain the target hydrogenated norbornene ring-open polymer (I) or (II).

Since the hydrogenated norbornene ring-open polymers (I) and (II) of the present invention have good solubility in organic solvents, the polymer after hydrogenation may be sufficiently purified by removing residual catalysts and the like.

As the method of removing the volatile components such as a solvent from the polymer solution after filtration, known methods such as a coagulation method, a direct drying method, and the like can be given.

A coagulation method is a method of mixing a polymer solution with a poor solvent for the polymer to precipitate the polymer. Examples of the poor solvent used include polar solvents including alcohols such as ethyl alcohol, n-propyl alcohol, and isopropyl alcohol; ketones such as acetone and methyl ethyl ketone; and esters such as ethyl acetate and butyl acetate.

The component in the form of particles obtained by precipitation is dried by heating under vacuum, in nitrogen, or in the air to obtain dry particles, or made into pellets by extruding from a melt extruder.

A direct dry technique is a method of removing solvents by heating the polymer solution under reduced pressure. This method may be carried out using a centrifugal thin-film continuous vaporization dryer, a surface-scraping heat-exchange continuous reactor dryer, a high-viscosity reactor, or the like. The degree of vacuum and the temperature are not particularly limited and are suitably selected according to the apparatus used.

The degree of hydrogenation of the main chain double bonds in the hydrogenated norbornene ring-open polymers (I) and (II) (hereinafter referred to from time to time as "hydrogenated ring-open polymer of the present invention") is 80% or more, preferably 90% or more, more preferably 95% or more, still more preferably 99% or more, and particularly preferably 99.9% or more. The degree of hydrogenation of the above range prevents resin burning when molding and suppresses generation of a die line particularly when a film is formed.

The degree of hydrogenation of the hydrogenated ring-open polymer of the present invention can be determined by $^1$H-NMR spectrum measurement using deuteriochloroform as a solvent.

The hydrogenated norbornene ring-open polymer (I) has a polystyrene-reduced weight average molecular weight (Mw), measured by gel permeation chromatography (GPC) using 1,2,4-trichlorobenzene as an eluant, of 50,000 to 200,000, preferably 70,000 to 180,000, and more preferably 80,000 to 150,000.

The hydrogenated norbornene ring-open polymer (II) has a polystyrene-reduced weight average molecular weight (Mw), measured by gel permeation chromatography (GPC) using 1,2,4-trichlorobenzene as an eluant, of preferably 50,000 to 200,000, more preferably 70,000 to 180,000, and particularly preferably 80,000 to 150,000.

If the Mw is in this range, the hydrogenated ring-open polymer has good solubility in solvents and can be produced with excellent productivity, purified with ease, and molded with ease. The molded article has good mechanical properties and heat resistance. If the Mw is too large, the polymer solution has high viscosity and can be filtered only with difficulty, resulting in impaired productivity. In addition, a high temperature is required for the resin in order to increase the film thickness precision when producing a film, resulting in a die line due to burning of the resin. If the Mw is too small, mechanical properties and heat resistance of the molded article may decrease. In addition, because the hydrogenated ring-open polymer is crystalline, the hydrogenated polymer dissolves in solvents only with difficulty, resulting in poor productivity of the polymer and difficulty in polymer purification.

If the Mw is in this range, the hydrogenated ring-open polymer exhibits excellent blister moldability and produces a molded article with excellent strength. If the Mw is too large, blister moldability is impaired. It is difficult to mold the resin by blister molding or, if molded by blister molding, the molded article may have some defects such as an uneven or deflected thickness. On the other hand, if the Mw is too small, the blister molded article may have poor mechanical strength.

The upper limit of the molecular weight distribution (Mw/Mn) of the hydrogenated norbornene ring-open polymer (I) of the present invention is 10.0, preferably 9.0, more preferably 8.5, and still more preferably 8.0. The lower limit of (Mw/Mn) is 1.5, preferably 2.0, and more preferably 2.5.

Although not particularly limited, the upper limit of the molecular weight distribution (Mw/Mn) of the hydrogenated norbornene ring-open polymer (II) is preferably 10.0, more preferably 9.0, still more preferably 8.5, and particularly preferably 8.0. Although there are no particular limitations, the lower limit of (Mw/Mn) is preferably 1.5, more preferably 2.0, and still more preferably 2.5.

If the Mw/Mn is in this range, the hydrogenated ring-open polymer exhibits excellent blister moldability and produces a molded article with excellent strength and heat resistance. If the Mw/Mn is too narrow, the melting viscosity of the hydrogenated ring-open polymer delicately changes according to a change of temperature, resulting in impaired processability of the molded article such as a film and a sheet. In addition, if the resin is molded by blister molding, the molded article may have some defects such as an uneven or deflected thickness. On the other hand, if the Mw/Mn is too broad, the molded article may have poor mechanical strength and decreased heat resistance.

The Mn is determined as a standard polystyrene-reduced value by gel permeation chromatography (GPC) using 1,2,4-trichlorobenzene as an eluant.

The hydrogenated ring-open polymer of the present invention is crystalline and, therefore, has a melting point (hereinafter referred to from time to time as "Tm"). The melting point of the hydrogenated ring-open polymer is 110 to 145° C., preferably 120 to 145° C., and more preferably 130 to 145° C.

If the Tm is in the above range, the molded article has good heat resistance. The melting point in a range of 130 to 145° C. is preferable due to capability of the resin to withstand steam sterilization when producing molded articles for medical or food use.

The melting point of the hydrogenated ring-open polymer is determined according to JIS K7121 using a general differential scanning calorimeter.

The melting point of the hydrogenated ring-open polymer varies according to the molecular weight, molecular weight distribution, isomerization degree, copolymerization ratio of 2-norbornene and substituent-containing norbornene monomers, and the like.

Since the hydrogenated ring-open polymer of the present invention has a melting point and, therefore, possesses a crystalline structure, the polymer forms crystalline areas in the blister-molded article. The crystalline areas improve the mechanical properties such as tensile breaking elongation and the like in combination with amorphous areas. In spite of such characteristics, the molded article has good transparency because of the small size crystal.

The isomerization ratio of the hydrogenated ring-open polymer of the present invention is usually 0 to 40%, preferably 0 to 20%, more preferably 1 to 10%, and still more preferably 1 to 5%. If the isomerization ratio is too high, the polymer may have reduced heat resistance. If the isomerization ratio is too low, on the other hand, the polymer has reduced solubility in solvents, resulting in poor productivity of the polymer and difficulty in polymer purification. In addition, the molded article may have impaired transparency.

The isomerization ratio of the hydrogenated ring-open polymer of the present invention can be calculated using an equation, 33.0 ppm peak integration value/(31.8 ppm peak integration value+33.0 ppm peak integration value)×100, wherein the peak integration values are determined by $^{13}$C-NMR spectrum measurement using deuteriochloroform as a solvent.

The 31.8 ppm peak is a peak derived from cis-isomers of 2-norbornene repeating units in the hydrogenated ring-open polymer and the 33.0 ppm peak is a peak derived from trans-isomers of 2-norbornene repeating units in the hydrogenated ring-open polymer.

In order to produce a norbornene ring-open polymer having the isomerization ratio of the above range, the hydrogenation reaction temperature of the norbornene ring-open polymer is preferably 100 to 200° C., more preferably 120 to 170° C., and still more preferably 130 to 160° C., and the amount of the hydrogenation catalyst should preferably be 0.1 to 5 parts by weight, and more preferably 0.1 to 1 part by weight for 100 parts by weight of the 2-norbornene ring-open (co)polymer. Such a hydrogenation reaction temperature and amount of hydrogenation catalyst are preferable due to the excellently-balanced hydrogenation degree and heat resistance of the polymer.

The hydrogenated ring-open polymer exhibiting the above-described characteristics is suitable as a resin material which provides excellent properties such as steam barrier properties, heat resistance, oil resistance, mechanical properties, and processability demanded in recent years in the fields of information processing, food industries, medical supplies, engineering works, and the like.

2) Resin Composition

The resin composition of the present invention comprises the hydrogenated ring-open polymer and an antioxidant.

The amount of antioxidant to be added is usually 0.01 to 1 part by weight, and preferably 0.05 to 0.5 parts by weight for 100 parts by weight of the hydrogenated ring-open polymer. If the amount of antioxidant is too small, the molded article may be easily burnt (colored). On the other hand, if the amount if too large, the molded article may be whitened or allow the antioxidant to elute therefrom.

Although there are no particular limitations, the molecular weight of the antioxidant used is preferably 700 or more. If the molecular weight of the antioxidant is too small, the molded article may allow the antioxidant to elute therefrom.

As specific examples of the antioxidant, phenolic antioxidants such as octadecyl-3-(3,5-di-t-butyl-4-hydroxyphenyl) propionate, tetrakis[methylene-3-(3',5'-di-t-butyl-4'-hydroxyphenyl)propionate]methane, and pentaerythrityltetrakis[3-(3,5-di-t-butyl-4-hydroxyphenyl)propionate]; phosphorus antioxidants such as triphenylphosphite, tris(cyclohexylphenyl)phosphite, and 9,10-dihydro-9-oxa-10-phosphaphenanthrene; sulfur-containing antioxidants such as dimyristyl-3,3'-thiodipropionate, distearyl-3,3'-thiodipropionate, laurylstearyl-3,3'-thiodipropionate, and pentaerythritoltetrakis(β-laurylthiopropionate); and the like can be given. These antioxidants may be used either individually or in combination of two or more. Among these, phenolic antioxidants are preferable.

In addition to the hydrogenated ring-open polymer and the antioxidant, the resin composition of the present invention may include various other additives which are commonly used in synthetic resins to the extent that the object of the present invention is not inhibited.

Examples of the additives include rubber-like polymers and other resins, UV absorbers, weather-resistant stabilizers, antistatic agents, slipping agents, anticlouding agents, dyes, pigments, coloring agents, natural oils, synthetic oils, plasticizers, organic or inorganic fillers, antibacterial agents, deodorants, and the like.

The rubber-like polymers are polymers having a glass transition temperature of 40° C. or less and include rubbers and thermoplastic elastomers. When the polymer has two or more glass transition temperatures such as in the case of a block copolymer, such a polymer may be used as the rubber-like polymer if the lowest glass transition temperature is not more than 40° C. Although the viscosity of the rubber-like polymer may be suitably selected according to the purpose of use, the Mooney viscosity ($ML_{1+4}$, 100° C.) is usually 5 to 300.

As examples of the rubber-like polymer, an ethylene α-olefin rubber; an ethylene-α-olefin polyene copolymer rubber; a copolymer of ethylene and unsaturated carboxylate such as ethylene methyl methacrylate and ethylene butyl acrylate; a copolymer of ethylene and a fatty acid vinyl ester such as an ethylene-vinyl acetate copolymer; a polymer of alkyl acrylate such as ethyl acrylate, butyl acrylate, hexyl acrylate, 2-ethylhexyl acrylate, and lauryl acrylate; diene rubbers such as polybutadiene, polyisoprene, a random copolymer of styrene and butadiene or isoprene, an acrylonitrile-butadiene copolymer, a butadiene isoprene copolymer, a butadiene-alkyl (meth)acrylate copolymer, a butadiene-alkyl (meth)acrylate-acrylonitrile copolymer, and a butadiene-alkyl (meth)acrylate-acrylonitrile-styrene copolymer; a butylene-isoprene copolymer; block copolymers of aromatic vinyl conjugated diene such as a styrene-butadiene block copolymer, a hydrogenated styrene-butadiene block copolymer, a hydrogenated styrene-butadiene random copolymer, a styrene-isoprene block copolymer, and a hydrogenated styrene-isoprene block copolymer; a low crystalline polybutadiene resin, an ethylene-propylene elastomer, a styrene-grafted ethylene-propylene elastomer, a thermoplastic polyester elastomer, an ethylene ionomer resin, and the like can be given.

The amount of the rubber-like polymers is suitably selected according to the purpose of use. When impact resistance and pliability are demanded, the amount of the rubber-like polymers is usually in a range from 0.01 to 100 parts by weight, preferably from 0.1 to 70 parts by weight, and more preferably from 1 to 50 parts by weight for 100 parts by weight of the hydrogenated ring-open polymer.

As examples of the other resins, an amorphous norbornene ring-open polymer, an amorphous hydrogenated norbornene ring-open polymer, an amorphous norbornene addition polymer, a crystalline norbornene ring-open polymer, a crystalline hydrogenated norbornene ring-open polymer other than the hydrogenated ring-open polymer of the present invention, a crystalline norbornene addition polymer, a low density polyethylene, a high density polyethylene, a linear low density polyethylene, a super-low density polyethylene, an ethylene-ethyl acrylate copolymer, an ethylene-vinyl acetate copolymer, polypropylene, polystyrene, hydrogenated polystyrene, polymethyl methacrylate, polyvinyl chloride, polyvinylidene chloride, polyphenylene sulfide, polyphenylene ether, polyamide, polyester, polycarbonate, cellulose triacetate, polyether imide, polyimide, polyallylate, polysulfone, polyether sulfone, and the like can be given.

These resins may be used either individually or in combination of two or more in any proportion not affecting the purpose of the present invention.

Examples of the UV absorbers and weather-resistant stabilizers include hindered amine compounds such as 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butyl malonate, and 4-[3-(3,5-di-t-butyl-4-hydroxyphenyl)propionyloxy]-1-{2-[3-(3,5-di-t-butyl-4-hydroxyphenyl)propionyloxy]ethyl}-2,2,6,6-tetramethylpiperidine; benzotriazole compounds such as 2-(2-hydroxy-5-methylphenyl)benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole, and 2-(3,5-di-t-amyl-2-hydroxyphenyl)benzotriazole; benzoate compounds such as 2,4-di-t-butylphenyl-3,5-di-t-butyl-4-hydroxybenzoate, and hexadecyl-3,5-di-t-butyl-4-hydroxybenzoate; and the like.

These UV absorbers and weather-resistant stabilizers may be used either individually or in combination of two or more.

Although there are no specific limitations to the amount of the UV absorbers and weather-resistant stabilizers, these additives are usually used in an amount of 0.001 to 5 parts by weight, and preferably 0.01 to 2 parts by weight for 100 parts by weight of the hydrogenated ring-open polymer.

As examples of the antistatic agent, long-chain alkyl alcohols such as stearyl alcohol and behenyl alcohol; sodium alkyl sulfonate and/or phosphonium salt of alkyl sulfonic acid; fatty acid esters such as glycerol ester of stearic acid; hydroxyamine compounds; amorphous carbon, tin oxide powder, antimony-containing tin oxide powder; and the like can be given. The antistatic agent is usually used in an amount of 0.001 to 5 parts by weight for 100 parts by weight of the hydrogenated ring-open polymer.

As an example of the method for preparing the resin composition of the present invention, a method of melt-kneading the hydrogenated ring-open polymer of the present invention together with the Antioxidant And other optional additives using a twin-screw kneader, for example, at 200 to 400° C., and producing pellets, granules, or powder from the kneaded product can be given.

The resin composition obtained in this manner has excellent processability. The film thickness fluctuation, when a monolayer film is prepared from the hydrogenated ring-open polymer or the resin composition of the present invention by a known T-die melt extruder, is usually not more than 10 μm, and preferably not more than 7 μm. In no case is a die line not produced for a long time during a continuous film forming operation. The period of time for which the film can be formed without producing a die line is usually 10 hours or more, and more preferably 15 hours or more.

The term "die line" refers to a streak, observable with the naked eye, continuously generated along the direction of extrusion of the resin at the position of the molded article corresponding to the specific position of the die. More specifically, the die line is a streak formed on the surface of the molded article consisting of irregularities (concaves and convexes) with a height of about 0.3 μm to 100 μm. Smaller concaves and convexes cannot be observed with the naked eye.

3) Resin film or sheet

The resin film or sheet of the present invention (hereinafter referred to from time to time as "resin film and the like of the present invention") can be obtained by molding the hydrogenated ring-open polymer or the resin composition of the present invention.

There are no specific limitations to the method of molding the hydrogenated ring-open polymer or the resin composition of the present invention. Either a heat-melting molding method or a solution cast method may be used.

The heat-melting molding method is a method of fluidizing the molding material by heating at a temperature above Tm, but lower than the thermal cracking temperature of the polymer, and molding the fluidized material into a film or sheet.

The heat-melting molding method includes an extrusion molding method, a calendar molding method, a compression molding method, an inflation molding method, an injection molding method, a blow molding method, an extension molding method, and the like.

It is possible to apply the extension molding method to a film produced by the extrusion molding method, calendar molding method, inflation molding method, or the like.

The heating conditions and pressure conditions in the heat-melting molding method may be appropriately selected according to the type of molding machine and properties of the hydrogenated ring-open polymer. A temperature in the range usually from Tm to (Tm+100° C.), and preferably from (Tm+20° C.) to (Tm+50° C.) is applied under a pressure of usually from 0.5 to 100 MPa, and preferably from 1 to 50 MPa.

The reaction time is usually from about several seconds to several tens of minutes.

The hydrogenated ring-open polymer of the present invention has a comparatively high Tm and high heat resistance, but becomes fluid at a temperature between 200° C. and 400° C. by a remarkable reduction in the viscosity.

Although the reason is not clear, the polymer is thought to rapidly decrease in viscosity at a temperature in the above range by forming a liquid crystal state due to the crystalline properties. Therefore, the hydrogenated ring-open polymer of the present invention flows well in spite of the high melting temperature and can be molded into a film or a sheet in a short time.

On the other hand, the solution cast method is a method of dissolving the resin composition of the present invention in an organic solvent, casting the solution on a plane or a roll, and removing the solvent by heating to obtain a film and a sheet.

As the solvent used, the same solvents as previously mentioned in connection with the ring-opening polymerization of 2-norbornene, the ring-opening copolymerization of 2-norbornene and substituent-containing norbornene monomers, and hydrogenation of the norbornene ring-open polymer may be given.

The solution cast method is carried out at a temperature at which the solvent volatilizes. The molding temperature is thus appropriately determined according to the type of the solvent used.

The molded article may be annealed in order to increase crystallinity.

There are no specific limitations to the thickness of the resin film and the like of the present invention. The thickness is usually 1 μm to 20 mm, preferably 5 μm to 5 mm, and more preferably 10 μm to 2 mm. A film is not distinguished from a sheet by any specific definition, although these terms are sometimes distinguished according to the thickness, the names (film or sheet) used according to the application and the practice in the industry.

Since the hydrogenated ring-open polymer molded into the film or the like of the present invention has a melting point and, therefore, possesses a crystalline structure, the polymer forms crystalline areas in the molded film or sheet. The crystalline areas improve the mechanical properties such as tensile breaking elongation and the like in combination with amorphous areas, and yet allows the film or the sheet to exhibit excellent transparency due to the small size of the crystals.

In order to increase the mechanical strength and steam barrier properties, the film or the sheet may be stretched to increase the crystallinity. This is an operation of applying plastic deformation to a sheet or film by stretching the length of the molded film or sheet 1.1 to 10 times. The plastic deformation has an effect of orienting amorphous chains, not to mention crystalline chains, by internal friction caused by stretching.

The resin film of the present invention may be a laminate of a layer containing the hydrogenated ring-open polymer and a layer containing other polymers.

As the other polymers, rubber-like polymers and other resins may be given. The same polymers and resins previously mentioned as those used together with the hydrogenated ring-open polymer may be given as specific examples of such other polymers.

Although the number of the layers to be laminated is usually two or three, the film or the sheet may be a multilayer laminate consisting of more than three layers. The order of the types of polymers in layers of the three or more multilayer laminate may be determined according to the purpose and application.

In addition, it is possible to dispose layers of the same polymer separated by a layer of another polymer. For example, it is possible to form a three layer laminate having a layer containing polystyrene sandwiched between two layers containing the hydrogenated ring-open polymer, or to form a four layer laminate having a layer containing a hydrogenated styrene-isoprene block copolymer disposed on either side of the three layer laminate.

As the laminating method, a method of pasting two layers by applying an adhesive between them, a method of bonding a monolayer or a multilayer film or sheet at a temperature above the melting point by heat or high frequency, a method of preparing a dispersion or solution of the hydrogenated ring-open polymer or the other polymers in an organic solvent, applying the dispersion or solution to the surface of the film or sheet of the other polymers or the hydrogenated ring-open polymer, and drying the dispersion of the solution, and the like can be given.

A laminate may also be produced by co-extruding the hydrogenated ring-open polymer and the other polymers from an extruder.

The resin film and the like of the present invention have excellent steam barrier properties, heat resistance, oil resistance, and mechanical properties such as tensile breaking elongation. The film and the like have an advantage of a wide processing temperature range due to the high thermal decomposition temperature.

The resin film and the like of the present invention have excellent mechanical properties. The tensile breaking elongation of the resin film and the like of the present invention measured based on ISO 527 is usually 25% or more, and preferably 30% or more.

The resin film and the like of the present invention have excellent steam barrier properties. The resin film or sheet of the present invention with a thickness of 100 μm has a moisture permeability ($g/(m^2 \cdot 24\,h)$) measured based on JIS K7129 (Method A) of usually $0.5(g/(m^2 \cdot 24\,h))$ or less, and preferably $0.4(g/(m^2 \cdot 24\,h))$ or less.

The resin film and the like of the present invention have excellent oil resistance. In a test comprising preparing a test specimen with a dimension of 10 mm×100 mm×1 mm by heat-pressing the resin composition of the present invention, applying salad oil to the surface of the test specimen, and securing the test specimen for one hour to a curved aluminum jig made by cutting an elliptic cylinder with a height of 10 mm having an ellipse form side with a major axis of 200 mm and a minor axis of 80 mm into equal four divisions, the test specimen did not produce cracks.

The resin film of the present invention which has these features can be used for a wide variety of applications in the fields of food industries, medical supplies, displays, energy, optical appliances, electric and electronic parts, telecommunications sector, vehicles, public welfare, civil engineering and construction, and the like.

The fields in which the resin film of the present invention is particularly useful include the fields of food industries, medical supplies, energy, displays, and the like.

Applications in the fields of food industries include food packaging, such as a wrap film, a shrink film, and a film for blister packages of processed foods such as ham, sausage, pouch-packed food, and frozen food, dried food, specified health food, rice, confectionery, and meat, and the like.

In the medical field, the resin film of the present invention may be used as a medical bottle plug, an infusion bag, an intravenous drip bag, a film for a press through package (PTP), a film for blister packages, and the like.

In the energy fields, the resin film of the present invention may be used as an auxiliary component material of a solar energy power generation system, a fuel-cell peripheral component, an alcohol-containing fuel system component, and a packing film of these components.

In the display field, the resin film of the present invention may be used as a barrier film, a phase difference film, a polarization film, an optical diffusion sheet, a condensing sheet, and the like.

4) Molding Material and Molded Article

The molding material of the present invention is characterized by containing a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C., the amount of organic substances discharged from the molding material when heated at 80° C. for 60 minutes being not more than 1 ppm.

Specifically, this hydrogenated norbornene ring-open polymer used as the molding material of the present invention is the same as the hydrogenated norbornene ring-open polymer of the present invention described above, except that weight average molecular weight (Mw) determined by gel permeation chromatography (GPC) or the molecular weight distribution (Mw/Mn) of the hydrogenated norbornene ring-open polymer is not particularly limited, when such a polymer is obtained by hydrogenating 80% or more of main-chain carbon-carbon double bonds of a ring-open polymer which is obtained by ring-opening polymerization of 2-norbornene (hydrogenated 2-norbornene ring-open polymer). The polymers mentioned above as preferable examples of the hydrogenated norbornene ring-open polymer of the present invention are the preferable hydrogenated norbornene ring-open polymers used as the molding material of the present invention.

The monomer mixture used for producing the hydrogenated norbornene ring-open polymer used for the molding material of the present invention comprises usually 90 to 100 wt %, preferably 95 to 99 wt %, and more preferably 97 to 99 wt % of 2-norbornene and usually 0 to 10 wt %, preferably 1 to 5 wt %, and more preferably 1 to 3 wt % of substituent-containing norbornene monomers.

The proportion of the repeating unit (A) derived from 2-norbornene with respect to all repeating units of the hydrogenated norbornene ring-open polymer used for the molding material of the present invention is usually 90 to 100 wt %, preferably 95 to 99 wt %, and more preferably 97 to 99 wt %, and the proportion of the repeating unit (B) derived from the substituent-containing norbornene monomer with respect to all repeating units of the hydrogenated norbornene ring-open polymer is 0 to 10 wt %, preferably 1 to 5 wt %, and more preferably 1 to 3 wt %.

If the proportion of the repeating units (B) is within the above range, the resin has excellent heat resistance and discharges only a very small amount of organic substances, and the resulting molded article generates resin powder (foreign matter) by friction and the like only with difficulty. If the proportion of the repeating units (B) is too large, the resin may have impaired heat resistance and may discharge an increased amount of organic substances, and the resulting molded article tends to generate foreign matter by friction and the like with ease. If the proportion of the repeating units (B) is too small, the resulting molded article tends to easily generate foreign matter by friction.

The molding material of the present invention comprises one or more of the above hydrogenated norbornene ring-open polymers and, to an extent not affecting the object of the present invention, may optionally contain additives such as an antioxidant (stabilizer), an UV absorber, a weather-resistant stabilizer, an antistatic agent, other polymers such as a thermoplastic resin and a soft polymer, a lubricant, and the like.

The content of the hydrogenated norbornene ring-open polymer in the molding material of the present invention is usually 50 wt % or more, preferably 70 wt % or more, and more preferably 90 wt % or more. When the content is in this range, heat resistance and other characteristics such as the properties of discharging a minimal amount of organic compounds are not affected.

If an antioxidant is added, a molded article of which the mechanical strength is reduced only with difficulty can be obtained.

There are no specific limitations to the antioxidant. A phenol-based antioxidant, a phosphorus-containing antioxidant, a sulfur-containing antioxidant, a sulfur-containing antioxidant, a lactone-containing antioxidant, and the like can be given as examples.

As the phenol-based antioxidant, known phenol-based antioxidants such as acrylate phenol compounds disclosed in JP-A-63-179953 and JP-A-1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl) ethyl)phenyl acrylate;
alkyl-substituted phenol compounds such as 2,6-di-t-butyl-4-methylphenol, 2,6-di-t-butyl-4-ethylphenol, octadecyl-3-(3, 5-di-t-butyl-4-hydroxyphenyl)propionate, 2,2'-methylene-bis(4-methyl-6-t-butylphenol), 4,4'-butylidene-bis(6-t-butyl-m-cresol), 4,4'-thio-bis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1, 1-dimethylethyl)-2,4,8,10-tetraoxaspiro[5,5]undecane, 1,1, 3-tris(2-methyl-4-hydroxy-5-t-butylphenyl)butane, 1,3,5-trimethyl-2,4,6-tris(3,5-di-t-butyl-4-hydroxybenzyl) benzene, tetrakis(methylene-3-(3',5'-di-t-butyl-4'-hydroxyphenylpropionate)methane) [e.g. pentaerythrimethyltetrakis(3-(3,5-di-t-butyl-4-hydroxyphenyl)propionate)], triethylene glycol bis(3-(3-t-butyl-4-hydroxy-5-methylphenyl)propionate), and tocophenol;
triazine group-containing phenol compounds such as 6-(4-hydroxy-3,5-di-t-butylanilino)-2,4-bisoctylthio-1,3,5-triazine, 6-(4-hydroxy-3,5-dimethylanilino)-2,4-bisoctylthio-1,3, 5-triazine, 6-(4-hydroxy-3-methyl-5-t-butylanilino)-2,4-bisoctylthio-1,3,5-triazine, and 2-octylthio-4,6-bis-(3,5-di-t-butyl-4-oxyanilino)-1,3,5-triazine; and the like can be given.

As the phosphorous-containing antioxidant, known phosphorous-containing antioxidants including mono-phosphite compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl)phosphite, tris(2-t-butyl-4-methylphenyl)phosphite, tris(cyclohexylphenyl)phosphite, 2,2-methylene-bis(4,6-di-t-butylphenyl)octylphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene;
diphosphite compounds such as 4,4'-butylidene-bis(3-methyl-6-t-butylphenyl-di-tridecylphosphite), 4,4'-isopropylidene-bis(phenyl-di-alkyl($C_{12}$ to $C_{15}$)phosphite), 4,4'-isopropylidene-bis(diphenyl-mono-alkyl($C_{12}$ to $C_{15}$) phosphite), 1,1,3-tris(2-methyl-4-di-tridecylphosphite-5-t-butylphenyl)butane, tetrakis(2,4-di-t-butylphenyl)-4,4'-biphenylenediphosphite, cyclic neopentan-tetra-yl-bis(iso-decylphosphite), cyclicneopentan-tetra-yl-bis(nonylphenylphosphite), cyclicneopentan-tetra-yl-bis(2,4-di-t-butylphenylphosphite), cyclicneopentan-tetra-yl-bis(2, 4-dimethylphenylphosphite), cyclic neopentan-tetra-yl-bis (2,6-di-t-butylphenylphosphite); and the like can be given.

Examples of sulfur-containing antioxidants include dilauryl 3,3-thiodipropionate, dimyristyl 3,3'-thiodipropionate, distearyl 3,3-thiodipropionate, laurylstearyl 3,3-thiodipropionate, pentaerythritoltetrakis(β-laurylthiopropionate), 3,9-bis(2-dodecylthioethyl)-2,4,8,10-tetraoxaspiro[5,5]undecane, and the like.

Although any compounds containing a lactone structure may be used as a lactone-based antioxidant without particular limitation, an aromatic lactone compound is preferable, and a compound having a benzofuranone skeleton is more preferable, with 3-arylbenzofuran-2-one having an aryl group as a substituent on the side chain of the furan ring being even more preferable. As an specific example, 5,7-di-t-butyl-3-(3,4-dimethylphenyl)-3H-benzofuran-2-one can be given.

Among these antioxidants, an alkyl-substituted phenolic antioxidant is particularly preferable in the present invention. In order to prevent volatilization, an antioxidant with a vapor pressure of not higher than $10^{-6}$ Pa at 20° C. is preferable.

The antioxidants may be used either individually or in combination of two or more.

The amount of the antioxidant used in the present invention may be appropriately determined in a range not impairing the effect of the present invention. Such an amount is usually from 0.001 to 5 parts by weight, and preferably from 0.01 to 1 part by weight for 100 parts by weight of the hydrogenated ring-open polymer.

Examples of the UV absorbers and weather-resistant stabilizers include hindered amine compounds such as 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butyl malonate, and 4-[3-(3,5-di-t-butyl-4-hydroxyphenyl)propionyloxy]-1-{2-[3-(3,5-di-t-butyl-4-hydroxyphenyl)propionyloxy]ethyl}-2, 2,6,6-tetramethylpiperidine; benzotriazole compounds such as 2-(2-hydroxy-5-methylphenyl)benzotriazole, 2-(3-t-butyl-2-hydroxy-5-methylphenyl)-5-chlorobenzotriazole, 2-(3, 5-di-t-butyl-2-hydroxyphenyl)-5-chlorobenzotriazole, and 2-(3,5-di-t-amyl-2-hydroxyphenyl)benzotriazole; benzoate compounds such as 2,4-di-t-butylphenyl-3,5-di-t-butyl-4-hydroxybenzoate, and hexadecyl-3,5-di-t-butyl-4-hydroxybenzoate; and the like. These UV absorbers and weather-resistant stabilizers may be used either individually or in combination of two or more.

The amount of the UV absorbers and weather-resistant stabilizers is usually from 0.001 to 5 parts by weight, and preferably 0.01 to 2 parts by weight for 100 parts by weight of the hydrogenated ring-open polymer.

The antistatic agent is added to provide an antistatic effect.

As examples of the antistatic agent, long-chain alkyl alcohols such as stearyl alcohol and behenyl alcohol; sodium alkyl sulfonate and/or phosphonium salt of alkyl sulfonic acid; fatty acid esters such as glycerol ester of stearic acid; hydroxyamine compounds; amorphous carbon, tin oxide powder, antimony-containing tin oxide powder; and the like can be given.

The antistatic agent is usually used in an amount of 0.001 to 50 parts by weight for 100 parts by weight of the hydrogenated ring-open polymer.

Other polymers such as a thermoplastic resin and a soft polymer are added in order to improve mechanical properties and moldability.

As examples of the thermoplastic resin, polyolefins such as low density polyethylene, high density polyethylene, linear low density polyethylene, super-low density polyethylene, polypropylene, polybutene, and polypentene; polyesters such as polyethyleneterephthalate and polybuthyleneterephthalate; polyamides such as nylon 6 and nylon 6,6; ethylene-ethyl acrylate copolymer, ethylene-vinyl acetate copolymer, polystyrene, polyphenylene sulfide, polyphenylene ether, polyamide, polyester, polycarbonate, and the like can be given.

As the soft polymer, a polymer of which at least one glass transition temperature (Tg) is 40° C. or less may be used without particular limitation. For example, random or block copolymers of an aromatic vinyl monomer and a conjugated diene type monomer and hydrogenated product thereof such as a styrene-butadiene block copolymer, a styrene-butadiene-styrene block copolymer, a styrene-isoprene block copolymer, a styrene-isoprene-styrene block copolymer, and a styrene-butadiene random copolymer; polyisopropyrene rubber; polyolefin rubbers such as an ethylene-propylene copolymer, an ethylene-α-olefin copolymer, and a propylene-α-olefin copolymer; diene copolymers such as an ethylene-propylene-diene copolymer, an α-olefin-diene copolymer, a diene copolymer, an isobutylene-isoprene copolymer, and an isobutylene-diene copolymer; norbornene-based rubbers such as a copolymer of a norbornene monomer and ethylene, or an α-olefin, a ternary copolymer of a norbornene monomer and ethylene or an α-olefin, and a ring-open polymer of a norbornene monomer; and the like can be given.

A lubricant is added in order to improve moldability.

As a lubricant, a partial ester of a polyhydric alcohol, a full ester of a polyhydric alcohol (a compound in which 95% or more of alcoholic hydroxyl groups of polyhydric alcohol is esterified), a saturated higher alcohol, a partial ether of a polyhydric alcohol, and the like can be given. Of these, the full ester of polyhydric alcohol is preferable, with a full ester of a polyhydric alcohol and an OH group-containing saturated higher fatty acid and a saturated higher fatty acid being particularly preferable. In order to prevent volatilization during molding, a lubricant with a vapor pressure of not higher than $10^{-6}$ Pa at 20° C. is preferable.

Although the amount of lubricant may be appropriately selected according to the purpose of use, the lubricant is usually used in an amount of 0.001 to 10 parts by weight, and preferably 0.01 to 5 parts by weight for 100 parts by weight of the hydrogenated ring-open polymer.

The molding material of the present invention may further contain other additives such as a light stabilizer, a near-infrared absorbent, a coloring agent such as a dye and a pigment, a lubricant, a plasticizer, an anti blocking agent, a fluorescent bleach, a deodorant, an organic or inorganic filler, a crosslinking agent, a vulcanizing agent, a wax, and the like.

The amount of these other additives may be arbitrarily determined to the extent that the object of the present invention is not impaired.

When the molding material of the present invention is a resin composition, there are no specific limitations to the method for preparing the resin composition. A method of melting and mixing the hydrogenated ring-open polymer and the additives using a kneader such as a mono-axial extruder, biaxial extruder, a roller, a Banbury mixer, and the like may be given.

The amount of organic substances discharged from the molding material of the present invention when heated at 80° C. for 60 minutes is not more than 1 ppm, preferably not more than 150 ppb, more preferably not more than 50 ppb, more preferably not more than 20 ppb, and particularly preferably not more than 10 ppb. If the amount of organic substances discharged from the molding material is in the above range, there will be no possibility that the resulting molded articles discharge organic substances. A molding material providing this property is preferable particularly when the molded article is a wafer carrier for semiconductor production, since the wafer is not polluted with the organic substances.

The amount of organic substances discharged may be determined by, for example, a method of washing 5 g of the molding material sample with a large amount of ultra pure water in a clean room (class 1000), placing the sample in a glass sample container completely free from moisture and organic substances adhering to the surface, heating the sample container at 80° C. for 60 minutes, and measuring gases discharged from the sample container by a heat desorption gas chromatography mass spectrometer (e.g. TDS-GC-MS manufactured by Agilent Technologies).

In order to obtain the molding material discharging not more than 1 ppm of organic substances when heated at 80° C. for 60 minutes, it is only necessary to remove as many volatile components such as solvents as possible from the hydrogenated ring-open polymer after filtration.

As the method of removing the solvents and the like, a coagulation method, a direct drying method, and the like can be given.

The coagulation method is a method of removing solvents by mixing the polymer solution with a poor solvent for the polymer to precipitate the polymer and separating the coagulated components from the liquid.

Examples of the poor solvent used include polar solvents such as alcohols such as, for example, methyl alcohol, ethyl alcohol, n-propyl alcohol, and isopropyl alcohol; ketones such as acetone and methyl ethyl ketone; and esters such as ethyl acetate and butyl acetate.

After separating the coagulated components from the liquid, it is preferable that the resulting small polymer crumb be heated and dried to remove the solvent.

A direct drying technique is a method of removing solvents by heating the polymer solution under reduced pressure. This method may be carried out using a commonly known apparatus, for example, a thin film drier such as a centrifugal thin-film continuous vaporization dryer, a surface-scraping heat-exchange continuous reactor dryer, a high-viscosity reactor, or the like. The degree of vacuum and the temperature are not particularly limited and are suitably selected according to the apparatus used.

After removing the solvent by the coagulation method or the direct drying technique, it is preferable to further heat and dry under reduced pressure of usually 10 kPa or less, and preferably 3 kPa or less at a temperature of usually 200° C. or more, preferably 220° C. or more, and more preferably 240° C. or more. These drying conditions allow almost no unreacted monomers and solvents to remain in the polymer and thus reduce organic substances volatilizing from the formed articles.

It is preferable that the content of transition metals of the molding material of the present invention be not more than 1 ppm. If the content of transition metals is not more than 1 ppm, there is no possibility of elusion of metals from the molded articles. When the molded article is a wafer carrier for semiconductor production, this feature of the present invention is particularly preferable. Since metals are not eluted by washing with an acid or alkali, the wafer carrier is not polluted with the eluted metals.

There are no particular limitations to the type of transition metals. These metals are mixed in from the polymerization catalyst, hydrogenation catalyst, environmental foreign matter, and manufacturing equipment, and mainly originate from the polymerization catalyst and hydrogenation catalyst used in the process.

The content of transition metals in the molding material may be determined by inductively coupled plasma optical emission spectrometry using, for example, IRIS Advantage/SSEA, manufactured by Nippon Jarrell-Ash Co. Ltd.

As a method for obtaining the molding material with a transition metal content of not more than 1 ppm, a method of hydrogenating the ring-open polymer using a heterogeneous catalyst and filtering the resulting hydrogenation reaction solution, a method of treating the solution of the hydrogenated ring-opening polymer or the solution of the resin composition obtained by adding the additives to the hydrogenated ring-opening polymer (hereinafter referred to from time to time as "resin solution") with an adsorbent to adsorb the metal atoms, a method of repeatedly washing the resin solution with an acidic solution and pure water in turn, and the like can be given. Among these methods, the method of hydrogenation using a heterogeneous catalyst and filtering the resulting hydrogenation reaction solution is preferable.

As the method for hydrogenation using a heterogeneous catalyst and filtering the resulting hydrogenation reaction solution, a method of hydrogenating using a heterogeneous catalyst, followed by (i) filtering the hydrogenation reaction solution through a filter having a charge capturing function or (ii) filtering the hydrogenation reaction solution at least twice using a mechanical filter having pores with a diameter of 0.5 μm or less, preferably 0.3 μm or less, may be given.

Among these, the method (i) is preferred because the method (i) has high capability of removing fine foreign matter which may pass through pores of a mechanical filter and preventing regeneration of foreign matter due to re-coagulation after filtration.

The filter having a charge capturing function is a filter which can capture and remove electrically-charged foreign matter. As the filter having a charge capturing function, a filter of which the filtering material is charged, for example, a zeta potential filter which is controlled by a zeta potential, can be given.

As the zeta potential filter, a filter made from a material provided with a cationic charge modifier and the like may be given.

As examples of the cationic charge modifier, a cellulose fiber/silica/cationic charge modifier (polyamine epichlorohydrin resin, aliphatic polyamine, etc.) described in Published Japanese Translation of PCT Application 4-504379, etc., melamine formaldehyde cationic colloid, inorganic cationic colloidal silica, and the like may be given.

In addition, a product commercially available from CUNO K.K. under the trademark of "Zeta Plus" may be used as a filter made from a material provided with a cationic charge modifier.

Furthermore, in order to increase the processing capacity, a mechanical filter may be used in combination with the filter having a charge capturing function. From the viewpoint of processing efficiency, it is preferable that the hydrogenation reaction solution be first filtered by a mechanical filtration, and then by the charge capture function.

Any mechanical filters which are not damaged by a solvent may be used without particular limitation. For example, fiber filters or membrane filters made from polypropylene, polyethylene, or PTFE; fiber filters made from cellulose; glass fiber filters; filters made from an inorganic substance such as diatomaceous earth; and filters made from a metal fiber can be given.

Although not particularly limited, the pore diameter of the mechanical filters is usually 10 μm or less, preferably 5 μm or less, and more preferably 1 μm or less. Either one mechanical filter or a combination of two or more mechanical filters may be used.

The molding material of the present invention also exhibits excellent heat resistance. The heat resistance of the molding material of the present invention may be confirmed by, for example, allowing a wafer carrier for semiconductor production produced from the molding material to stand at a temperature of 105° C. for 30 minutes and observing whether or not the wafer carrier is deformed. No deformation will be found in the wafer carrier produced from the molding material of the present invention.

For ease of handling during a molding operation, the molding material of the present invention is processed into grains the size of rice called pellets.

The molded article according to the present invention is obtained by forming the molding material of the present invention.

There are no specific limitations to the shape and size of the molded article of the present invention. The molded article of the present invention includes a product of which a part is molded from the molding material of the present invention.

The molded article of the present invention can be produced by a known molding method using the molding material of the present invention. As the molding method, injection molding, calendar molding, inflation molding, extrusion blow molding, injection blow molding, multilayer blow molding, connection blow molding, double wall blow molding, stretch blow molding, vacuum molding, rotational molding, press molding, melt extrusion molding, and the like can be given. Among these methods, injection molding is preferable from the viewpoint of mass production.

A known injection molding machine may be used for injection molding.

The resin temperature (cylinder temperature) is usually from (Tm+5° C.) to (Tm+200° C.), and preferably from (Tm+20° C.) to (Tm+150° C.).

The cylinder residence time of the molding material of the present invention is usually within one hour, preferably within 30 minutes, and more preferably within 10 minutes. When the molding material is injection-molded under these conditions, the thermal decomposition (degradation) of the resin is prevented and generation of low molecular weight organic compounds is controlled.

When a certain period of time is required before molding the molding material after preparation, the prepared molding material is preferably stored in a sealed container, for example, a stainless container.

The molded article obtained in this manner produces foreign matter such as resin powder by friction or the like only with difficulty.

The difficulty in producing foreign matter from the molded article can be confirmed as follows, for example. First, in a clean room (class 1000), an 8-inch new bear silicon wafer purchased in a state packed in a polypropylene wafer shipper is immersed in a 4.5 wt % solution of hydrofluoric acid at 25° C. for one minute to remove a thin silicon oxide film. Next, the silicon wafer is immersed in a 50:1 (volume ratio) mixed solution of 98% concentrated sulfuric acid and 30% aqueous solution of hydrogen peroxide at 110° C. for 10 minutes, then in concentrated sulfuric acid at 65° C. for 10 minutes to remove organic substances. Next, after washing away acids with a large amount of ultra-pure water and completely removing the water by a centrifugal separator, the number of foreign matter particles on the dried wafer is counted using a foreign matter detector (for example, Surfscan SP1 manufactured by KLA-Tencor corp.). After the wafer is inserted in and removed from the molded wafer carrier 50 times, the number of foreign matter particles on the wafer is counted again. The increase in the number of foreign matter particles in the test is usually 250 or less, preferably 230 or less, and more preferably 200 or less.

Since the molded article of the present invention has excellent heat resistance, discharges only a small amount of organic substances, and generates only a small amount of foreign matter, the molded article can be suitably used as a material for fabricating electron processing instruments. More particularly, such electron processing instruments include (A) instruments coming in contact with electronic parts such as semiconductors such ICs and LSIs, hybrid ICs liquid crystal display elements, and light emitting diodes, (B) instruments coming in contact with intermediate materials such as a wafer, a liquid crystal substrate, and a product obtained by laminating a transparent electrode layer, a protective layer, etc. with the wafer or liquid crystal substrate, and (C) instruments coming in contact with a process solution used for treating an intermediate material in the manufacturing process of electronic parts such as a chemical solution or ultra-pure water.

As (A) an instrument coming in contact with electronic parts and (B) an instrument coming in contact with an intermediate material for manufacturing electronic parts, containers for processing or transporting such as a tank, a tray, a carrier, a case, or a shipper; protective materials such as a carrier tape and a separation film; and the like can be given. As the instruments (C) coming in contact with a process solution, piping instruments such as a pipe, a tube, a valve, a flowmeter, a filter, and a pump; fluid containers such as a sampling container, a bottle, an ampoule, and a bag; and the like can be given.

Among these, the wafer carrier for semiconductor production is particularly preferable. Since the surface of the wafer carrier for semiconductor production of the present invention is damaged or has foreign matter attached thereto only with difficulty during storage and transportation, electronic parts and the like with high accuracy can be obtained by using the wafer carrier for semiconductor production of the present invention.

The molded article of the present invention may also be used as optical recording media such as an optical disc (e.g. a CD, a CD-ROM, a laser disc, a digital videodisc, etc.), an optical card, and an optical tape; an optical lens, a prism, a beam splitter, a lens prism, an optical mirror, an optical fiber, an LED sealing material, a substrate for liquid crystal display, a film for liquid crystal display, a lightguide plate for liquid crystal display, an optical film, a packing container for food, a packing container medical supplies, and the like.

The wafer carrier for semiconductor production of the present invention (hereinafter may be referred to from time to time as "carrier") must have a structure enabling the wafers to be held, removed, and inserted without causing them to come in contact with each other, and to be subjected to heat treatment or chemical treatment by dipping or the like. Specifically, the wafers must be stored with planes held in parallel without coming into contact with each other and each wafer must be removed or inserted in the direction parallel to the plane.

Specifically, the wafers can be stored in a state in which a wafer and a space are alternately arranged up in layers so that the wafers are held in a framework provided with grooves or projections immovable in any direction except for the extraction direction. In addition, in order to ensure efficient and uniform heat treatment and dipping in chemicals, the wafer carrier has an inlet port for allowing a liquid or the like to flow into the spaces between the wafers from a direction other than the wafer extracting direction.

Specific examples of such carriers include those described in JP-A-2-63112, JP-A-2-143545, JP-A-2-161745, JP-A-3-95954, the carrier described in FIG. 1, and those specified in the SEMI specification.

5) Multilayer Laminate

The multilayer laminate of the present invention is a laminate having two or more resin layers. At least one layer is a layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer. The proportion of the repeating unit (A) derived from the 2-norbornene with respect to all repeating units is 90 to 100 wt % and the proportion of the repeating unit (B) derived from the substituent-containing norbornene monomer with respect to all repeating units is 0 to 10 wt %, and the hydrogenated norbornene ring-open polymer has a melting point of 110 to 145° C.

Specifically, the hydrogenated norbornene ring-open polymer used as the multilayer laminate of the present invention is the same as the hydrogenated norbornene ring-open polymer of the present invention described above, except that weight average molecular weight (Mw) determined by gel permeation chromatography (GPC) or the molecular weight distribution (Mw/Mn) of hydrogenated norbornene ring-open polymer is not particularly limited if such a polymer is obtained by hydrogenating 80% or more of main-chain carbon-carbon double bonds of a ring-open polymer which is obtained by ring-opening polymerization of 2-norbornene (hydrogenated 2-norbornene ring-open polymer). The polymers mentioned above as preferable examples of the hydrogenated norbornene ring-open polymer of the present invention are the preferable hydrogenated norbornene ring-open polymers used as the multilayer laminate of the present invention.

The monomer mixture used for producing the hydrogenated norbornene ring-open polymer used for the multilayer laminate of the present invention comprises usually 90 to 100 wt %, preferably 95 to 99 wt %, and more preferably 97 to 99 wt % of 2-norbornene and usually 0 to 10 wt %, preferably 1 to 5 wt %, and more preferably 1 to 3 wt % of substituent-containing norbornene monomers.

The proportion of the repeating unit (A) derived from 2-norbornene with respect to all repeating units of the hydrogenated norbornene ring-open polymer used for the multilayer laminate of the present invention is usually 90 to 100 wt %, preferably 95 to 99 wt %, and more preferably 97 to 99 wt %, and the proportion of the repeating unit (B) derived from the substituent-containing norbornene monomer with respect to all repeating units of the hydrogenated norbornene ring-open polymer is 0 to 10 wt %, preferably 1 to 5 wt %, and more preferably 1 to 3 wt %.

Various additives may be added to the hydrogenated norbornene ring-open polymer used for the multilayer laminate of the present invention according to the purpose of application. Examples of the additives include antioxidants, rubber-like polymers and other resins, UV absorbers, weather-resistant stabilizers, antistatic agents, slipping agents, anticlouding agents, dyes, pigments, coloring agents, natural oils, synthetic oils, plasticizers, organic or inorganic fillers, antibacterial agents, deodorants, and the like.

An antioxidant having a molecular weight of 700 or more is preferably used. If the molecular weight of the antioxidant is too small, the molded article may allow the antioxidant to elute therefrom.

As specific examples of the antioxidant, phenolic antioxidants such as octadecyl-3-(3,5-di-t-butyl-4-hydroxyphenyl) propionate, tetrakis[methylene-3-(3',5'-di-t-butyl-4'-hydroxyphenyl)propionate]methane, and pentaerythrityl tetrakis[3-(3,5-di-t-butyl-4-hydroxyphenyl)propionate]; phosphorus antioxidants such as triphenylphosphite, tris(cyclohexylphenyl)phosphite, and 9,10-dihydro-9-oxa-10-phosphaphenanthrene; sulfur-containing antioxidants such as dimyristyl-3, 3'-thiodipropionate, distearyl-3,3'-thiodipropionate, laurylstearyl-3,3'-thiodipropionate, and pentaerythritoltetrakis($\beta$-laurylthiopropionate); and the like can be given. These antioxidants may be used either individually or in combination of two or more. Among these, phenolic antioxidants are preferable.

The amount of the antioxidant to be added is usually 0.01 to 1 part by weight, and preferably 0.05 to 0.5 parts by weight for 100 parts by weight of the hydrogenated norbornene ring-open polymer. If the amount of the antioxidant is too small, the molded article may be burnt (colored) with ease. On the other hand, if the amount is too large, the molded article may be whitened or allow the antioxidant to elute therefrom.

The rubber-like polymers are polymers having a glass transition temperature of 40° C. or less and include rubbers and thermoplastic elastomers. When the polymer has two or more glass transition temperatures as in the case of a block copolymer, such a polymer may be used as the rubber-like polymer if the lowest glass transition temperature is not more than 40° C. Although the viscosity of the rubber-like polymer may be suitably selected according to the purpose of use, the Mooney viscosity ($ML_{1+4}$, 100° C.) is usually 5 to 300.

As examples of the rubber-like polymer, an ethylene-α-olefin rubber; an ethylene-α-olefin polyene copolymer rubber; a copolymer of ethylene and unsaturated carboxylate such as ethylene-methyl methacrylate and ethylene-butyl acrylate; a copolymer of ethylene and a fatty acid vinyl ester such as an ethylene-vinyl acetate copolymer; a polymer of alkyl acrylate such as ethyl acrylate, butyl acrylate, hexyl acrylate, 2-ethylhexyl acrylate, and lauryl acrylate; diene rubbers such as polybutadiene, polyisoprene, a random copolymer of styrene and butadiene or isoprene, an acrylonitrile butadiene copolymer, a butadiene isoprene copolymer, a butadiene-alkyl (meth)acrylate copolymer, a butadiene-alkyl (meth)acrylate-acrylonitrile copolymer, and a butadiene-alkyl (meth)acrylate-acrylonitrile-styrene copolymer; a butylene-isoprene copolymer; block copolymers of aromatic vinyl conjugated diene such as a styrene-butadiene block copolymer, a hydrogenated styrene-butadiene block copolymer, a hydrogenated styrene-butadiene random copolymer, a styrene-isoprene block copolymer, and a hydrogenated styrene-isoprene block copolymer; a low crystalline polybutadiene resin, an ethylene-propylene elastomer, a styrene-grafted ethylene-propylene elastomer, a thermoplastic polyester elastomer, an ethylene ionomer resin, and the like can be given.

The amount of the rubber-like polymers is suitably selected according to the purpose of use. When impact resistance and pliability are demanded, the amount of the rubber-like polymers is usually in a range from 0.01 to 100 parts by weight, preferably from 0.1 to 70 parts by weight, and more preferably from 1 to 50 parts by weight for 100 parts by weight of the hydrogenated norbornene ring-open polymer.

As examples of the other resins, an amorphous norbornene ring-open polymer, an amorphous hydrogenated norbornene ring-open polymer, a crystalline norbornene addition polymer, an amorphous norbornene addition polymer, a low density polyethylene, a high density polyethylene, a linear low density polyethylene, a super-low density polyethylene, an ethylene-ethyl acrylate copolymer, an ethylene-vinyl acetate copolymer, polypropylene, polystyrene, hydrogenation polystyrene, polymethyl methacrylate, polyvinyl chloride, polyvinylidene chloride, polyphenylene sulfide, polyphenylene ether, polyamide, polyester, polycarbonate, cellulose triacetate, polyether imide, polyimide, polyallylate, polysulfone, polyether sulfone, and the like can be given. These resins may be used either individually or in combination of two or more in any proportion not affecting the purpose of the present invention.

Examples of the UV absorbers and the weather-resistant stabilizers include hindered amine compounds such as 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butyl malonate, and 4-[3-(3,5-di-t-butyl-4-hydroxyphenyl)propionyloxy]-1-{2-[3-(3,5-di-t-butyl-4-hydroxyphenyl)propionyloxy]ethyl}-2,2,6,6-tetramethylpiperidine; benzotriazole compounds such as 2-(2-hydroxy-5-methylphenyl)benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole, and 2-(3,5-di-t-amyl-2-hydroxyphenyl)benzotriazole; benzoate compounds such as 2,4-di-t-butylphenyl-3,5-di-t-butyl-4-hydroxybenzoate, and hexadecyl-3,5-di-t-butyl-4-hydroxybenzoate; and the like. These UV absorbers and the weather-resistant stabilizers may be used either individually or in combination of two or more. The amount of the UV absorbers and the weather-resistant stabilizers is usually from 0.001 to 5 parts by weight, and preferably 0.01 to 2 parts by weight for 100 parts by weight of the hydrogenated norbornene ring-open polymer.

As examples of the antistatic agent, long-chain alkyl alcohols such as stearyl alcohol and behenyl alcohol; sodium alkylsulfonate and/or phosphonium salt of alkylsulfonic acid; fatty acid esters such as glycerol ester of stearic acid; hydroxyamine compounds; amorphous carbon, tin oxide powder, antimony-containing tin oxide powder; and the like can be given. The antistatic agent is usually used in an amount of 0.001 to 5 parts by weight for 100 parts by weight of the hydrogenated norbornene ring-open polymer.

There are no particular limitations to the multilayer laminate of the present invention insofar as the multilayer laminate has two or more resin layers of which at least one layer is a layer containing the hydrogenated ring-open polymer of the present invention. There are also no particular limitations to the other layers (hereinafter may be referred to from time to time as a "synthetic resin layer").

The content of the hydrogenated norbornene ring-open polymer in the layer which contains the hydrogenated norbornene ring-open polymer in the multilayer laminate of the present invention is usually 50 to 100 wt %, preferably 70 to 100 wt %, and more preferably 90 to 100 wt %. When the content is in this range, the characteristics possessed by the hydrogenated norbornene ring-open polymer such as steam barrier properties are not affected.

Although there are no specific limitations, the thickness of the layer containing the hydrogenated norbornene ring-open polymer is usually 1 to 900 μm, preferably 10 to 400 μm, and more preferably 20 to 200 μm. This thickness range is preferable because the characteristics possessed by the hydrogenated norbornene ring-open polymer such as steam barrier properties are not affected.

When the multilayer laminate of the present invention is used for medical application or as a food packing material, it is preferable that at least one of the synthetic resin layers is a layer containing a gas barrier resin.

A multilayer laminate with excellent steam barrier properties, as well as excellent gas barrier properties, can be obtained by using the layer containing a gas barrier resin as the synthetic resin layer.

Since oxygen is the main gas that causes a problem of deterioration of the content and change of the composition, a resin with low oxygen permeability is preferable as the gas barrier resin.

The gas barrier resin has oxygen permeability, when measured as a film with a thickness of 20 μm at 23° C. and 0% RH, of preferably not more than 100 $cm^3 \cdot m^{-2} \cdot day^{-1} \cdot atm^{-1}$, more preferably not more than 50 $cm^3 \cdot m^{-2} \cdot day^{-1} \cdot atm^{-1}$, still more preferably not more than 10 $cm^3 \cdot m^{-2} \cdot day^{-1} \cdot atm^{-1}$, and particularly preferably not more than 1 $cm^3 \cdot m^{-2} \cdot day^{-1} \cdot atm^{-1}$.

As the gas barrier resin, a general purpose resin in the field of packing material and the like can be used. For example, an ethylene-vinyl alcohol copolymer (EVOH), a vinylidene-chloride polymer (PVDC), polyesters with barrier properties such as a polyethylene-isophthalate copolymer, MXD6 nylon (m-xylylene adipamide), nylon with barrier properties (amorphous nylon), polyacrylonitrile, liquid-crystal polyester, all-aromatic nylon (aramid), polyvinyl acetate (PVA) or its hydrolyzate, and the like can be given. A transparent multilayer film such as PVDC-coated biaxial stretching polyethylene terephthalate, PVDC-coated biaxial-stretching polypropylene, and PVDC-coated biaxial stretching polyvinyl alcohol, a vapor deposition film, and the like may also be used.

Of these, an ethylene-vinyl alcohol copolymer (EVOH) is particularly preferable due to its excellent gas barrier properties.

In order to compensate insufficient bending strength, flex resistance, and tensile strength of the layer made only of the hydrogenated norbornene ring-open polymer, the multilayer laminate of the present invention may contain at least one layer of a second synthetic resin in place of, or in combination with, the layer containing a gas barrier resin as the synthetic resin.

Any resin material commonly used for medical application or food packaging may be used as the resin material forming the second synthetic resin layer without particular limitations. As examples, various synthetic resins such as acrylic resins such as a polyolefin resin, polyamide resin, polyester resin, polymethyl methacrylate, polycarbonate, ionomer resin, polystyrene, ABS resin, thermoplastic elastomer, ethylene-carboxylate copolymer, ethylene-vinyl acetate copolymer, polysulfone, polyvinyl chloride, and fluororesin can be given. Among these resins, at least one resin selected from the group consisting of a polyolefin resin, a polyamide resin, and a polyester resin is preferable.

As examples of the polyolefin resin, polyethylene resins such as a linear or branched ethylene-α-olefin copolymer, high density polyethylene, low density polyethylene, linear low density polyethylene, and ultra-high molecular weight polyethylene; polypropylene resins such as homopolypropylene, ethylene-propylene random copolymer, ethylene-propylene block copolymer, ethylene-propylene-1-butene copolymer; polyolefin resins shown by the group consisting of ethylene-propylene copolymer, polymethylpentene, polybutene, polymethylbutene, polymethylhexene and the like; amorphous polyolefin resins such as alicyclic structure-containing polymers described in JP-A-2001-143323; and the like can be given.

As the polyamide resin, nylon 6, nylon 66, nylon 610, nylon 6T, and the like can be given.

As examples of polyester resin, polyethylene terephthalate, polybuthylene terephthalate, and polyethylene naphthalate can be given.

These synthetic resin layers are used as a monolayer of a resin or a multilayer laminate of two or more layers. The type of synthetic resin and the layer constitution can be appropriately selected according to the purpose of use.

As the second synthetic resin layer, a layer containing a polyolefin resin is preferably used, a layer containing polyethylene or polypropylene is more preferable due to excellent low elusion properties, chemical resistance, and oil resistance, and a layer containing polypropylene is particularly preferable due to excellent heat resistance and transparency in addition to the above properties.

The multilayer laminate of the present invention may be combined with a transparent vapor deposition film in order to provide gas barrier properties and weather (light) resistance.

In addition, a metallic foil such as an aluminum foil, an aluminum vapor deposition film, a laminate film of a metallic foil and a synthetic resin film, a layer which has a light blocking effect (shading layer) such as a synthetic resin film with a pigment incorporated therein may be provided.

The following combinations of layers can be given as specific examples of the layer constitution of the multilayer laminate of the present invention. In the following constitutions, the layer containing the hydrogenated norbornene ring-open polymer is indicated as "NB layer" and the other resin layers are indicated as "synthetic resin layer".

(1) NB layer/synthetic resin layer
(2) NB layer/synthetic resin layer/NB layer
(3) Synthetic resin layer/NB layer/synthetic resin layer
(4) NB layer/synthetic resin layer/synthetic resin layer/NB layer
(5) NB layer/synthetic resin layer/NB layer/synthetic resin layer
(6) NB layer/synthetic resin layer/NB layer/synthetic resin layer/NB layer
(7) Synthetic resin layer/synthetic resin layer/NB layer/synthetic resin layer/synthetic resin layer
(8) Synthetic resin layer/NB layer/synthetic resin layer/NB layer/synthetic resin layer
(9) NB layer/synthetic resin layer/shading layer
(10) NB layer/synthetic resin layer/shading layer/synthetic resin layer
(11) NB layer/shading layer The multilayer bodies of the present invention are not limited to the above combinations. It is possible to employ other desired multilayer constitutions according to the purpose of use, such as those having a larger number of layers in addition to any one of the above layer combinations.

For example, when the multilayer laminate of the present invention includes a layer containing a resin having gas barrier properties, it is necessary for such a resin layer to not come in contact with water in order to maintain the gas barrier performance. For this reason, a packing material made from the multilayer laminate having a gas barrier resin layer of the present invention is preferably provided with a layer containing the hydrogenated norbornene ring-open polymer on the side being exposed to the outside, when it is desired to prevent permeation of moisture and oxygen from the outside. When the content of the package is an aqueous solution and the like, it is preferable that a layer containing the hydrogenated norbornene ring-open polymer be provided on the side being exposed to the content of the package.

In the multilayer laminate of the present invention, an adhesive layer consisting of an intercalation adhesive may be optionally provided between the layers.

There are no particular limitations to the intercalation adhesive insofar as the adhesive does not adversely affect the film properties. As examples, an adhesive rubber, an adhesive thermoplastic resin, an adhesive thermoplastic elastomer, thermosetting adhesives such as an epoxy resin, a silicone resin, and an urethane resin, thermoplastic adhesives such as polyvinyl ether, an acrylic resin, and a vinyl acetate-ethylene copolymer, a hotmelt polyamide resin adhesive, rubber adhesives such as nitrile rubber, and the like may be given. Among these, a urethane adhesive and an adhesive olefin polymer are preferable.

The synthetic resin layer of the multilayer laminate of the present invention may contain an additive which may be used with the hydrogenated norbornene ring-open polymer.

The multilayer laminate of the present invention may be obtained by molding the hydrogenated ring-open polymer of the present invention or a resin composition containing the hydrogenated ring-open polymer of the present invention and additives, and a resin used for the synthetic resin layer or a resin composition containing the resin used for the synthetic resin layer and additives by a known molding method.

Although not particularly limited, the method of molding the multilayer laminate of the present invention includes, for example, a coextrusion molding method such as a coextrusion T-die method, a coextrusion inflation method, and a coextrusion lamination method; film lamination molding methods such as dry lamination; a coating mold method in which a resin solution is applied to a substrate resin film, a calendar molding method, a heat press molding method, an injection molding method, and the like.

The molding conditions are suitably selected according to the type of the resin used.

There are no particular limitations to the shape of the multilayer laminate of the present invention. When used as a packing material, the multilayer laminate may usually be in the form of a film or a sheet, but may be in the form of a tube.

The multilayer laminate of the present invention may usually be unstretched, but may be stretched as required.

The stretching may be carried out by any method such as a roll method, a tenter method, and a tube method. The stretching conditions are suitably selected according to the type of the resin used.

Although there are no specific limitations, the thickness of the multilayer laminate of the present invention obtained by the above-mentioned method is usually 5 to 1000 μm, preferably 20 to 500 μm, and more preferably 30 to 300 μm. If the thickness is more than the above maximum thickness, the multilayer laminate does not have pliability; if the thickness is less than the above minimum thickness, the multilayer laminate has insufficient strength and tends to be ruptured easily.

Printing may be applied to the multilayer laminate of the present invention.

A common printing method such as letterpress printing, hand gravure printing, and surface printing may be used without particular limitation. A suitable printing ink may be appropriately selected according to the printing method. For example, a letterpress ink, a flexographic ink, a dry offset ink, a photogravure ink, a photogravure offset ink, an offset ink, and a screen ink may be given.

In order to improve adhesion of the ink, it is preferable to apply a surface treatment to the printing layer before applying a printing ink. As the method of surface treatment, a corona discharge treatment, a plasma discharge treatment, a flame treatment, an emboss processing treatment, a sand mat processing treatment, a satin processing treatment, and the like can be given.

The multilayer laminate of the present invention is excellent also in impact resistance. The impact resistance may be confirmed by layering two sheets of the multilayer laminate with a thickness of 50 μm, preparing a 20 cm×20 cm bag by sealing the sides with heat, putting brine in the bag, and dropping the bag from a height of 3 m. The presence or absence of cracks immediately after dropping is determined with the naked eye. Excellent impact resistance can be confirmed if there are almost no cracks observed.

The multilayer laminate of the present invention has excellent steam barrier properties. The moisture permeability of the multilayer laminate with a thickness of 50 μm of the present invention is usually 3 g/(m$^2$·24 h) or less, preferably 2.5 g/(m$^2$·24 h) or less.

The steam barrier properties can be measured according to JIS K7129 (method A), for example, using a moisture permeability tester (L80-5000 type, manufactured by LYSSY) under the conditions of a temperature of 50° C. and humidity of 90% RH.

The multilayer laminate having at least one layer containing a gas barrier resin has excellent gas barrier properties. The oxygen permeability of the multilayer laminate having at least one layer containing a gas barrier resin with a thickness of 50 m of the present invention is usually 0.5 cm$^3$·m$^{-2}$·day$^{-1}$·atm$^{-1}$ or less, and preferably 0.35 cm$^3$·m$^{-2}$·day$^{-1}$·atm$^{-1}$ or less.

The multilayer laminate having at least one layer containing a gas barrier resin shows almost no decrease in the oxygen permeability after having been left under high temperature and high humidity conditions (e.g. after having been left in boiling water for 30 minutes).

The gas barrier properties of the multilayer laminate can be evaluated by dipping a bag made of the multilayer laminate of the present invention in boiling water for 30 minutes and measuring the gas barrier properties before and after boiling according to JIS K7126 (method B) under the conditions of a temperature of 23° C. and humidity of 0% RH using an oxygen permeability tester (OPT-5000 type, manufactured by LYSSY), for example.

The multilayer laminate of the present invention is excellent in oil resistance. The oil resistance can be evaluated by cutting a 5 cm square from the film to obtain a sample, dipping the sample in salad oil (manufactured by Nisshin Oillio Group, Ltd.) for 30 seconds, and placing the sample in an oven heated at 40° C., and measuring the period of time elapsed before the outward appearance of the sample changes. The oil resistance of the multilayer laminate of the present invention is indicated by the number of days before the film is whitened, which is usually four days, preferably five days, and more preferably six days.

The fields in which the multilayer laminate of the present invention is particularly useful include, in addition to the fields of foods, medical supplies, displays, energy, and other industrial fields, wrapping materials for toys, household goods, and the like. A packing material with a desired shape and size may be prepared by secondary fabrication of the multilayer laminate of the present invention as mentioned later.

Due to possession of excellent steam barrier properties and impact resistance, the multilayer laminate of the present invention is suitably used for applications requiring hot water sterilization, retorting, hot filling, steam sterilization, and the like. When at least one layer contains a gas barrier resin, the multilayer laminate of the present invention exhibits only a small change in the gas barrier properties under high temperature and high humidity conditions. For example, medical-related containers or films for packing bags such as an infusion solution bag, PTP (press-through package), and a syringe; films for a food container or a packing bag and a blister pack such as a retort pack requiring heat sterilization, a jelly or pudding container, a container for processed foods such as ham, sausage, and frozen food, containers for dried food, specified health food, rice, confectionery, and meat, as well as lids for these containers, and hot-fill containers; a film and a blister pack for packaging containers or packing bag for precision components such as electric and electronic parts, semiconductor parts, and printed circuit boards; a heat-shrinkable film and blister pack of packing material for storing and transporting foods, medicines, instruments, miscellaneous goods such as stationery supplies and notebooks; a film and a blister pack for tamper-resistant seal packing materials such as a cap and a plug; a film for heat-shrinkable label material for containers, solar energy power generation system components, fuel cell components, and alcohol-containing fuel system components, as well as films and blisters for these components; and the like can be given.

6) Packing Material

The packing material of the present invention is obtained by secondary fabrication of the multilayer laminate of the present invention.

There are no particular limitations to the method of secondary fabrication. Press molding, vacuum molding, air-pressure forming, heat-sealing, and melt bonding can be given as examples.

As the manner of heat-sealing, the innermost layer of the multilayer laminate is folded or two multilayer bodies are layered and the periphery of the circumference is heat-sealed by side sealing, two-way sealing, three-way sealing, four-way sealing, envelope sealing, pillow sealing, diaphragm sealing, flat bottom sealing, cornered bottom sealing, or the like.

Various generally known heat-sealing methods may be employed without particular limitations. A bar seal method, a rotation roll seal method, a belt seal method, an impulse sealing method, a high frequency seal method, and an ultrasonic seal method can be given as examples. The packing material may be provided with a one-piece-type or two-piece-type injection port, a zipper for opening and closing, and the like.

As a blister molding method for fabricating a pocket, an appropriate method such as heat-press forming, drum vacuum forming, plug die forming, pin molding, preheater pressure forming, preheater plug-assist pressure forming, and the like may be used. A pocket with a shape such as a cylinder, a dome, an ellipse dome and a size conforming to the object to be contained may be prepared by the blister molding.

The packing material of the present invention has excellent steam barrier properties, mechanical properties such as impact resistance, and oil resistance, and when possessing at least one layer containing a gas barrier resin, has excellent gas barrier properties in a high temperature and high humidity environment. Therefore, the packing material is suitable for a medical supply packing container, a food packing container, and the like.

7) Medical Supply Packing Material

The medical supply packing material of the present invention has at least one resin layer of a layer of a hydrogenated norbornene ring-open polymer obtained by hydrogenating 80% or more of carbon-carbon double bonds of a ring-open polymer which is obtained by ring-opening polymerization of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer with respect to all repeating units being 0 to 10 wt %, and the hydrogenated norbornene ring-open polymer having a melting point of 110 to 145° C.

Specifically, the hydrogenated norbornene ring-open polymer used as the medical supply packing material of the present invention is the same as the hydrogenated norbornene ring-open polymer of the present invention described above, except that weight average molecular weight (Mw) determined by gel permeation chromatography (GPC) or the molecular weight distribution (Mw/Mn) of hydrogenated norbornene ring-open polymer may not be particularly limited, when such a polymer is obtained by hydrogenating 80% or more of main-chain carbon-carbon double bonds of a ring-open polymer which is obtained by ring-opening polymerization of 2-norbornene (hydrogenated 2-norbornene ring-open polymer). The polymers mentioned above as preferable examples of the hydrogenated norbornene ring-open polymer of the present invention are preferable hydrogenated norbornene ring-open polymers used as the medical supply packing material of the present invention.

The monomer mixture used for producing the hydrogenated norbornene ring-open polymer used for the medical supply packing material of the present invention comprises usually 90 to 100 wt %, preferably 95 to 99 wt %, and more preferably 97 to 99 wt % of 2-norbornene and usually 0 to 10 wt %, preferably 1 to 5 wt %, and more preferably 1 to 3 wt % of the substituent-containing norbornene monomers.

The proportion of the repeating unit (A) derived from 2-norbornene with respect to all repeating units of the hydrogenated norbornene ring-open polymer used for the medical supply packing material of the present invention is 90 to 100 wt %, preferably 95 to 99 wt %, and more preferably 97 to 99 wt %, and the proportion of the repeating unit (B) derived from the substituent-containing norbornene monomer with respect to all repeating units of the hydrogenated norbornene ring-open polymer is 0 to 10 wt %, preferably 1 to 5 wt %, and more preferably 1 to 3 wt %.

Various additives may be added to the hydrogenated norbornene ring-open polymer used for the medical supply packing material of the present invention according to the purpose of application. Examples of the additives include antioxidants, rubber-like polymers and other resins, UV absorbers, weather-resistant stabilizers, antistatic agents, slipping agents, anticlouding agents, dyes, pigments, coloring agents, natural oils, synthetic oils, plasticizers, organic or inorganic fillers, antibacterial agents, deodorants, and the like. As specific examples of the additives used for the medical supply packing material of the present invention, the same additives as those used for the multilayer laminate of the present invention may be given. As specific examples of the additives preferably used for the medical supply packing material of the present invention, the same additives as those preferably used for the multilayer laminate of the present invention may be given.

The medical supply packing material of the present invention may be made of only a resin layer containing the hydrogenated ring-open polymer of the present invention or made of a multilayer laminate which contains, in addition to at least one resin layer containing the hydrogenated norbornene ring-open polymer of the present invention, a synthetic resin layer which contains at least one other layer.

The medical supply packing material of the multilayer laminate is preferable due to increased oil resistance, pliability, impact resistance, heat resistance, and the like.

The content of the hydrogenated ring-open polymer in the resin layer which contains the hydrogenated ring-open polymer in the medical supply packing material of the present invention is usually 50 to 100 wt %, preferably 70 to 100 wt %, and more preferably 90 to 100 wt %. The content of the hydrogenated ring-open polymer in this range is preferable because the characteristics possessed by the hydrogenated ring-open polymer such as steam barrier properties are not impaired.

Although there are no specific limitations, the thickness of the layer containing the hydrogenated ring-open polymer is usually 1 to 500 μm, preferably 10 to 150 μm, and more preferably 20 to 100 μm. This thickness range is preferable because the characteristics possessed by the hydrogenated ring-open polymer such as steam barrier properties are not impaired.

Any resins that are used for medical applications may be used as the other resins without a particular limitation. Examples include various synthetic resins such as a polyolefin resin, polyethylene terephthalate, polybuthylene terephthalate, polymethylmethacrylate, polycarbonate, ionomer resin, polystyrene, ABS resin, thermoplastic elastomer, nylon, ethylene-vinyl acetate copolymer, ethylene-vinyl alcohol copolymer (EVOH), nylon, polysulfone, and the like.

Among these resins, the polyolefin resin is particularly preferable because of its effect of improving mechanical properties, oil resistance, and the like of the medical supply packing material.

As examples of the polyolefin resin, polyolefin crystalline resins shown by the group consisting of polyethylene resins such as a linear or branched high density polyethylene, low density polyethylene, and ultra-high molecular weight polyethylene; polypropylene resins such as linear or branched high density polypropyrene and low density polypropyrene; ethylene-propylene copolymer, polymethylpentene, polybutene, polymethylbutene, and polymethylhexene; and the like can be given.

Among these, the polyethylene-containing synthetic resin layer is preferably used for fabricating multilayer laminate. The multilayer laminate obtained by using such a synthetic resin layer exhibits excellent low elusion properties, oil resistance, and chemical resistance. Furthermore, low density polyethylene, which has a density of 0.88 to 0.94 g/cm$^3$ measured according to JIS K6922, has superior transparency in addition to these excellent properties.

In addition, a gas barrier resin such as an ethylene-vinyl alcohol copolymer, nylon, or the like is preferable as a layer to be laminated to promote the gas barrier properties of the resulting multilayer laminate.

In the medical supply packing material of the present invention, in addition to the resin layer containing the hydrogenated ring-open polymer and the synthetic resin layer containing the other resins, a metallic foil such as an aluminum foil, an aluminum vapor deposition film, a laminate film of a metallic foil and a synthetic resin film, a layer which has a light blocking effect (shading layer) such as a synthetic resin film with a pigment incorporated therein may be provided.

There are no particular limitations to the constitution of the multilayer laminate used for the medical supply packing material of the present invention inasmuch as such a multilayer laminate contains at least the resin layer containing the hydrogenated ring-open polymer and the synthetic resin layer containing the other resins. As specific examples, the following combinations of layers can be given. In the following constitutions, the resin layer containing the hydrogenated ring-open polymer is indicated as "NB layer" and the synthetic resin layers containing the other resin are indicated as "synthetic resin layer".

(1) NB layer/synthetic resin layer
(2) NB layer/synthetic resin layer/NB layer
(3) Synthetic resin layer/NB layer/synthetic resin layer
(4) NB layer/synthetic resin layer/synthetic resin layer/NB layer
(5) NB layer/synthetic resin layer/NB layer/synthetic resin layer
(6) NB layer/synthetic resin layer/NB layer/synthetic resin layer/NB layer
(7) Synthetic resin layer/synthetic resin layer/NB layer/synthetic resin layer/synthetic resin layer
(8) Synthetic resin layer/NB layer/synthetic resin layer/NB layer/synthetic resin layer
(9) NB layer/synthetic resin layer/shading layer
(10) NB layer/synthetic resin layer/shading layer/synthetic resin layer
(11) NB layer/shading layer It is possible to employ other desired multilayer constitutions according to the purpose of use, such as those having a larger number of layers in addition to any one of the above layer combinations.

In the medical supply packing material of the present invention, an adhesive layer may be optionally provided between the layers.

As the adhesive, the same adhesives that are given as the adhesive to be used in the multilayer laminate can be given.

In the synthetic resin layer of the medical supply packing material of the present invention, the synthetic resin layer which contains the other resins may contain additives which may be used with the hydrogenated norbornene ring-open polymer.

When the medical supply packing material of the present invention is a monolayer material, such a monolayer material may be obtained by molding the hydrogenated ring-open polymer of the present invention or a resin composition containing the hydrogenated ring-open polymer and additives (hereinafter may be referred to from time to time as "resin composition (1)") by a known molding method.

As an example of the method for preparing the resin composition (1), a method of melt-kneading the hydrogenated ring-open polymer and the additives using a twin-screw kneader, for example, at 200 to 400° C., and producing pellets, granules, or powder from the kneaded product can be given.

There are no particular limitations to the method of molding the hydrogenated ring-open polymer or the resin composition (1). Generally known methods, for example, the molding method such as a T-die method, an inflation method, or a lamination method; the film lamination mold method such as dry lamination; heat-press molding method; injection molding method; and the like may be appropriately used. The molding conditions are suitably selected according to the type of the resin used.

When the medical supply packing material of the present invention is a multilayer material, such a multilayer material may be obtained by molding the hydrogenated ring-open polymer or the resin composition (1) and a resin composition containing the other resin and other additives (hereinafter may be referred to from time to time as "resin composition (2)") by a known molding method.

The resin composition (2) may be prepared in the same manner as the resin composition (1).

In the present invention, the molded article may be annealed in order to increase crystallinity.

In order to increase the mechanical properties and steam barrier properties, the medical supply packing material may be stretched to increase the crystallinity. This is an operation of applying plastic deformation to a sheet or film by stretching the length of the molded film or sheet 1.1 to 10 times. The plastic deformation has an effect of orienting amorphous chains, not to mention of crystalline chains, by internal friction caused by stretching.

The medical supply packing material of the present invention may be usually a film or a sheet, but may be a tube. If processed by an inflation method, the product has a form of a tube (a cylinder). A bag can be prepared by a simple process of cutting the tube and sealing one open side. When the inflation method is used, it is preferable to have a die lip clearance of 2.5 mm or more in order to prevent melt flow fracture due to the shearing stress when the resin is extruded at a high speed (8 m/min or more).

In this instance, the molding temperature in terms of the die temperature is preferably 180 to 210° C. If the die temperature is 210° C. or higher, burning (discoloration) and fish eyes tend to occur easily and film formation (molding) becomes difficult due to a decrease of melt viscosity. The screw compression ratio is preferably not more than 3.0. If the screw compression ratio is more than 3.0, self-heating may increase and molding will become difficult.

Although there are no specific limitations, the thickness of the medical supply packing material obtained in the manner as described above is usually 100 to 500 μm, preferably 150 to 350 μm, and still more preferably 200 to 300 μm. If the thickness of the packing material is more than the above maximum thickness, the film does not have pliability; if the thickness is less than the above minimum thickness, the medical supply packing material has insufficient strength and tends to rupture easily.

The medical supply packing material of the present invention may be obtained by molding the hydrogenated ring-open polymer or the resin composition (1) or the hydrogenated ring-open polymer or the resin composition (1) and the other resin or the resin composition (2) into a film or a sheet and subjecting the film or the sheet to secondary processing.

Although not particularly limited, press molding, vacuum molding, pressure forming, heat-sealing, and melt bonding can be given as examples of the secondary processing. Of these, heat-sealing is preferable.

As the manner of heat-sealing, the innermost layer of the multilayer films or multilayer sheets is folded or two multilayer sheets or films are layered and the periphery of the circumference is heat-sealed by side sealing, two-way sealing, three-way sealing, four-way sealing, envelope sealing, pillow sealing, diaphragm sealing, flat bottom sealing, cornered bottom sealing, or the like.

Various generally known heat-sealing methods may be employed without particular limitation. A bar seal method, a rotation roll seal method, a belt seal method, an impulse sealing method, a high frequency seal method, and an ultrasonic seal method can be given as examples. The packaging material may be provided with a one-piece-type or two-piece-type injection port, a zipper for opening and closing, and the like.

The medical supply packing material of the present invention obtained in the above-described manner only has small unevenness in the film thickness. If unevenness of the film thickness is large and the thickness varies in different areas of the film, the rolled-up film contains hard swollen portions (lumps) which cause a problem during printing or heat-sealing.

An uneven film thickness of the medical supply packing material of the present invention can be evaluated by, for example, applying five marks on the film at 4 cm intervals in the direction (TD direction) vertical to the flow direction of the film, applying 20 marks at 20 cm intervals in the flow direction (MD direction) of the film starting from the first five marks, thereby applying 100 marks in total, and measuring the film thickness at the 100-mark points. The smaller the value of the standard deviation calculated from the thickness measurement result, the smaller the thickness unevenness. In the medical supply packing material of the present invention, the standard deviation of a film with a thickness of 250 μm is not more than 10 μm.

The medical supply packing material of the present invention obtained in this manner has excellent steam barrier properties. The medical supply packing material of the present invention with a thickness of 250 μm has moisture permeability measured based on JIS K7129 (Method A) at a temperature of 50° C. at 90% RH of usually 2 $g/(m^2 \cdot 24\ h)$ or less, preferably 1.5 $g/(m^2 \cdot 24\ h)$ or less, and more preferably 1 $g/(m^2 \cdot 24\ h)$ or less. If the moisture permeability is within this range, mixing of moisture into the medicine packed in the medical supply packing material is suppressed and quality deterioration of the drug can be prevented.

The medical supply packing material of the present invention has an excellent modulus of elasticity. It is desirable that modulus of elasticity of a sample of the medical supply packing material of the present invention having an IB shape and a thickness of 250 μm measured according to ISO 527 at a tensile velocity of 200 mm/min using Autograph (AGS-5kNH, manufactured by Shimadzu Corp.) is not more than 500 MPa. If the modulus of elasticity is not more than 500 MPa, the medical supply packing material has excellent pliability and can transfer a medical fluid at a uniform flow rate when used as an infusion solution bag. If the modulus of elasticity is more than 500 MPa, on the other hand, the infusion solution bag is hard and it is difficult to transfer a medical fluid at a uniform flow rate.

The medical supply packing material of the present invention also has excellent oil resistance. When the oil resistance evaluation value (haze of untreated sample/haze after applying salad oil) is 0.8 or more, the medical supply packing material is resistant to oil and has its appearance or performance impaired only with difficulty when oil is attached to the surface.

The medical supply packing material of the present invention has excellent mechanical properties. Distortion of the medical supply packing material of the present invention at the time of a surface crack measured using a sample having an IB shape and a thickness of 250 μm according to ISO 527 at a tensile velocity of 200 mm/min using Autograph (AGS-5kNH, manufactured by Shimadzu Corp.) is usually 20% or more, preferably 25% or more, and more preferably 30% or more. When the distortion is within this range, cracks and ruptures occur only with difficulty in the medical supply packing material.

As specific examples of the medical supply packing material, a medical-related container such as an infusion solution bag and a PTP (press through package); a film or a sheet for packing a syringe; and the like can be given. An infusion solution bag is the particularly preferable application.

8) Blister Molding Sheet

The blister molding sheet of the present invention has at least one layer of a resin which is obtained by hydrogenating 80% or more of carbon-carbon double bonds of a ring-open polymer obtained by ring-opening polymerization of 2-norbornene or a monomer mixture of 2-norbornene and a substituent-containing norbornene monomer, the proportion of a repeating unit (A) derived from the 2-norbornene with respect to all repeating units being 90 to 100 wt % and the proportion of a repeating unit (B) derived from the substituent-containing norbornene monomer in all repeating unit being 0 to 10 wt %, and the hydrogenated norbornene ring-open polymer having a melting point of 110 to 145° C.

Specifically, the hydrogenated norbornene ring-open polymer used as the blister molding sheet of the present invention is the same as the hydrogenated norbornene ring-open polymer of the present invention described above, except that the weight average molecular weight (Mw) determined by gel permeation chromatography (GPC) or the molecular weight distribution (Mw/Mn) of the hydrogenated norbornene ring-open polymer may not be particularly limited if such a polymer is obtained by hydrogenating 80% or more of main-chain carbon-carbon double bonds of a ring-open polymer which is obtained by ring-opening polymerization of 2-norbornene (hydrogenated 2-norbornene ring-open polymer). The polymers mentioned above as preferable examples of the hydrogenated norbornene ring-open polymer of the present invention are preferable hydrogenated norbornene ring-open polymers used as the blister molding sheet of the present invention.

The monomer mixture used for producing the hydrogenated norbornene ring-open polymer used for the blister molding sheet of the present invention comprises usually 90 to 100 wt %, preferably 95 to 99 wt %, and more preferably 97 to 99 wt % of 2-norbornene and usually 0 to 10 wt %, preferably 1 to 5 wt %, and more preferably 1 to 3 wt % of substituent-containing norbornene monomers.

The proportion of the repeating unit (A) derived from 2-norbornene with respect to all repeating units of the hydrogenated norbornene ring-open polymer used for the blister molding sheet of the present invention is usually 90 to 100 wt %, preferably 95 to 99 wt %, and more preferably 97 to 99 wt %, and the proportion of the repeating unit (B) derived from the substituent-containing norbornene monomer with respect to all repeating units of the hydrogenated norbornene ring-open polymer is 0 to 10 wt %, preferably 1 to 5 wt %, and more preferably 1 to 3 wt %.

Various additives may be added to the hydrogenated norbornene ring-open polymer used for the blister molding sheet of the present invention according to the purpose of application. Examples of the additives include antioxidants, rubber-like polymers and other resins, UV absorbers, weather-resistant stabilizers, antistatic agents, slipping agents, anticlouding agents, dyes, pigments, coloring agents, natural oils, synthetic oils, plasticizers, organic or inorganic fillers, antibacterial agents, deodorants, and the like. As specific examples of the additives used for the blister molding sheet of the present invention, the same additives as those used for the multilayer laminate of the present invention may be given. As specific examples of the additives preferably used for the medical supply packing material of the present invention, the same additives as those preferably used for the multilayer laminate of the present invention may be given.

The blister molding sheet of the present invention has at least one resin layer containing the hydrogenated ring-open polymer of the present invention. The blister molding sheet of the present invention may consist only of a layer containing the hydrogenated ring-open polymer or may be a multilayer laminate further comprising at least one synthetic resin layer containing another resin.

The content of the hydrogenated ring-open polymer in the resin layer which contains the hydrogenated ring-open polymer in the blister molding sheet of the present invention is usually 50 to 100 wt %, preferably 70 to 100 wt %, and more preferably 90 to 100 wt %. The content in this range is preferable because the characteristics possessed by the hydrogenated ring-open polymer such as steam barrier properties are not impaired.

Although there are no specific limitations, the thickness of the layer containing the hydrogenated norbornene ring-open polymer is usually 5 to 1000 μm, preferably 5 to 500 μm, more preferably 10 to 300 μm, and still more preferably 20 to 200 μm. The thickness in the above range is preferable because the characteristics possessed by the hydrogenated ring-open polymer such as steam barrier properties are not impaired.

Any resin material commonly used for packing foods, medical supplies, industrial parts, and the like may be used as the other resins. As examples, various synthetic resins such as a polyolefin resin, polyethylene terephthalate, polybuthylene terephthalate, polymethyl methacrylate, polycarbonate, ionomer resin, polystyrene, ABS resin, thermoplastic elastomer, nylon, ethylene-carboxylate copolymer, ethylene-carboxylic acid copolymer, ethylene-vinyl acetate copolymer, ethylene-vinyl alcohol copolymer (EVOH), nylon, polysulfone, polyvinyl chloride, polyvinylidene chloride, and fluororesin can be given.

These synthetic resin layers are used as a monolayer of a resin or a multilayer laminate of two or more layers. The type of the synthetic resin and the layer constitution can be appropriately selected according to the purpose of use.

The blister molding sheet of a multilayer laminate is preferable due to increased mechanical properties, oil resistance, blister moldability, and the like. Among the above synthetic resin layers, a synthetic resin layer containing a polyolefin resin layer or a layer containing a gas barrier resin such as an ethylene-vinyl alcohol copolymer, nylon, or a polyvinylidene chloride as another layer is preferable.

As examples of the polyolefin resin, polyolefin-based crystalline resins shown by the group consisting of a linear or branched ethylene-α-olefin copolymer, polyethylene resins such as high density polyethylene, low density polyethylene, linear low density polyethylene, and ultra-high molecular weight polyethylene; polypropylene resins such as homopolypropylene, an ethylene-propylene random copolymer, an ethylene-propylene block copolymer, and an ethylene-propylene-1-butene copolymer; an ethylene propylene copolymer, polymethylpentene, polybutene, polymethylbutene, polymethylhexene and the like; alicyclic structure-containing polymer resins such as a norbornene polymer, a monocycle cycloolefin polymer, a cyclic conjugated diene polymer, a vinyl alicyclic hydrocarbon polymer, and hydrogenated products of these polymers described in JP-A-2001-143323; and the like can be given.

Among these, the synthetic resin layer containing polyethylene or polypropylene is more preferable due to excellent low elusion properties, chemical resistance, and oil resistance, and a layer containing polypropylene is particularly preferable due to excellent heat resistance and transparency in addition to the above properties.

In addition, a layer containing a gas barrier resin as the synthetic resin layer containing other resins is preferable to improve gas barrier properties.

The blister molding sheet of the present invention may be combined with a transparent vapor deposition film in order to provide gas barrier properties and weather (light) resistance.

In addition, the blister molding sheet of the present invention may be provided with a metallic foil such as an aluminum foil, an aluminum vapor deposition film, a laminate of a metallic foil and a synthetic resin film, a layer which has a light blocking effect (shading layer) such as a synthetic resin film with a pigment incorporated therein.

The synthetic resin layer and the shading layer of the blister molding sheet of the present invention may be a laminate of two or more layers.

It is possible to employ a desired multilayer constitution according to the purpose of use of the blister molding sheet. There are no particular limitations to the constitution of the multilayer laminate used for the blister molding sheet of the present invention inasmuch as such a multilayer laminate contains a layer of the hydrogenated ring-open polymer of the present invention and a layer of the other material. In the following constitutions, the resin layer containing the hydrogenated ring-open polymer is indicated as "NB layer" and the synthetic resin layers containing the other resin are indicated as "synthetic resin layer".

(1) NB layer/synthetic resin layer
(2) NB layer/synthetic resin layer/NB layer
(3) Synthetic resin layer/NB layer/synthetic resin layer (4) NB layer/synthetic resin layer/synthetic resin layer/NB layer
(5) NB layer/synthetic resin layer/NB layer/synthetic resin layer
(6) NB layer/synthetic resin layer/NB layer/synthetic resin layer/NB layer
(7) Synthetic resin layer/synthetic resin layer/NB layer/synthetic resin layer/synthetic resin layer
(8) Synthetic resin layer/NB layer/synthetic resin layer/NB layer/synthetic resin layer
(9) NB layer/synthetic resin layer/shading layer
(10) NB layer/synthetic resin layer/shading layer/synthetic resin layer
(11) NB layer/shading layer In the blister molding sheet of the present invention, an adhesive layer may be optionally provided between the layers.

As specific examples of the adhesive which forms the adhesive layer, an adhesive rubber, an adhesive thermoplastic resin, an adhesive thermoplastic elastomer, thermosetting adhesives such as an epoxy resin, a silicone resin, and a urethane resin, thermoplastic adhesives such as polyvinyl ether, an acrylic resin, and a vinyl acetate-ethylene copolymer, a hotmelt polyamide resin adhesive, rubber adhesives such as nitrile rubber, and the like may be given. Although there are no specific limitations to the extent that the properties of the film are not affected, a urethane adhesive and an adhesive olefin polymer are preferable among these adhesives.

The synthetic resin layer of the blister molding sheet of the present invention may contain an additive which may be used with the hydrogenated norbornene ring-open polymer.

The method for molding the blister molding sheet of the present invention includes, for example, molding methods such as a T-die method, an inflation method, and a coextrusion T-die method, a coextrusion inflation method, a coextrusion lamination method; film lamination molding methods such as dry lamination; a coating mold method in which a resin solution is applied to a substrate resin film, a calendar molding method, a heat press molding method, an injection molding method, and the like.

The molding conditions are suitably selected according to the type of the resin used.

The blister molding sheet of the present invention may be usually unstretched, but may be stretched as required. Stretching can increase the degree of crystallization, mechanical properties, and steam barrier properties.

The stretching may be carried out by any method such as a roll method, a tenter method, and a tube method. Although the stretching conditions are suitably selected according to the type of the sheet used, the sheet is usually stretched about 1.1 to 10 times.

The blister molding sheet of the present invention obtained by the above-mentioned method has a thickness of usually 5 to 1000 μm, preferably 10 to 500 μm, more preferably 30 to 400 μm, and still more preferably 40 to 300 μm. If the thickness of the blister molding sheet is more than the above maximum thickness, the sheet does not have pliability; if the thickness is less than the above minimum thickness, the blister molding sheet has insufficient strength and tends to rupture.

As desired, printing may be applied to the blister molding sheet of the present invention.

A common printing method such as letterpress printing, hand gravure printing, and surface printing may be used without a particular limitation. A suitable printing ink may be appropriately selected according to the printing method. For example, a letterpress ink, a flexographic ink, a dry offset ink, a photogravure ink, a photogravure offset ink, an offset ink, and a screen ink may be given.

In order to improve adhesion of the ink, it is preferable to apply a surface treatment to the printing layer before applying a printing ink. As the method of surface treatment, a corona discharge treatment, a plasma discharge treatment, a flame treatment, an emboss processing treatment, a sand mat processing treatment, a satin processing treatment, and the like can be given.

The fields in which the blister molding sheet of the present invention is particularly useful include, in addition to the fields of food industries, medical supplies, displays, energy, and other industrial fields, toys, household goods, and the like. Since the blister molding sheet does not produce a thickness variation during blister molding, has excellent mechanical strength, and particularly exhibits only a minimal change in the steam barrier properties according to the change in environment, the blister molding sheet is suitable for packing goods to be preserved for a long period of time under natural environmental conditions. For example, the blister molding sheet is suitable for use as a container or a blister pack for medical supplies such as a press through package (PTP), a syringe, and the like; foods; precision components such as electric and electronic parts, semiconductor parts, printed circuit boards; solar energy power generation system components; fuel cell components; alcohol-containing fuel system components; and the like.

9) Blister Molded Article

The blister molded article of the present invention is obtained by forming the blister molding sheet of the present invention.

Specifically, a blister molded article may be obtained by forming the blister molding sheet by a commonly known method to batch-wisely or continuously prepare plastic sheets having one or more concave portions (pockets) to store goods therein (blister molding) and, as required, folding two sides or three sides among the left, right, top and bottom sides with heating (sheet processing) to form cuff parts for inserting substrates or mat boards so that the concave portions may be blocked.

There are no specific limitations to the blister molding method for forming the pockets. For example, (i) a flat board blow molding method of softening the blister molding sheet of the present invention with heat, putting the softened sheet between a lower mold which has a hole to which a high pressure air is supplied and an upper mold which has a pocket-shaped recess, and feeding air to form pockets, (ii) a drum vacuum molding method of softening the blister molding sheet of the present invention with heat and drawing a pocket-shaped recessed portion of a drum having the recessed portion to form pockets, (iii) a plug molding method of softening a pocket-shaped concavo-convex die and pressure-bonding the blister molding sheet of the present invention, and (iv) a plug assist blow molding method of assisting the operation of blow molding in the method (i) by elevating and then moving a convex-shaped plug downward can be given.

The molding conditions are suitably selected according to the type of the blister molding sheet used.

Although there are no particular limitations, heat-sealing, melt bonding, and the like can be given as the method of sheet processing after blister molding.

Various generally known heat-sealing methods may be employed without particular limitation. A bar seal method, a rotation roll seal method, a belt seal method, an impulse sealing method, a high frequency seal method, and an ultrasonic seal method can be given as examples.

The blister molded article may be provided with a one-piece-type or two-piece-type injection port, a zipper for opening and closing, and the like.

The blister molded article of the present invention obtained in this manner has excellent steam barrier properties. The blister molded sheet of the present invention with a thickness of 250 μm has moisture permeability at 50° C. and 90% RH usually of 0.5 g/(m²·24 h) or less, preferably 0.4 g/(m²·24 h) or less, and more preferably 0.3 g/(m²·24 h) or less. If the blister molded sheet has poor steam barrier properties, moisture may mingle with a medication in the PTP and may cause the quality of the medication to deteriorate when the blister molded sheet is used as a PTP for packing the medication.

The blister molded article of the present invention has excellent oil resistance. The oil resistance of the blister molded article can be evaluated by applying salad oil (manufactured by Nisshin Oillio Group, Ltd.) to the convex side (projection side) of the blister molded article and placing the blister molded article in an oven heated at 40° C., and measuring the period of time elapsed before the outward appearance changes. That period of time is usually four days, preferably five days, more preferably six days, and particularly preferably eight days.

The blister molding sheet of the present invention has excellent blister moldability. The blister moldability (recess of the pocket portion) of the blister molding sheet of the present invention may be evaluated by arbitrarily selecting ten sheets of PTP (number of pockets: five lengthwise, two in the lateral direction, ten pockets in total), visually inspecting cylindrical areas of 100 PTPs to count the number of the cylindrical areas of which the bottom is inwardly dented or of which the swelling is defective. The number of such defective cylindrical areas is usually not more than 10, preferably not more than 5, more preferably 1 or 0, and particularly preferably 0.

If there is an unevenness in the pocket of a blister molded article which is processed as a PTP, the bottom of the cylindrical upper part of the pocket may inwardly dent or the cylindrical part may inadequately expand. Blister moldability can be evaluated by evaluating such a dent and inadequate expansion.

As specific examples of the blister molded article, containers and blister packs for medical supplies such as a press through package (PTP), a syringe, and the like; foods; precision components such as electric and electronic parts, semiconductor parts, printed circuit boards; solar energy power generation system components; fuel cell components; alcohol-containing fuel system components; and the like may be given.

As an example of the method for preparing the resin composition, a method of melt-kneading the hydrogenated norbornene ring-open polymer of the present invention together with an Antioxidant And other optional additives using a twin-screw kneader, for example, at 200 to 400° C., and producing pellets, granules, or powder from the kneaded product can be given.

10) Blow-Molded Container

The blow-molded container has at least one resin layer of a hydrogenated norbornene ring-open polymer obtained by hydrogenating 80% or more of carbon-carbon double bonds of a ring-open polymer which is obtained by ring-opening polymerization of 2-norbornene or a monomer mixture of 2-norbornene and a substituent-containing norbornene monomer. The proportion of a repeating unit (A) derived from the 2-norbornene with respect to all repeating units is 90 to 100 wt % and the proportion of a repeating unit (B) derived from the substituent-containing norbornene monomer with respect to all repeating units is 0 to 10 wt %. The hydrogenated norbornene ring-open polymer has a melting point of 110 to 145° C.

Specifically, the hydrogenated norbornene ring-open polymer used as the blow-molded container of the present invention is the same as the hydrogenated norbornene ring-open polymer of the present invention described above, except that the weight average molecular weight (Mw) determined by gel permeation chromatography (GPC) or the molecular weight distribution (Mw/Mn) of the hydrogenated norbornene ring-open polymer may not be particularly limited, when such a polymer is obtained by hydrogenating 80% or more of main-chain carbon-carbon double bonds of a ring-open polymer which is obtained by ring-opening polymerization of 2-norbornene (hydrogenated 2-norbornene ring-open polymer). The polymers mentioned above as preferable examples of the hydrogenated norbornene ring-open polymer of the present invention are preferable hydrogenated norbornene ring-open polymers used as the blow-molded container of the present invention.

The monomer mixture used for producing the hydrogenated norbornene ring-open polymer used for the blow-molded container of the present invention comprises usually 90 to 100 wt %, preferably 95 to 99 wt %, and more preferably 97 to 99 wt % of 2-norbornene and usually 0 to 10 wt %, preferably 1 to 5 wt %, and more preferably 1 to 3 wt % of the substituent-containing norbornene monomers.

The proportion of the repeating unit (A) derived from 2-norbornene with respect to all repeating units of the hydrogenated norbornene ring-open polymer used for the blow-molded container of the present invention is usually 90 to 100 wt %, preferably 95 to 99 wt %, and more preferably 97 to 99 wt %, and the proportion of the repeating unit (B) derived from the substituent-containing norbornene monomer with respect to all repeating units of the hydrogenated norbornene ring-open polymer is 0 to 10 wt %, preferably 1 to 5 wt %, and more preferably 1 to 3 wt %.

Various additives may be added to the hydrogenated norbornene ring-open polymer used for the blow-molded container of the present invention according to the purpose of application. Examples of the additives include antioxidants, rubber-like polymers and other resins, UV absorbers, weather-resistant stabilizers, antistatic agents, slipping agents, anticlouding agents, dyes, pigments, coloring agents, natural oils, synthetic oils, plasticizers, organic or inorganic fillers, antibacterial agents, deodorants, and the like. As specific examples of the additives used for the blow-molded container of the present invention, the same additives as those used for the multilayer laminate of the present invention can be given. As specific examples of the additives preferably used for the blow-molded container of the present invention, the same additives as those preferably used for the multilayer laminate of the present invention can be given.

The blow-molded container of the present invention is a monolayer or multilayer container obtained by blow molding the hydrogenated norbornene ring-open polymer alone or together with other thermoplastic resins.

As the method of blow molding, a method commonly used for blow molding of thermoplastic resins such as direct blow molding, injection blow molding, stretch blow molding, and multilayer blow molding may be used. Among these methods, monolayer or multilayer stretch blow molding is preferable. The method of blow molding will now be described mainly taking the stretch blow molding as an example.

In the stretch blow molding, a preform with a bottom is first prepared by injecting the hydrogenated norbornene ring-open polymer or a mixture of the hydrogenated norbornene ring-open polymer and the other thermoplastic resin. Then, after adjusting the temperature, the preform is molded by biaxial stretching blow molding to obtain a monolayer or multilayer blow-molded article.

The cylinder temperature during molding the preform is preferably 120 to 350° C., more preferably 150 to 300° C., and particularly preferably 160 to 250° C. The cylinder temperature in this range ensures appropriate melt flowability of the resin while suppressing thermal decomposition to obtain a blow-molded container with minimal distortion.

The pressure during preform molding is usually from 0.5 to 100 MPa, and preferably from 1 to 50 MPa. The pressure is applied usually for about several seconds to several tens of minutes.

The preform molded by an injection mold is parted from the injection mold at an injection mold temperature preferably from (Tm−150° C.) to (Tm−10° C.), wherein Tm is a melting point. The injection mold temperature in this range is preferable from the viewpoint of preform shape stability.

When a heating instrument such as a heating pot is used for controlling the preform temperature, the temperature of the heating instrument is set preferably from 80 to 400° C., more preferably from 100 to 300° C., and particularly preferably from 120 to 200° C. If the set temperature is too low, the heating instrument cannot sufficiently function when the preform is heated again; if the temperature is too high, the surface of the preform and the blow-molded container may be yellowed or produce burnt foreign matter.

Although there are no particular limitations, the distance between the heating instrument and preform is preferably 1 to 50 mm, more preferably 2 to 25 mm, and particularly preferably 3 to 10 mm. If the distance between the heating instrument and preform is in this range, the risk for the heating instrument to come in contact with the preform is minimized and the preform can be homogeneously heated.

The blow mold die temperature is appropriately selected according to the type of the hydrogenated ring-open polymer preferably from a range of (Tm−150° C.) to (Tm−10° C.), and more preferably (Tm−130° C.) to (Tm−10° C.), wherein Tm is the melting point of the hydrogenated ring-open polymer. If the blow mold die temperature is in this range, the residual stress decreases and the dimension of the container is stabilized during storing for a long time. The blow pressure of pressurized air or pressurized nitrogen used per one preform is usually 0.1 to 5 MPa, preferably 0.3 to 3 MPa, and more preferably 0.5 to 1 MPa.

In the case of multilayer blow molding of the hydrogenated norbornene ring-open polymer and another thermoplastic resin, these blow molding conditions are suitably adjusted taking the blow molding conditions of the other thermoplastic resin into consideration.

In the process for manufacturing a multilayer preform, molten resins are co-injected into a single preform die cavity through one gate in one die clamping operation by a sequential molding method or a simultaneous molding method using a molding machine having a plural injection cylinders.

In the sequential molding method, injection timing of each resin is adjusted to continuously and alternately inject resins so that the multilayer preform may be produced by disposing the resin injected earlier in inner/outer layers and disposing the resin injected later in the middle layer. In the simultaneous molding method, injection timing of each molten resin from the injection cylinder is adjusted so that, at the initiation, a first resin is injected first and a second resin is injected later. The two resins are injected simultaneously and continuously to produce a multilayer preform with the first resin in the inner/outer layers and the second resin in the middle layer.

The blow molded container of the present invention is preferably a stretch blow molded-container. In the stretch blow molding process, after adjusting to a stretchable temperature, the monolayer or multilayer preform is inserted into a blow molding die cavity, and a pressurized fluid such as air is blown into the cavity to carry out blow molding.

The stretch blow molding may be carried out by either a hot parison system or a cold parison system.

A stretch magnification y in the vertical direction in the stretch blow molding refers to a ratio of the length below the neck of a blow-molded container (stretched part) to the length of the preform below the neck (unstretched part), and a stretch magnification x in the horizontal direction refers to the ratio of the maximum diameter of the container in the horizontal direction to the maximum diameter of the preform in the horizontal direction. The maximum diameter refers to the greatest diameter when the section of the preform and the blow-molded container are circular and to the greatest equivalent diameter when the section is a polygon or an ellipse form.

The stretch magnification y in the vertical direction is preferably 1.1 to 25, more preferably 1.2 to 15, still more preferably 1.5 to 10, and particularly preferably 1.8 to 8. The stretch magnification x in the horizontal direction is preferably 1.1 to 25, more preferably 1.2 to 15, still more preferably 1.5 to 10, and particularly preferably 1.7 to 5. When the stretch magnification y in the vertical direction and the stretch magnification x in the horizontal direction are within these ranges, a stretched blow molded article having excellent transparency and producing cracks only with difficulty in the drop test can be obtained.

The thickness of the blow-molded container is usually 0.1 to 30 mm, preferably 0.3 to 15 mm, and more preferably 0.5 to 10 mm. The blow-molded container has a size of usually 10 to 2000 mm, and preferably 50 to 2000 mm in all of the width, depth, and length. A product obtained by sheet blow molding has a flat shape with a width of usually 10 to 2000 mm, and preferably 50 to 1000 mm and a depth of usually 0.1 to 100 mm, and preferably 0.5 to 50 mm.

The content of the hydrogenated norbornene ring-open polymer in the layer which contains the hydrogenated norbornene ring-open polymer in the blow-molded container of the present invention is usually 50 to 100 wt %, preferably 70 to 100 wt %, and more preferably 90 to 100 wt %. This thickness range is preferable because the characteristics possessed by the hydrogenated norbornene ring-open polymer such as steam barrier properties are not affected.

The thickness of the hydrogenated norbornene ring-open polymer in the layer which contains the hydrogenated norbornene ring-open polymer in the blow-molded container of the present invention is usually 0.005 to 30 mm, preferably 0.01 to 10 mm, and more preferably 0.05 to 5 mm. This thickness range is preferable because the characteristics possessed by the layer containing the hydrogenated norbornene ring-open polymer such as steam barrier properties are not affected.

The blow-molded container may have a shape of a cylinder, a square pillar, a globe, and the like. The cylinder and square pillar are preferable from the viewpoint of impact strength and the like. The blow-molded container may also have a skirt-like shape spreading from the opening toward the bottom, a shape with a swelling in the central part in the height direction, or the like. There are no particular limitations to the bottom shape of the blow-molded article. The blow-molded article may have a flat shape or a shape with a depressed portion toward the inside.

The blow-molded container of the present invention may be provided with a painted pattern design, a printed ornament, and the like on the surface or a part thereof. A surface treatment may be applied to the blow-molded container in order to increase adhesiveness of a printing layer to the blow-molded container. As specific examples of the surface treatment, a corona discharge treatment, a plasma treatment, a flame treatment, a resin application, and a hot stamp can be given.

The blow-molded container may be annealed in order to accelerate crystallization.

Since the hydrogenated norbornene ring-open polymer of the present invention is a crystalline polymer having a melting point, if crystal areas are formed in the polymer forming the blow-molded container, the crystal areas provide the molded container with good mechanical properties in combination with amorphous areas, and yet the polymer maintains excellent transparency due to a small degree of crystallinity.

The blow-molded container of the present invention may be a multilayer blow-molded container having a layer of the hydrogenated norbornene ring-open polymer and another thermoplastic resin layer. Any resin material commonly used for food and medical application may be used as the resin forming the layer of the other thermoplastic resin without particular limitations.

As examples of the thermoplastic resin, various synthetic resins, for example, polyolefin resins such as polyethylene and polypropylene; thermoplastic polyester resins such as polyethylene terephthalate and polybuthylene terephthalate; gas barrier resins such as polyvinylidene chloride, ethylene-vinyl alcohol copolymer (EVOH), polyvinyl alcohol, and polyamide; polymethyl methacrylate, polycarbonate, ionomer resin, polystyrene, ABS resin, thermoplastic elastomer, ethylene-vinyl acetate copolymer, and polysulfone can be given.

As examples of the polyolefin resin, polyolefin crystalline resins in the group consisting of polyethylene resins such as a linear or branched high density polyethylene, low density polyethylene, and ultra-high polymer polyethylene; polypropylene resins such as linear or branched high density polypropyrene and low density polypropyrene; ethylene-propylene copolymer, polymethylpentene, polybutene, polymethylbutene, and polymethylhexene; and the like can be given.

The blow-molded container of a multilayer laminate is preferable due to increased pliability, impact resistance, heat resistance, and gas barrier properties. Use of a gas barrier resin such as an ethylene-vinyl alcohol copolymer, nylon, or the like as a material for another layer is particularly preferable because of excellent gas barrier properties of the resulting blow-molded container. Either one layer or two or more layers of the hydrogenated norbornene ring-open polymer and the other thermoplastic resin may be provided.

There are no particular limitations to the constitution of the multilayer laminate inasmuch as such a multilayer laminate contains a layer of the hydrogenated norbornene ring-open polymer and a layer of the other thermoplastic resin. The following constitutions can be given as specific examples. In the following constitutions, the layer containing the hydrogenated ring-open polymer is indicated as "NB layer" and the other resin layers are indicated as "synthetic resin layer".

(1) NB layer/synthetic resin layer
(2) NB layer/synthetic resin layer/NB layer
(3) Synthetic resin layer/NB layer/synthetic resin layer
(4) NB layer/synthetic resin layer/synthetic resin layer/NB layer
(5) NB layer/synthetic resin layer/NB layer/synthetic resin layer
(6) NB layer/synthetic resin layer/NB layer/synthetic resin layer/NB layer
(7) Synthetic resin layer/synthetic resin layer/NB layer/synthetic resin layer/synthetic resin layer
(8) Synthetic resin layer/NB layer/synthetic resin layer/NB layer/synthetic resin layer The above layer constitutions are preferable examples but the blow-molded container of the present invention is not limited to these. An adhesive layer may optionally be provided between the layers.

In addition, the blow-molded container of the present invention may be provided with a metallic foil such as an aluminum foil, an aluminum vapor deposition film, a laminate film of a metallic foil and a synthetic resin film, a layer which has a light blocking effect (shading layer) such as a synthetic resin film with a pigment incorporated therein. Among these shading layers, aluminum foil and an aluminum vapor deposition film, and the like have not only shading properties, but also damp-proofing properties, oil resistance, non-water-absorbing properties. Therefore, these shading layers can provide a blow-molded container with the capability of storing chemicals and the like for a long period of time. When co-extrusion is impossible, these shading layers may be added to the blow-molded container by lamination or the like. As specific layer constitutions, (1) NB layer/synthetic resin layer/shading layer,
(2) NB layer/synthetic resin layer/shading layer/synthetic resin layer,
(3) NB layer/shading layer,
and the like can be given.

It is possible to employ other desired multilayer constitutions according to the purpose of use, such as those having a larger number of layers in addition to any one of the above layer combinations.

Although not particularly limited, the multilayer blow molded container is generally fabricated by multilayer coextrusion blow molding or coinjection stretching blow molding. It is also possible to multilayer a blow molded container after molding by a method of attaching a resin film using an adhesive, a method of bonding by fusing the resin film by heating or high frequency to a temperature above the melting point, a method of applying a resin solution in an organic solvent and drying the coating, and the like.

The blow molded container of the present invention has excellent steam barrier properties, heat resistance, transparency, and oil resistance, as well as high mechanical strength. The blow molded container of the present invention has an advantage of a wide processing temperature range due to the high thermal decomposition temperature of the hydrogenated norbornene ring-open polymer.

The blow molded container of the present invention has excellent steam barrier properties. It is possible to reduce the moisture permeability ($g/(m^2 \cdot 24\ h)$) per 1 mm thickness of the barrel (side) of the blow molded container of the present invention measured based on JIS K7129 to usually 0.045 $g/(m^2 \cdot 24\ h)$ or less, preferably 0.035 $g/(m^2 \cdot 24\ h)$ or less, and more preferably 0.03 $g/(m^2 \cdot 24\ h)$ or less.

The blow molded container of the present invention has excellent oil resistance. The surface of the blow molded container of the present invention with a thickness of 1 mm is not whitened after immersing in an n-heptane test solution for 10 minutes.

The blow molded container of the present invention has excellent transparency. The blow molded container of the present invention with a thickness of 1 mm has a haze of usually 40% or less, preferably 30% or less, and more preferably 20% or less.

The blow molded container of the present invention which has these characteristics can be used for a wide variety of applications in the fields of food industries, medical supplies, cosmetics, energy, optical appliances, electric and electronic parts, telecommunications sector, vehicles, public welfare, toys, instruments for physics and chemistry, civil engineering and construction, and the like. Among these fields, the blow molded container of the present invention is particularly suitable in the fields of food industries, medical supplies, cosmetics, and energy.

EXAMPLES

The present invention will be described below more specifically by way of Examples and Comparative Examples, which are not intended to limit the present invention. In the Examples and Comparative Examples, "part(s)" means "part(s) by weight" and "%" means "wt %" unless otherwise indicated.

In the following Examples and Comparative Examples, various properties were measured by the following methods.
(A) Polymer properties
(1) The weight average molecular weight (Mw) and the number average molecular weight (Mn) of the ring-open polymers were measured as standard polystyrene-reduced values by gel permeation chromatography (GPC) using toluene as an eluant.

As the measuring device, GPC-8020 series instruments (DP8020, SD8022, AS8020, C08020, and RI8020 manufactured by Tosoh Corp.) were used. As the standard polystyrene, standard polystyrene having an Mw of a total of eight points, 500, 2630, 10,200, 37,900, 96,400, 427,000, 1,090,000, and 5,480,000, (manufactured by, Tosoh Corp.) was used.

The sample was prepared by dissolving the polymer to be analyzed in toluene to a concentration of 1 mg/ml and filtering through a cartridge filter (made of polytetrafluoroethylene, pore size: 0.5 μm).

The molecular weight was measured by feeding a sample to two TSKgel GMHHR-H columns (manufactured by Tosoh Corp.) connected in series at a flow rate of 1.0 ml/min in an amount of 100 g/ml at a column temperature of 40° C.
(2) The weight average molecular weight (Mw) and the number average molecular weight (Mn) of the hydrogenated ring-open polymers were measured as standard polystyrene-reduced values by gel permeation chromatography (GPC) using 1,2,4-trichlorobenzene as an eluant.

HLC8121GPC/HT (manufactured by Tosoh Corp.) was used as a measuring device.

As the standard polystyrene, standard polystyrene having an Mw of a total of 16 points, 988, 2580, 5910, 9010, 18,000, 37,700, 95,900, 18,6000, 351,000, 889,000, 1,050,000, 2,770,000, 5,110,000, 7,790,000, and 20,000,000 (manufactured by, Tosoh Corp.) was used.

The sample was prepared by dissolving the polymer to be analyzed in 1,2,4-trichlorobenzene with heating at 140° C. to a concentration of 1 mg/ml.

The molecular weight was measured by feeding a sample to three TSKgel GMHHR-H (20)HT columns (manufactured by Tosoh Corp.) connected in series at a flow rate of 1.0 ml/min in an amount of 300 μml at a column temperature of 140° C.
(3) The degree of hydrogenation of the hydrogenated ring-open polymer was determined by $^1$H-NMR spectrum measurement using deuteriochloroform as a solvent.
(4) The isomerization ratio was calculated using an equation, [33.0 ppm peak integration value]/([31.8 ppm peak integration value]+[33.0 ppm peak integration value])×100, wherein the peak integration value was determined by $^{13}$C-NMR spectrum measurement using deuteriochloroform as a solvent.

The 31.8 ppm peak is a peak derived from cis-isomers of 2-norbornene repeating units in the polymer and the 33.0 ppm peak is a peak derived from trans-isomers of 2-norbornene repeating units in the polymer.
(5) Melting point was measured according to JIS K7121 using a differential scanning calorimeter (DSC6220SII manufactured by NanoTechnology Inc.) after heating the sample to a temperature 30° C. higher than the melting point, cooling the sample to room temperature at a cooling rate of −10° C./min, and heating at a rate of 10° C./min.
(6) Glass transition temperature was measured according to JIS K6911 using a differential scanning calorimeter (DSC6220SII manufactured by NanoTechnology Inc.).
(B) Tube Sheet Properties
(1) Thickness of the sheet was measured using a micro gage.
(2) Uneven thickness of the sheet was measured by applying five marks on the film at 4 cm intervals in the direction (TD direction) vertical to the flow direction of the sheet, applying 20 marks at 20 cm intervals in the flow direction (MD direction) of the sheet starting from the first five marks, thereby applying 100 marks in total, measuring the film thickness at 100 marked points, and calculating the standard deviation from the results. The smaller the value of the standard deviation, the smaller the thickness unevenness of the sheet.
(3) The steam barrier properties of the sheet was measured according to JIS K7129 (method A) using a moisture permeability tester (L80-5000 type, manufactured by LYSSY) under conditions of a temperature of 50° C. and humidity of 90% RH. A small moisture permeability (g/(m$^2$·24 h)) indicates good steam barrier properties.
(4) Modulus of elasticity of the sheet was measured according to ISO 527 using a 1B shape test specimen obtained from the sheet at a tensile velocity of 200 mm/min using Autograph (AGS-5kNH, manufactured by Shimadzu Corp.). The test specimen was prepared so that its longitudinal direction is the TD direction of the tube sheet.
(5) Mechanical properties of the sheet were measured by inspecting a strain on the surface at the time of cracks according to ISO 527 using a 1B shape test specimen prepared from the sheet at a tensile velocity of 200 mm/min using Autograph (AGS-5kNH, manufactured by Shimadzu Corp.). The test specimen was prepared so that its longitudinal direction is the TD direction of the tube sheet.
(6) Oil resistance of the sheet was evaluated by measuring the haze value before and after dipping a film prepared from the tube sheet in salad oil for one hour according to JIS-K7136 using a haze meter (NDH 200A manufactured by Nihon Denshoku Industries Co., Ltd.), and dividing the haze value of the untreated sheet with the haze value after treatment. The smaller the value, the worse the haze and the poorer the oil resistance.
(C) Properties of Blister-Molded Article
(1) Thickness of the film was measured using a micro gage.
(2) The steam barrier properties was evaluated by measuring the moisture permeability according to JIS K7129 (method A) using a moisture permeability tester
(L80-5000 type, manufactured by LYSSY) under conditions of a temperature of 40° C. and humidity of 90% RH and conditions of a temperature of 50° C. and humidity of 90% RH. A small moisture permeability (g/(m$^2$·24 h)) indicates good steam barrier properties.
(3) The oil resistance was evaluated by applying salad oil (manufactured by Nisshin Oillio Group, Ltd.) to the convex side (projected side) of the blister-molded articles, placing the sample in an oven heated at 40° C., and measuring the period of time elapsed before the outward appearance of the sample changes. The longer the time elapsed before the outward appearance of the blister-molded article changes, the better the oil resistance.

(4) The blister moldability was evaluated by arbitrarily selecting ten sheets of PTP (number of pockets: five lengthwise, two in the lateral direction, total ten pockets), visually inspecting cylindrical areas of 100 PTPs to count the number of cylindrical areas of which the bottom is inwardly dented or the number of cylindrical areas of which the swelling is defective. The smaller the number of the PTPs having cylindrical areas of which the swelling is defective, the better the blister moldability.

If there is an uneven thickness in the pocket of a blister molded article which is processed as a PTP, the bottom of the cylindrical upper part of the pocket may inwardly dent or the cylindrical part may inadequately expand. Blister moldability can be evaluated by evaluating such a dent and inadequate expansion.

(D) Properties of Multilayer Laminate (1) Thickness of the film was measured using a micro gage.

(2) The impact resistance was evaluated by preparing bags (n=100) with a size of cm×20 cm, sealing the four sides of the bags with heat, putting brine in the bags, and dropping the bags from a height of 3 m, observing the presence or absence of cracks after dropping, and counting the number of cracked bags. The smaller the number of cracks, the better the impact resistance.

(3) The steam barrier properties were evaluated by measuring moisture permeability according to JIS K7129 (method A) using a moisture permeability tester (L80-5000 type, manufactured by LYSSY) under conditions of a temperature of 50° C. and humidity of 90% RH. A small moisture permeability ($g \cdot (m^2 \cdot 24\ h)$) indicates good steam barrier properties.

(4) The oil resistance was evaluated by cutting a 5 cm square from the film, dipping the sample in salad oil (manufactured by Nisshin Oillio Group, Ltd.) for 30 seconds, and placing the sample in an oven heated at 40° C., and measuring the period of time elapsed before the outward appearance of the sample changes. The longer the time elapsed before the outward appearance of the film changes, the better the oil resistance.

(5) The gas barrier properties were evaluated by boiling the film in boiling water for 30 minutes and measuring the gas barrier properties before and after boiling according to JIS K7126 (method B) under conditions of a temperature of 23° C. and humidity of 0% RH using an oxygen permeability tester (OPT-5000 type, manufactured by LYSSY). A small oxygen permeability ($cm^3 \cdot m^{-2} \cdot day^{-1} \cdot atm^{-1}$) indicates good steam barrier properties.

(E) Properties of Blow-Molded Container (1) Blow moldability was evaluated by measuring the thickness t of the body of the blow-molded container by applying a probe of an ultrasonic thickness meter (manufactured by KARL DEUTSCH) to the side of the blow-molded container body. Specifically, the blow-molded container was placed on a horizontal plane and the thickness was measured at 100 points starting from a point 10 mm from the horizontal plane at 5 mm intervals. The standard deviation ($\sigma$) was calculated.

(2) The steam barrier properties were evaluated by measuring moisture permeability according to JIS K7129 (method A) using a moisture permeability tester (L80-5000 type, manufactured by LYSSY) under conditions of a temperature of 40° C. and humidity of 90% RH. A small moisture permeability ($g/(m^2 \cdot 24\ h)$) indicates good steam barrier properties. The test for steam barrier properties was carried out using a plate-like sample prepared from the blow-molded container.

(3) A falling-weight impact resistance was evaluated by filling the blow-molded containers with brine in an amount equivalent to 90% of the total volume, dropping the container from a height (from the ground to the bottom of the container) of 1 m, and observing the conditions of the containers after falling. The number of containers with no cracks or leaks among 30 tested containers was counted.

(4) The normal heptane impregnation test was carried out as an oil resistance evaluation test. 2.5 l of n-heptane (manufactured by Wako Pure Chemical Industries, Ltd.) was added to a 3 l glass beaker. The sample containers were immersed in n-heptane in the glass beaker. The condition of the sample container surface (whether the surface was whitened or not and cracked or not) was observed after 10 minutes of immersion.

(5) Haze (%) was measured by preparing samples with a thickness of 1 mm by cutting the blow-molded container and measuring the samples using a haze meter ("NDH2000" manufactured by Nippon Denshoku Co., Ltd.).

(F) Properties of Molding Material (1) The amount of organic substances discharged was measured by washing 5 g of the molding material sample with a large amount of ultra pure water in a clean room (class 1000), placing the sample in a glass sample container completely free from moisture and organic substances adhering to the surface, heating the sample container at 80° C. for 60 minutes, and measuring gases discharged from the sample container by heat desorption gas chromatography mass spectrometer (TDS-GC-MS manufactured by Agilent Technologies).

(2) The heat resistance of the container was confirmed by allowing a wafer carrier produced from the molding material to stand at a temperature of 105° C. for 30 minutes and observing whether or not the wafer carrier was deformed. The sample was rated as "Good" if the wafer was not deformed and as "Bad" if the wafer was deformed.

(3) The content of transition metals was measured using an inductively coupled plasma optical emission spectrometry (IRIS Advantage/SSEA, manufactured by Nippon Jarrell-Ash Co. Ltd.).

(4) In measuring an increased amount of foreign matter, a new 8-inch bear silicon wafer purchased packed in a polypropylene wafer shipper was immersed in a 4.5 wt % solution of hydrofluoric acid at 25° C. for one minute to remove a thin silicon oxide film in a clean room (class 1000), and then immersed in a 50:1 (by vol) mixture of 98% concentrated sulfuric acid and a 30% hydrogen peroxide aqueous solution at 110° C. for minutes. Next, after removing organic substances by immersing in concentrated sulfuric acid at 65° C. for 10 minutes and washing away the acid with a large amount of ultra-pure water and completely removing water by a centrifugal separator, the number of foreign matter particles on the dried wafer was counted using a foreign matter detector (Surfscan SP1 manufactured by KLA-Tencor corp.). After the wafer was inserted in and removed from the molded wafer carrier 50 times, the number of foreign matter particles on the wafer was counted again. The increased amount of foreign matter was evaluated by the difference of the number of foreign matter particles before and after the test.

Example 1

(Ring-Opening Polymerization)

A reactor was charged with 500 parts by weight of dehydrated cyclohexane, 0.55 parts by weight of 1-hexene, 0.30 parts by weight of diisopropyl ether, 0.20 parts by weight of triisobutylaluminum, and 0.075 parts by weight of isobutyl alcohol at room temperature under a nitrogen atmosphere. While maintaining the temperature at 55° C., 250 parts by weight of 2-norbornene and 15 parts by weight a 1.0 wt % solution of tungsten hexachloride in toluene were continuously added in two hours to polymerize the monomers. The weight average molecular weight (Mw) of the resulting ring-open polymer (1) was 83,000, and the molecular weight distribution (Mw/Mn) was 1.8.

(Hydrogenation Reaction)

The polymerization reaction solution containing the ring-open polymer (1) obtained above was transferred to a pressure resistant hydrogenation reactor. After the addition of 0.5 parts by weight of a nickel catalyst supported by diatomaceous earth (T8400, nickel support rate: 58 wt %, manufactured by Nissan-Süd-Chemie), the hydrogenation reaction was carried out at 160° C. under a hydrogen pressure of 4.5 MPa for six hours. The reaction solution was filtered through a stainless steel wire mesh filter, in which diatomaceous earth was used as a filtration adjuvant, to remove the catalyst.

The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (1).

(Properties of Polymer)

The degree of hydrogenation of the resulting hydrogenated ring-open polymer (1) was 99.9%, the weight average molecular weight (Mw) was 82,200, the molecular weight distribution (Mw/Mn) was 2.9, the isomerization ratio was 5%, and the melting point was 140° C.

(Preparation of Resin Composition)

0.1 part by weight of tetrakis[methylene-3-(3',5'-di-t-butyl-4'-hydroxyphenyl)propionate]methane (Irganox 1010 manufactured by Ciba Geigy, hereinafter referred to as "Antioxidant A") was added to 100 parts by weight of a hydrogenated ring-open polymer (1) and the mixture was kneaded using a twin-screw kneader (TEM35 manufactured by Toshiba Machine Co., Ltd.) to obtain pellets.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (1).

Example 2

(Hydrogenation Reaction)

A polymerization reaction solution containing the ring-open polymer (1) obtained in the same manner as in Example 1 was transferred to a pressure resistant hydrogenation reactor. After the addition of 1.0 part by weight of a nickel catalyst supported by diatomaceous earth (T8400, nickel support rate: 58 wt %, manufactured by Nissan-Stid-Chemie), the hydrogenation reaction was carried out at 165° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (2).

(Properties of Polymer)

The degree of hydrogenation of the resulting hydrogenated ring-open polymer (2) was 99.9%, the weight average molecular weight (Mw) was 82,000, the molecular weight distribution (Mw/Mn) was 2.8, the isomerization ratio was 15%, and the melting point was 134° C.

(Preparation of Resin Composition)

0.1 part by weight of Antioxidant A was added to 100 parts by weight of the hydrogenated ring-open polymer (2) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 145° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (2).

Example 3

(Hydrogenation Reaction)

A polymerization reaction solution containing the ring-open polymer (1) obtained in the same manner as in Example 1 was transferred to a pressure resistant hydrogenation reactor. After the addition of 4 parts by weight of a nickel catalyst supported by diatomaceous earth (T8400, nickel support rate: 58 wt %, manufactured by Nissan-Stid-Chemie), the hydrogenation reaction was carried out at 180° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (3).

(Properties of Polymer)

The degree of hydrogenation of the resulting ring-open polymer (3) was 99.9%, the weight average molecular weight (Mw) was 81,600, the molecular weight distribution (Mw/Mn) was 2.8, the isomerization ratio was 35%, and the melting point was 125° C.

(Preparation of Resin Composition)

0.1 part by weight of Antioxidant A was added to 100 parts by weight of the hydrogenated ring-open polymer (3) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 135° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (3).

Example 4

(Ring-Opening Polymerization)

A polymerization reaction was carried out in the same manner as in Example 1 except for using 0.20 parts by weight of 1-hexene, 0.40 parts by weight of diisopropyl ether, 0.27 parts by weight of triisobutylaluminum, 0.10 part by weight of isobutyl alcohol, and 20 parts by weight of a 1.0% tungsten hexachloride solution in toluene, to obtain a reaction solution containing a ring-open polymer (2). The weight average molecular weight (Mw) of the resulting ring-open polymer (2) was 153,000, and the molecular weight distribution (Mw/Mn) was 3.0.

(Hydrogenation Reaction)

The reaction solution containing the ring-open polymer (2) obtained above was transferred to a pressure resistant hydrogenation reactor. After the addition of 2 parts by weight of a nickel catalyst supported by diatomaceous earth (T8400, nickel support rate: 58 wt %, manufactured by Nissan-Süd-Chemie), the hydrogenation reaction was carried out at 160° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under 0.13×10³ Pa for 48 hours to obtain 190 parts by weight of a hydrogenated ring-open polymer (4).

(Properties of Polymer)

The degree of hydrogenation of the resulting hydrogenated ring-open polymer (4) was 99.9%, the weight average molecular weight (Mw) was 150,500, the molecular weight distribution (Mw/Mn) was 4.0, the isomerization ratio was 9%, and the melting point was 136° C.

(Preparation of Resin Composition)

0.1 part by weight of Antioxidant A was added to 100 parts by weight of the hydrogenated ring-open polymer (4) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (4).

Example 5

(Ring-Opening Polymerization)

A solution containing a ring-open polymer (3) was obtained in the same manner as in Example 1 except for using 0.10 part by weight of 1-hexene, 0.40 parts by weight of diisopropyl ether, 0.27 parts by weight of triisobutylaluminum, 0.10 part of isobutyl alcohol, and 20 parts by weight of a 1.0% tungsten hexachloride solution in toluene.

The weight average molecular weight (Mw) of the resulting ring-open polymer (3) was 189,500, and the molecular weight distribution (Mw/Mn) was 3.3.

(Hydrogenation Reaction)

The reaction solution containing the ring-open polymer (3) obtained above was transferred to a pressure resistant hydrogenation reactor. After the addition of 1 part by weight of a nickel catalyst supported by diatomaceous earth (T8400, nickel support rate: 58 wt %, manufactured by Nissan-Stid-Chemie), the hydrogenation reaction was carried out at 160° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under 0.13×10³ Pa for 48 hours to obtain 190 parts by weight of a hydrogenated ring-open polymer (5).

(Properties of Polymer)

The degree of hydrogenation of the resulting hydrogenated ring-open polymer (5) was 99.9%, the weight average molecular weight (Mw) was 185,000, the molecular weight distribution (Mw/Mn) was 4.4, the isomerization ratio was 10%, and the melting point was 136° C.

(Preparation of Resin Composition)

0.1 part by weight of Antioxidant A was added to 100 parts by weight of the hydrogenated ring-open polymer (5) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (5).

Comparative Example 1

(Ring-Opening Polymerization)

A reaction solution containing a norbornene ring-open polymer (4) was obtained in the same manner as in Example 1, except for using 1.3 parts by weight of 1-hexene. The weight average molecular weight (Mw) of the resulting ring-open polymer (4) was 39,800, and the molecular weight distribution (Mw/Mn) was 1.7.

(Hydrogenation Reaction)

The reaction solution containing the ring-open polymer (4) obtained above was transferred to a pressure resistant hydrogenation reactor. After the addition of 0.5 parts by weight of a nickel catalyst supported by diatomaceous earth (T8400, nickel support rate: 58 wt %, manufactured by Nissan-Stid-Chemie), the hydrogenation reaction was carried out at 160° C. under a hydrogen pressure of 4.5 MPa for six hours. The solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under 0.13×10³ Pa for 48 hours to obtain 190 parts by weight of a hydrogenated ring-open polymer (6).

(Properties of Polymer)

The degree of hydrogenation of the resulting hydrogenated ring-open polymer (6) was 99.9%, the weight average molecular weight (Mw) was 38,200, the molecular weight distribution (Mw/Mn) was 2.6, the isomerization ratio was 6%, and the melting point was 142° C.

(Preparation of Resin Composition)

0.1 part by weight of Antioxidant A was added to 100 parts by weight of the hydrogenated ring-open polymer (6) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (6).

Comparative Example 2

(Ring-Opening Polymerization)

An autoclave equipped with a stirrer was charged with 1.1 parts by weight of tungsten (phenylimide) tetrachloride diethyl ether and 18.5 parts by weight of cyclohexane. A solution of 0.87 parts by weight of diethylaluminum ethoxide in 9.26 parts by weight of hexane was further added and the mixture was stirred for 30 minutes at room temperature. After the addition of 139 parts by weight of dicyclopentadiene and 0.33 parts by weight of 1-hexene, the polymerization reaction was carried out at 50° C. for three hours to obtain a reaction solution containing a ring-open polymer (5). The weight average molecular weight (Mw) of the resulting ring-open polymer (5) was 78,000, and the molecular weight distribution (Mw/Mn) was 3.5.

(Hydrogenation Reaction)

A hydrogenation catalyst solution containing 0.87 parts by weight of bis(tricyclohexylphosphine)benzylidyne ruthenium (IV) dichloride and 20.4 parts by weight of ethyl vinyl ether dissolved in 650 parts by weight of cyclohexane was added to the resulting polymer solution, and the hydrogenation reaction was carried out at 160° C. under a hydrogen pressure of 1.0 MPa for 20 hours. The reaction solution was poured into a large amount of isopropanol to cause the polymer to completely precipitate. The precipitate was collected by filtration. After washing with 500 parts by weight of acetone, the precipitate was dried in a vacuum dryer at 100° C. under $0.13 \times 10^3$ Pa for 48 hours to obtain 130 parts by weight of a hydrogenated ring-open polymer (7).

Since the hydrogenated ring-open polymer (7) was insoluble in the GPC solvent, the molecular weight could not be measured. The melting point was 273° C.

(Preparation of Resin Composition)

0.1 part by weight of Antioxidant A was added to 100 parts by weight of the hydrogenated ring-open polymer (7) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 280° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (7).

Reference Example 1

Ring-Opening Polymerization

An autoclave equipped with a stirrer was charged with 37.5 parts by weight of a 70 wt % norbornene solution in toluene, 0.052 parts by weight of 1-hexene, and 49.3 parts by weight of cyclohexane, and the mixture was stirred. Then, a solution containing 0.023 parts by weight of 2,6-diisopropylphenylimide neophylidene molybdenum (VI) bis(t-butoxide) and 0.016 parts by weight of trimethylphosphine in 8.6 parts by weight of toluene were added, and the reaction was carried out at 30° C. for one hour. 0.40 parts by weight of benzaldehyde was added to the reaction mixture to obtain a reaction solution containing a ring-open polymer (6).

The weight average molecular weight (Mw) of the resulting ring-open polymer (6) was 65,000, and the molecular weight distribution (Mw/Mn) was 1.1.

(Hydrogenation Reaction)

The reaction solution containing the ring-open polymer (6) obtained above was transferred to a pressure resistant hydrogenation reactor. After the addition of 5.25 parts by weight of $Pd/CaCO_3$ (amount of Pd: 5 wt %, manufactured by Strem Chemicals, Inc.) as a catalyst, the hydrogenation reaction was carried out at 100° C. under a hydrogen pressure of 3.5 MPa for 48 hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (8).

(Properties of Polymer)

The degree of hydrogenation of the resulting hydrogenated ring-open polymer (8) was 99.75%, the weight average molecular weight (Mw) was 64,200, the molecular weight distribution (Mw/Mn) was 1.3, the isomerization ratio was 0%, and the melting point was 143° C.

(Preparation of Resin Composition)

0.1 part by weight of Antioxidant A was added to 100 parts by weight of the hydrogenated ring-open polymer (8) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (8).

Comparative Example 3

(Ring-Opening Polymerization and Hydrogenation Reaction)

Polymerization was carried out in the same manner as in Example 1, except that 200 parts by weight of methyltetracyclododecene (MTD) and 50 parts by weight of dicyclopentadiene (DCP) were used instead of 2-norbornene, and the amount of 1-hexene used was 0.70 parts by weight.

The weight average molecular weight (Mw) of the resulting ring-open polymer (7) was 56,000, and the molecular weight distribution (Mw/Mn) was 2.0.

The hydrogenation reaction was carried out in the same manner as in Example 3 to obtain a hydrogenated ring-open polymer (9).

(Properties of Polymer)

The degree of hydrogenation of the resulting hydrogenated ring-open polymer (9) was 99.9%, the weight average molecular weight (Mw) was 55,000, the molecular weight distribution (Mw/Mn) was 3.1, the glass transition temperature was 140° C., and a melting point was not observed.

(Preparation of Resin Composition)

0.1 part by weight of Antioxidant A was added to 100 parts by weight of the hydrogenated ring-open polymer (9) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 220° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (9).

Comparative Example 4

(Ring-Opening Polymerization and Hydrogenation Reaction)

Polymerization was carried out in the same manner as in Example 5, except that 0.06 parts by weight of 1-hexene was used.

The weight average molecular weight (Mw) of the resulting ring-open polymer (8) was 310,000, and the molecular weight distribution (Mw/Mn) was 3.2. The hydrogenation reaction was carried out in the same manner as in Example 1 to obtain a hydrogenated norbornene ring-open polymer (10).

(Properties of Polymer)

The degree of hydrogenation of the resulting hydrogenated ring-open polymer (10) was 99.0%, the weight average molecular weight (Mw) was 300,200, the molecular weight distribution (Mw/Mn) was 4.5, the isomerization ratio was 6%, and the melting point was 140° C.

(Preparation of Resin Composition)

0.1 part by weight of Antioxidant A was added to 100 parts by weight of the hydrogenated ring-open polymer (10) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (10).

(Solubility Evaluation Test (c-Hex Solubility))

Solubility in cyclohexane was evaluated using the hydrogenated ring-open polymers (1) to (10). The solubility was judged by preparing a cyclohexane solution of the ring-open polymer with a concentration of 20% at 70° C. and cooling the solution, while observing the temperature at which the polymer is deposited with the naked eye. The results are shown in Table 2.

(Processability Evaluation Test (1))

Processability was evaluated using the hydrogenated ring-open polymers (1) to (10). The processability was evaluated by measuring the thickness of monolayer films (C1) (thickness: 100 μm) obtained by molding the pellets of the hydrogenated ring-open polymer (1) to (10) by T-die molding using a hanger manifold T-die film melt extruding press machine (stationary type manufactured by GSI Creos Corp.) equipped with a screw having a screw diameter of 20 mm, a compression ratio of 2.5 or 3.1, and L/D=under the following conditions. The results are shown in Table 2.

Specifically, the film thickness was measured at 100 points in the MD direction at intervals of 2.5 m using a micro gage to calculate the standard deviation (σ).

<Molding Conditions>

Die lip: 0.8 mm

Molten resin temperature: Tm of resin+40° C. (resin without a melting point: Tg+100° C.)

Width of T-die: 300 mm

T-die temperature: Tm of resin+50° C. (resin without a melting point: Tg+110° C.)

Cooling roll: Tm of resin−20° C. (resin without a melting point: Tg−15° C.)

Casting roll: Tm of resin−10° C. (resin without a melting point: Tg−5° C.)

Sheet roll-up rate: 2.5 m/min

Screw compression ratio: a screw with a compression ratio of 2.5 was used for resins having no melting point, and a screw with a compression ratio of 3.1 was used for other resins.

(Processability Evaluation Test (2))

The processability was evaluated by the film thickness variation when monolayer films (C1) (thickness: 100 μm) were continuously produced for eight hours and the time before a die line was generated (die line generation time) using the same extruding press machine as used in the processability evaluation test (1), of which the conditions were set so that the resin pressure at the die portion was 3 MPa on average.

The same process conditions as in the processability evaluation test (1) were employed, except that the molten resin temperature and the T-die temperature shown in the following Table 1 were used when processing the hydrogenated ring-open polymers (1) to (10).

TABLE 1

| Hydrogenated ring-open polymer | Molten resin temperature (° C.) | T-die temperature (° C.) |
| --- | --- | --- |
| 1 | 180 | 190 |
| 2 | 175 | 185 |
| 3 | 165 | 175 |
| 4 | 200 | 210 |
| 5 | 210 | 220 |
| 6 | 170 | 180 |
| 7 | 310 | 320 |
| 8 | 180 | 190 |
| 9 | 250 | 260 |
| 10 | 260 | 270 |

Specifically, at every one hour after the start of film formation, the film thickness was measured at 10 points in the MD direction at intervals of 2.5 m (total of 80 points) using a micro gage to calculate the standard deviation. The time required for the die line to be generated from the start of film formation was measured by visually judging the occurrence of the die line.

(Measurement of Tensile Breaking Elongation)

Tensile breaking elongation was measured for each of the resin sheets (1) to (10) obtained in the above. Tensile breaking elongation was measured according to ISO 527 at a tensile velocity of 200 mm/min using Autograph (AGS-5kNH, manufactured by Shimadzu Corp.).

The measurement results are shown in Table 2.

(Evaluation Test of Steam Barrier Properties)

Moisture permeability of each of the sheets (1) to (10) obtained above was evaluated. The moisture permeability was measured according to JIS K7129 (method A) using a moisture permeability tester (L80-5000 type, manufactured by LYSSY) under conditions of a temperature of 40° C. and humidity of 90% RH. The measurement results are shown in Table 2. A small moisture permeability ($g/(m^2 \cdot 24\ h)$) indicates good steam barrier properties.

(Evaluation of Oil Resistance)

Oil resistance of each of the sheets (1) to (10) obtained above was evaluated. Critical stress to salad oil (manufactured by Nisshin Oillio Group, Ltd.) was used for evaluation of the oil resistance. After applying salad oil to the surface of a test specimen with dimensions of 10 mm×100 mm×1 mm prepared by heat-pressing, the test specimen was secured for one hour to a curvature of an aluminum jig made by cutting an elliptic cylinder with a height of 10 mm, a major ellipse axis of 200 mm and a minor ellipse axis of 80 mm into four equal divisions, to observe whether or not cracks were produced in the test specimen. All test specimens were secured at fixed positions. For a test specimen in which the cracks were generated, the crack generating positions were measured taking the end of the test specimen on the low curvature side at the time of securing as the starting point. The results are shown in Table 2.

erence Example 1 showed poor solubility in cyclohexane as compared with the hydrogenated ring-open polymers of the Examples.

In addition, the hydrogenated ring-open polymers (6), (7), (8), and (10) of Comparative Examples 1, 2, and 4 and Reference Example 1 showed poor processability as compared with the hydrogenated ring-open polymers of the Examples.

Furthermore, the hydrogenated ring-open polymers (6), (7), (8), and (10) of Comparative Examples 1, 2, and 4 and Reference Example 1 had tensile breaking elongation of 25% or less, showing the same or inferior mechanical properties as compared with the hydrogenated ring-open polymers of the Examples. The moisture permeability of the resin sheets (7) and (9) of Comparative Examples 2 and 3 was 0.78 $g/(m^2 \cdot 24\ h)$ or more, indicating poor steam barrier properties of these resin sheets as compared with the resin sheets of the Examples. Furthermore, the resin sheets (6) and (9) of Comparative Examples 1 and 3 exhibited poor oil resistance.

Based on the above results, the hydrogenated ring-open polymers and sheets of Examples 1 to 5 can be regarded as excellent in all performance properties, including steam barrier properties, heat resistance, oil resistance, mechanical properties, transparency, and processability demanded in recent years in the fields of information processing, food industries, medical supplies, engineering works, and the like.

Example 6

(Ring-Opening Copolymerization)

A reactor was charged with 500 parts by weight of dehydrated cyclohexane, 0.40 parts by weight of 1-hexene, 0.31 parts by weight of diisopropyl ether, 0.20 parts by weight of triisobutylaluminum, and 0.08 parts by weight of isobutyl

TABLE 2

| | | Hydrogenated ring-open polymer | c-Hex solubility (depositing temperature) | Resin sheet | Processability test (1) Standard deviation (σ) | Processability test (2) Standard deviation (σ) | Die line generation time | Tensile breaking elongation (%) | Moisture permeability ($g/(m^2 \cdot 24\ h)$) | Oil resistance |
|---|---|---|---|---|---|---|---|---|---|---|
| Example | 1 | 1 | 65° C. | 1 | 5 μm | 3 μm | ≧15 hrs | 30 | 0.23 | No cracks |
| | 2 | 2 | 60° C. | 2 | 6 μm | 4 μm | ≧15 hrs | 30 | 0.25 | No cracks |
| | 3 | 3 | 40° C. | 3 | 6 μm | 4 μm | ≧15 hrs | 35 | 0.30 | No cracks |
| | 4 | 4 | 62° C. | 4 | 7 μm | 5 μm | 10 hrs | 35 | 0.28 | No cracks |
| | 5 | 5 | 62° C. | 5 | 8 μm | 5 μm | 10 hrs | 25 | 0.31 | No cracks |
| Comparative Example | 1 | 6 | 69° C. | 6 | 10 μm | 7 μm | ≧15 hrs | 8 | 0.24 | Cracks at 75 mm |
| | 2 | 7 | Not dissolved | 7 | 10 μm | 8 μm | 2 hrs | 15 | 0.78 | No cracks |
| Reference Example | 1 | 8 | 69° C. | 8 | 18 μm | 10 μm | 13 hrs | 25 | 0.23 | No cracks |
| Comparative Example | 3 | 9 | ≦25° C. | 9 | 5 μm | 4 μm | 6 hrs | 40 | 0.98 | Cracks at 45 mm |
| | 4 | 10 | 35° C. | 10 | 15 μm | 7 μm | 3 hrs | 25 | 0.28 | No cracks |

As shown in Table 2, the hydrogenated ring-open polymers (1) to (5) of Examples 1 to 5 showed excellent solubility in cyclohexane (c-Hex) and processability. The resin sheets (1) to (5) of Examples 1 to 5 exhibited excellent mechanical properties as indicated by the tensile breaking elongation of 25% or more, and excellent steam barrier properties as indicated by the moisture permeability of 0.31 $g/(m^2 \cdot 24\ h)$ or less. Furthermore, the resin sheets (1) to (5) of Examples 1 to 5 exhibited excellent oil resistance.

On the other hand, the hydrogenated ring-open polymers (6), (7), and (8) of Comparative Examples 1 and 2 and Refalcohol at room temperature under a nitrogen atmosphere. While maintaining the temperature at 55° C., 245 parts by weight of 2-norbornene, 5 parts by weight of methylnorbornene, and 15 parts by weight of a 1.0 wt % solution of tungsten hexachloride in toluene were continuously added in two hours to polymerize the monomers. The polymerization conversion rate was about 100%.

The weight average molecular weight (Mw) of the resulting ring-open polymer (9) was 103,000, and the molecular weight distribution (Mw/Mn) was 1.9.

(Hydrogenation Reaction)

The polymerization reaction solution obtained above was transferred to a pressure resistant hydrogenation reactor.

After the addition of 0.5 parts by weight of a nickel catalyst supported by diatomaceous earth (T8400, nickel support rate: 58 wt %, manufactured by Nissan-Süd-Chemie), the hydrogenation reaction was carried out at 160° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (11).

(Properties of Polymer)

The degree of hydrogenation of the resulting hydrogenated ring-open polymer (11) was 99.9%, the weight average molecular weight (Mw) was 100,000, the molecular weight distribution (Mw/Mn) was 2.9, the isomerization ratio was 8%, and the melting point was 136° C.

(Preparation of Resin Composition)

0.1 part by weight of tetrakis[methylene-3-(3',5'-di-t-butyl-4'-hydroxyphenyl)propionate]methane (Irganox 1010 manufactured by Ciba Geigy, hereinafter referred to as "Antioxidant A") was added to 100 parts by weight of a hydrogenated ring-open polymer (11) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (11) with a thickness of 300 μm.

Example 7

(Ring-Opening Copolymerization)

Polymerization was carried out in the same manner as in Example 6, except that the amount of the monomers used was 240 parts by weight of 2-norbornene and 10 parts by weight of methyl norbornene, and the amount of 1-hexene was 0.55 parts by weight. The polymerization conversion rate was about 100%. The weight average molecular weight (Mw) of the resulting ring-open polymer (10) was 81,500, and the molecular weight distribution (Mw/Mn) was 1.8.

(Hydrogenation Reaction)

The polymerization reaction solution obtained above was transferred to a pressure resistant hydrogenation reactor. After the addition of 0.5 parts by weight of a nickel catalyst supported by diatomaceous earth (T8400, nickel support rate: 58 wt %, manufactured by Nissan-Stid-Chemie), the hydrogenation reaction was carried out at 160° C. under a hydrogen pressure of 4.5 MPa for six hours. The reaction solution was filtered through a stainless steel wire mesh filter, in which diatomaceous earth was used as a filtration adjuvant, to remove the catalyst. The filtrate was poured into 3000 parts by weight of isopropyl alcohol while stirring to precipitate the hydrogenated product. After washing with 500 parts by weight of acetone, the hydrogenated product was dried in a vacuum dryer at 100° C. under $0.13 \times 10^3$ Pa for 48 hours to obtain 190 parts by weight of a hydrogenated ring-open polymer (12).

(Properties of Polymer)

The degree of hydrogenation of the resulting hydrogenated ring-open polymer (12) was 99.9%, the weight average molecular weight (Mw) was 80,000, the molecular weight distribution (Mw/Mn) was 2.9, the isomerization ratio was 8%, and the melting point was 133° C.

(Preparation of Resin Composition)

0.1 part by weight of Antioxidant A was added to 100 parts by weight of the hydrogenated ring-open polymer (12) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (12) with a thickness of 300 μm.

Example 8

(Ring-Opening Copolymerization)

An autoclave equipped with a stirrer was charged with 37.1 parts by weight of a 70 wt % 2-norbornene solution in toluene, 0.26 parts by weight of dicyclopentadiene, 0.020 parts by weight of 1-hexene, and 49.3 parts by weight of cyclohexane, and the mixture was stirred. Then, a solution containing 0.023 parts by weight of bis(tricyclohexylphosphine)benzylidyneruthenium (IV) dichloride in 8.6 parts by weight of toluene was added, and the reaction was carried out at 60° C. for 30 minutes. The polymerization conversion rate was about 100%.

The weight average molecular weight (Mw) of the resulting ring-open polymer (11) was 165,000, and the molecular weight distribution (Mw/Mn) was 1.3.

(Hydrogenation Reaction)

0.020 parts by weight of ethyl vinyl ether was added to the polymer solution obtained above and the mixture was stirred, followed by a hydrogenation reaction under a hydrogen pressure of 1.0 MPa at 150° C. for 20 hours. After cooling to room temperature, a suspension of 0.5 parts by weight of the activated carbon in 10 parts by weight of cyclohexane was added and the mixture was reacted under a hydrogen pressure of 1.0 MPa at 150° C. for two hours. The reaction mixture was filtered through a filter with a pore diameter of 0.2 μm to remove the activated carbon. The reaction solution was poured into a large amount of isopropanol to cause the polymer to completely precipitate. The precipitate was collected by filtration. After washing with acetone, the hydrogenated product was dried in a vacuum dryer at 100° C. under $0.13 \times 10^3$ Pa for 48 hours to obtain a hydrogenated ring-open polymer (13).

(Properties of Polymer)

The degree of hydrogenation of the resulting hydrogenated ring-open polymer (13) was 99.9%, the weight average molecular weight (Mw) was 160,000, the molecular weight distribution (Mw/Mn) was 1.8, the isomerization ratio was 0%, and the melting point was 139° C.

(Preparation of Resin Composition)

0.1 part by weight of Antioxidant A was added to 100 parts by weight of the hydrogenated ring-open polymer (13) and the mixture was kneaded using a twin-screw kneader to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (13) with a thickness of 300 μm.

Example 9

(Ring-Opening Copolymerization and Hydrogenation Reaction)

A polymerization reaction was carried out in the same manner as in Example 6 except that the amount of the monomers used was 227.5 parts by weight of 2-norbornene and 22.5 parts by weight of methylnorbornene, and the amount of other components was 0.4 parts by weight of 1-hexene, 0.40 parts by weight of diisopropyl ether, 0.27 parts by weight of triisobutylaluminum, 0.10 part by weight of isobutyl alcohol, and 20 parts by weight of a 1.0 wt % tungsten hexachloride solution in toluene. The polymerization conversion rate was about 100%.

The weight average molecular weight (Mw) of the resulting ring-open polymer (12) was 101,000, and the molecular weight distribution (Mw/Mn) was 2.8.

The hydrogenation reaction was carried out in the same manner as in Example 6 to obtain a hydrogenated norbornene ring-open polymer (14).

(Properties of Polymer)

The degree of hydrogenation of the resulting ring-open polymer (14) was 99.9%, the weight average molecular weight (Mw) was 98,800, the molecular weight distribution (Mw/Mn) was 3.8, the isomerization ratio was 7%, and the melting point was 114° C.

(Preparation of Resin Composition)

0.1 part by weight of Antioxidant A was added to 100 parts by weight of the hydrogenated ring-open polymer (14) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 145° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (14) with a thickness of 300 μm.

Example 10

(Ring-Opening Copolymerization and Hydrogenation Reaction)

A polymerization reaction was carried out in the same manner as in Example 6 except that the amount of the monomers used was 240 parts by weight of 2-norbornene and 10 parts by weight of dicyclopentadiene, and the amount of other components was 0.55 parts by weight of 1-hexene, 0.40 parts by weight of diisopropyl ether, 0.27 parts by weight of triisobutylaluminum, 0.10 part by weight of isobutyl alcohol, and 20 parts by weight of a 1.0 wt % tungsten hexachloride solution in toluene. The polymerization conversion rate was about 100%.

The weight average molecular weight (Mw) of the resulting ring-open polymer (13) was 83,000, and the molecular weight distribution (Mw/Mn) was 2.7.

The hydrogenation reaction was carried out in the same manner as in Example 6 to obtain 190 parts by weight of a hydrogenated norbornene ring-open polymer (15).

(Properties of Polymer)

The degree of hydrogenation of the resulting ring-open polymer (15) was 99.9%, the weight average molecular weight (Mw) was 81,300, the molecular weight distribution (Mw/Mn) was 3.8, the isomerization ratio was 9%, and the melting point was 134° C.

(Preparation of Resin Composition)

0.1 part by weight of Antioxidant A was added to 100 parts by weight of the hydrogenated ring-open polymer (15) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 145° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (15) with a thickness of 300 μm.

Example 11

A polymerization reaction was carried out in the same manner as in Example 6 except that the amount of the monomers used was 240 parts by weight of 2-norbornene and 10 parts by weight of dicyclopentadiene, and the amount of other components was 0.15 parts by weight of 1-hexene, 0.40 parts by weight of diisopropyl ether, 0.27 parts by weight of triisobutylaluminum, 0.10 part by weight of isobutyl alcohol, and 20 parts by weight of a 1.0 wt % tungsten hexachloride solution in toluene. The polymerization conversion rate was about 100%.

The weight average molecular weight (Mw) of the resulting ring-open polymer (14) was 140,000, and the molecular weight distribution (Mw/Mn) was 7.1.

The hydrogenation reaction was carried out in the same manner as in Example 6 to obtain 190 parts by weight of a hydrogenated norbornene ring-open polymer (16).

(Properties of Polymer)

The degree of hydrogenation of the resulting hydrogenated ring-open polymer (16) was 99.9%, the weight average molecular weight (Mw) was 137,000, the molecular weight distribution (Mw/Mn) was 7.8, the isomerization ratio was 9%, and the melting point was 134° C.

(Preparation of Resin Composition)

0.1 part by weight of Antioxidant A was added to 100 parts by weight of the hydrogenated ring-open polymer (16) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 145° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (16) with a thickness of 300 μm.

Comparative Example 5

(Ring-Opening Copolymerization and Hydrogenation Reaction)

Polymerization was carried out in the same manner as in Example 8, except that 200 parts by weight of methyltetracyclododecene (MTD) and 50 parts by weight of dicyclopentadiene (DCP) were used instead of 2-norbornene, and the amount of 1-hexene used was 0.40 parts by weight. The polymerization conversion rate was about 100%.

The weight average molecular weight (Mw) of the resulting ring-open polymer (15) was 56,000, and the molecular weight distribution (Mw/Mn) was 3.7.

The hydrogenation reaction was carried out in the same manner as in Example 6, except that the amount of the nickel catalyst supported by diatomaceous earth was 3 parts by weight, to obtain a hydrogenated norbornene ring-open polymer (17).

(Properties of Polymer)

The degree of hydrogenation of the resulting hydrogenated ring-open polymer (17) was 99.9%, the weight average molecular weight (Mw) was 55,000, the molecular weight distribution (Mw/Mn) was 2.9, the glass transition temperature was 140° C., and a melting point was not observed.

(Preparation of Resin Composition)

0.1 part by weight of Antioxidant A was added to 100 parts by weight of the hydrogenated ring-open polymer (17) and the mixture was kneaded using a twin-screw kneader (TEM35 manufactured by Toshiba Machine Co., Ltd.) to obtain pellets.

(Preparation of Resin Sheet)

The pellets were pressed by a vacuum heat-press apparatus (manufactured by Imoto Factory Co., Ltd.) at a die temperature of 220° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (17) with a thickness of 300 μm.

Comparative Example 6

(Ring-Opening Copolymerization and Hydrogenation Reaction)

A polymerization reaction was carried out in the same manner as in Example 6 except for using 222.5 parts by weight of 2-norbornene and 27.5 parts by weight of tetracyclododecene as monomers, and 0.07 parts by weight of 1-hexene, 0.4 parts by weight of diisopropyl ether, 0.27 parts by weight of triisobutylaluminum, 0.10 part by weight of isobutyl alcohol, and 20 parts by weight of a 1.0 wt % tungsten hexachloride solution in toluene. The polymerization conversion rate was about 100%.

The weight average molecular weight (Mw) of the resulting ring-open polymer (16) was 319,500, and the molecular weight distribution (Mw/Mn) was 3.4.

The hydrogenation reaction was carried out in the same manner as in Example 6, except that the amount of the nickel catalyst supported by diatomaceous earth was 3 parts by weight, to obtain a hydrogenated norbornene ring-open polymer (18).

(Properties of Polymer)

The degree of hydrogenation of the resulting hydrogenated ring-open polymer (18) was 99.0%, the weight average molecular weight (Mw) was 315,000, the molecular weight distribution (Mw/Mn) was 4.9, the isomerization ratio was 9%, and the melting point was 100° C.

(Preparation of Resin Composition)

0.1 part by weight of Antioxidant A was added to 100 parts by weight of the hydrogenated ring-open polymer (18) and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 135° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (18) with a thickness of 300 μm.

Reference Example 2

0.1 part by weight of Antioxidant A was added to 100 parts by weight of the hydrogenated ring-open polymer (8) obtained in Reference Example 1 and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 150° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (19) with a thickness of 300 μm.

Comparative Example 7

0.1 part by weight of Antioxidant A was added to 100 parts by weight of the hydrogenated ring-open polymer (7) obtained in Comparative Example 2 and the mixture was kneaded using a twin-screw kneader (TEM35 manufactured by Toshiba Machine Co., Ltd.) to obtain a pelletized resin composition.

(Preparation of Resin Sheet)

The pellets were pressed by a vacuum heat-press apparatus (manufactured by Imoto Factory Co., Ltd.) at a die temperature of 280° C. under a pressure of 8 MPa for five minutes, using a mold die with a thickness of 1 mm, a length of 200 mm, and a width of 100 mm, with one side being mirror plane processed, and cooled to room temperature at a cooling rate of 0.5° C./min to obtain a resin sheet (20).

(Solubility Evaluation Test (c-Hex Solubility))

Solubility in cyclohexane was evaluated using the hydrogenated ring-open polymers (11) to (18), (8), and (7). The solubility was judged by preparing a cyclohexane solution of the ring-open polymer with a concentration of 20% at 70° C.

and cooling the solution, while observing the temperature at which the polymer was deposited with the naked eye. The results are shown in Table 3.

(Processability Evaluation Test (1))

Processability was evaluated using the hydrogenated ring-open polymers (11) to (18), (8), and (7). The processability was evaluated by measuring the thickness of monolayer films (C1) (thickness: 100 μm) obtained by molding the pellets of the hydrogenated ring-open polymer (11) to (18), (8), and (7) by T-die molding using a hanger manifold T-die film melt extruding press machine (stationary type manufactured by GSI Creos Corp.) equipped with a screw having a screw diameter of 20 mm, a compression ratio of 2.5 or 3.1, and L/D=30 under the following conditions. The results are shown in Table 4.

Specifically, the film thickness was measured at 100 points in the MD direction at intervals of 2.5 m using a micro gage to calculate the standard deviation (a).

<Molding Conditions>
Die lip: 0.8 mm
Molten resin temperature: Tm of resin+40° C. (resin without a melting point: Tg+100° C.)
Width of T-die: 300 mm
T-die temperature: Tm of resin+50° C. (resin without a melting point: Tg+110° C.)
Cooling roll: Tm of resin−20° C. (resin without a melting point: Tg−15° C.)
Casting roll: Tm of resin−10° C. (resin without a melting point: Tg−5° C.)
Sheet roll-up rate: 2.5 m/min
Screw compression ratio: a screw with a compression ratio of 2.5 was used for resins having no melting point, and a screw with a compression ratio of 3.1 was used for other resins.

(Processability Evaluation Test (2))

The processability were evaluated by the film thickness variation when monolayer films (C1) (thickness: 100 μm) were continuously produced for eight hours and the time before a die line was generated (die line generation time) using the same extruding press machine as used in the processability evaluation test (1), of which the conditions were set so that the resin pressure at the die portion is 3 MPa on average.

The same process conditions as in the processability evaluation test (1) were employed, except that the molten resin temperature and the T-die temperature shown in the following Table 3 were used when processing the hydrogenated ring-open polymers (11) to (18), (8), and (7).

TABLE 3

| Hydrogenated ring-open (co)polymer | Molten resin temperature (° C.) | T-die temperature (° C.) |
|---|---|---|
| 11 | 170 | 180 |
| 12 | 170 | 180 |
| 13 | 190 | 200 |
| 14 | 155 | 165 |
| 15 | 175 | 185 |
| 16 | 190 | 200 |
| 17 | 240 | 250 |
| 18 | 235 | 245 |
| 8 | 175 | 185 |
| 7 | 315 | 325 |

Specifically, at every one hour after the start of film formation, the film thickness was measured at 10 points in the MD direction at intervals of 2.5 m (total of 80 points) using a micro gage to calculate the standard deviation. The time required for the die line to be generated from the start of film formation was measured by visually judging the occurrence of the die line.

The term "die line" refers to a streak, observable with the naked eye, continuously generated along the direction of extrusion of the resin at the position of the molded article corresponding to the specific position of the die. Specifically, the die line is a streak formed on the surface of the molded article consisting of irregularities (concaves and convexes) with a height of about 0.3 μm to 100 μm. Smaller concaves and convexes cannot be observed with the naked eye.

(Measurement of Tensile Breaking Elongation)

Tensile breaking elongation was measured for each of the resin sheets (11) to (20) obtained in the above. Tensile breaking elongation was measured according to ISO 527 at a tensile velocity of 200 mm/min using an Autograph (AGS-5kNH, manufactured by Shimadzu Corp.). The measurement results are shown in Table 4.

(Evaluation Test of Steam Barrier Properties)

Moisture permeability of each of the sheets (11) to (20) obtained above was evaluated. The moisture permeability was measured according to JIS K7129 (method A) using a moisture permeability tester (L80-5000 type, manufactured by LYSSY) under conditions of a temperature of 40° C. and humidity of 90% RH. The measurement results are shown in Table 4. A small moisture permeability (g/(m$^2$·24 h)) indicates good steam barrier properties.

(Evaluation of Oil Resistance)

Oil resistance of each of the sheets (11) to (20) obtained above was evaluated. Critical stress to salad oil (manufactured by Nisshin Oillio Group, Ltd.) was used for evaluation of the oil resistance. After applying salad oil to the surface of a test specimen with dimensions of 10 mm×100 mm×1 mm prepared by heat-pressing, the test specimen was secured for one hour to a curvature of an aluminum jig made by cutting an elliptic cylinder with a height of 10 mm, a major ellipse axis of 200 mm and a minor ellipse axis of 80 mm into four equal divisions, to observe whether or not cracks were produced in the test specimen. All test specimens were secured at fixed positions. For a test specimen in which the cracks were generated, the crack generating positions were measured taking the end of the test specimen on the low curvature side at the time of securing as the starting point. The results are shown in Table 4.

(Measurement of Haze)

Haze of each of the sheets (11) to (20) obtained above was measured. Samples with a thickness of 300 μm were prepared and the haze was measured using a haze meter (NDH2000 manufactured by Nippon Denshoku Co., Ltd.). The measurement results are shown in Table 4.

TABLE 4

| | | Hydrogenated ring-open polymer | c-Hex solubility (deposition temperature) | Resin sheet | Processability evaluation (1) Standard deviation (σ) | Processability evaluation (2) | | | | | |
|---|---|---|---|---|---|---|---|---|---|---|---|
| | | | | | | Standard deviation (σ) | Time before die line formation | Tensile breaking elongation (%) | Moisture permeability (g/(m²·24 h)) | Haze (%) | Oil resistance |
| Example | 6 | 11 | 62° C. | 11 | 6 μm | 3 μm | ≧15 hrs | 33 | 0.23 | 30.1 | No cracks |
| | 7 | 12 | 57° C. | 12 | 8 μm | 4 μm | ≧15 hrs | 35 | 0.24 | 28.0 | No cracks |
| | 8 | 13 | 60° C. | 13 | 6 μm | 4 μm | 10 hrs | 35 | 0.24 | 27.2 | No cracks |
| | 9 | 14 | 49° C. | 14 | 9 μm | 4 μm | ≧15 hrs | 37 | 0.40 | 22.2 | No cracks |
| | 10 | 15 | 62° C. | 15 | 8 μm | 4 μm | ≧15 hrs | 30 | 0.30 | 26.0 | No cracks |
| | 11 | 16 | 58° C. | 16 | 8 μm | 4 μm | ≧15 hrs | 35 | 0.30 | 29.0 | No cracks |
| Comparative Example | 5 | 17 | ≦25° C. | 17 | 5 μm | 4 μm | ≧15 hrs | 40 | 0.98 | 0.9 | Cracks at 45 mm |
| | 6 | 18 | 40° C. | 18 | 15 μm | 7 μm | 3 hrs | 25 | 0.78 | 21.4 | No cracks |
| Reference Example | 2 | 8 | 69° C. | 19 | 18 μm | 10 μm | 13 hrs | 25 | 0.23 | 41.0 | No cracks |
| Comparative Example | 7 | 7 | did not dissolve | 20 | 10 μm | 8 μm | 2 hrs | 15 | 0.78 | 28.0 | No cracks |

As shown in Table 4, the hydrogenated ring-open polymers (11) to (16) of Examples 6 to 11 and the hydrogenated ring-open polymers (18) and (8) of Comparative Example 6 and Reference Example 2 showed excellent solubility. On the other hand, the hydrogenated ring-open polymer (7) of Comparative Example 7 showed poor solubility.

The hydrogenated ring-open polymers (11) to (16) of Examples 6 to 11 and the hydrogenated ring-open polymer (17) of Comparative Example 5 showed excellent processability as compared with the hydrogenated ring-open polymers (18), (8), and (7) of Comparative Examples 6 and 7, and Reference Example 2.

The resin sheets (11) to (16) of Examples 6 to 11 exhibited excellent mechanical properties as indicated by the tensile breaking elongation of 30% or more. On the other hand, the resin sheets (18) to (20) of Comparative Examples 6, 7 and Reference Example 2 exhibited poor mechanical properties as indicated by the tensile breaking elongation of 25% or less.

The moisture permeability of the resin sheets (11) to (16) of Examples 6 to 11 and the resin sheet (19) of Reference Example 2 was 0.40 g/(m²·24 h) or less, indicating excellent steam barrier properties. The moisture permeability of the resin sheets (17), (18), and (20) of Comparative Examples 5, 6, and 7 was 0.78 g/(m²·24 h) or more, indicating poor steam barrier properties of these resin sheets.

The haze of the resin sheets (11) to (16) of Examples 6 to 11 and the resin sheets (17), (18), and (20) of Comparative Examples 5, 6, and 7 was 30.1% or less. On the other hand, the haze of resin sheet (19) of Reference Example 2 was 41.0% indicating poor transparency.

The resin sheets (11) to (16) of Examples 6 to 11 and the resin sheets (18) to (20) of Comparative Examples 6 and 7, and Reference Example 2 exhibited excellent oil resistance. On the other hand, the resin sheet (17) of Comparative Example 5 exhibited poor oil resistance.

Based on the above results, the hydrogenated ring-open polymers and resin sheets of Examples 6 to 11 can be regarded as excellent in all performance, including steam barrier properties, heat resistance, oil resistance, mechanical properties, transparency, and processability demanded in recent years in the fields of information processing, food industries, medical supplies, engineering works, and the like.

Example 12

0.1 part by weight of an antioxidant (tetrakis[methylene-3-(3',5'-di-t-buty 1-4'-hydroxyphenyl)propionate]methane (Irganox 1010 manufactured by Ciba Geigy)) was added to 100 parts by weight of the hydrogenated ring-open polymer (1) obtained in Example 1, and the mixture was kneaded using a twin-screw kneader (TEM35 manufactured by Toshiba Machine Co., Ltd.) to obtain a pelletized resin composition.

(Preparation of Tube Sheet)

The pellets were processed by an inflation machine (manufactured by Sumitomo Heavy Industries Modern, Ltd.) to produce a tube sheet (A) with a thickness of 250 μm under the conditions of a lip clearance of 2.5 mm, a drawing speed of 8 m/min, and a die temperature of 190° C.

Example 13

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (11) obtained in Example 6, and the mixture was kneaded using a twin-screw kneader (TEM35 manufactured by Toshiba Machine Co., Ltd.) to obtain a pelletized resin composition.

(Preparation of Tube Sheet)

The pellets and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (B) with a thickness of 250 μm, consisting of a layer of the hydrogenated ring-open polymer (11) (thickness: 30 μm) and a layer of the low density polyethylene (thickness: 220 μm) under the conditions of a lip clearance of 2.5 mm, a drawing speed of 8 m/min, and a die temperature of 190° C.

Example 14

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (14) obtained in Example 9, and the mixture was kneaded using a twin-screw kneader (TEM35 manufactured by Toshiba Machine Co., Ltd.) to obtain a pelletized resin composition.

(Preparation of Tube Sheet)

The pellets and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (C) with a thickness of 250 μm, consisting of a layer of the hydrogenated ring-open polymer (14) (thickness: 30 μm) and a layer of the low density polyethylene (thickness: 220 μm) under the conditions of a lip clearance of 2.5 mm, a drawing speed of 8 m/min, and a die temperature of 190° C.

Example 15

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (5) obtained in Example 5, and the mixture was kneaded using a twin-screw kneader (TEM35 manufactured by Toshiba Machine Co., Ltd.) to obtain a pelletized resin composition.
(Preparation of Tube Sheet)

The pellets and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (D) with a thickness of 250 μm, consisting of a layer of the hydrogenated ring-open polymer (5) (thickness: 30 μm) and a layer of the low density polyethylene (thickness: 220 μm) under the conditions of a lip clearance of 2.5 mm, a drawing speed of 8 m/min, and a die temperature of 190° C.

Example 16

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (3) obtained in Example 3, and the mixture was kneaded using a twin-screw kneader (TEM35 manufactured by Toshiba Machine Co., Ltd.) to obtain a pelletized resin composition.
(Preparation of Tube Sheet)

The pellets and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (E) with a thickness of 250 μm, consisting of a layer of the hydrogenated ring-open polymer (3) (thickness: 30 μm) and a layer of the low density polyethylene (thickness: 220 μm) under the conditions of a lip clearance of 2.5 mm, a drawing speed of 8 m/min, and a die temperature of 190° C.

Example 17

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (15) obtained in Example 10, and the mixture was kneaded using a twin-screw kneader (TEM35 manufactured by Toshiba Machine Co., Ltd.) to obtain a pelletized resin composition.

(Preparation of Tube Sheet)

The pellets of the hydrogenated ring-open polymer (15) were processed by an inflation machine (manufactured by Sumitomo Heavy Industries Modern, Ltd.) to produce a tube sheet (F) with a thickness of 250 μm under the conditions of a lip clearance of 2.5 mm, a drawing speed of 8 m/min, and a die temperature of 190° C.

Example 18

(Preparation of Tube Sheet)

The pellets of the hydrogenated ring-open polymer (15) and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (G) with a thickness of 250 μm, consisting of a layer of the hydrogenated ring-open polymer (15) (thickness: μm) and a layer of the low density polyethylene (thickness: 220 μm) under the conditions of a lip clearance of 2.5 mm, a drawing speed of 8 m/min, and a die temperature of 190° C.

Example 19

(Preparation of Tube Sheet)

The pellets of the hydrogenated ring-open polymer (1) and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (H) with a thickness of 250 μm, consisting of three layers of a low density polyethylene layer (thickness: 110 μm), a hydrogenated ring-open polymer (1) layer (thickness: 30 μm), and a low density polyethylene layer (thickness: 110 μm) under the conditions of a lip clearance of 2.5 mm, a drawing speed of 8 m/min, and a die temperature of 190° C.

Example 20

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (8) obtained in Reference Example 1, and the mixture was kneaded using a twin-screw kneader (TEM35 manufactured by Toshiba Machine Co., Ltd.) to obtain pellets.
(Preparation of Tube Sheet)

The pellets of the hydrogenated ring-open polymer (8) and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (1) with a thickness of 250 μm, consisting of a layer of the hydrogenated ring-open polymer (8) (thickness: μm) and a layer of the low density polyethylene (thickness: 220 μm) under the conditions of a lip clearance of 2.5 mm, a drawing speed of 8 m/min, and a die temperature of 190° C.

Comparative Example 8

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (18) obtained in Comparative Example 6, and the mixture was kneaded using a twin-screw kneader (TEM35 manufactured by Toshiba Machine Co., Ltd.) to obtain a pelletized resin composition.

(Preparation of Tube Sheet)

The pellets of the hydrogenated ring-open polymer (17) and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (J) with a thickness of 250 μm, consisting of a layer of the hydrogenated ring-open polymer (17) (thickness: 30 μm) and a layer of the low density polyethylene (thickness: 220 μm) under the conditions of a lip clearance of 2.5 mm, a drawing speed of 8 m/min, and a die temperature of 190° C.

Comparative Example 9

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (17) obtained in Comparative Example 5, and the mixture was kneaded using a twin-screw kneader (TEM35 manufactured by Toshiba Machine Co., Ltd.) to obtain a pelletized resin composition.

(Preparation of Tube Sheet)

The pellets of the hydrogenated ring-open polymer (17) and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (K) with a thickness of 250 μm, consisting of a layer of the hydrogenated ring-open polymer (16) (thickness: 30 μm) and a layer of the low density polyethylene (thickness: 220 μm) under the conditions of a lip clearance of 2.5 mm, a drawing speed of 8 m/min, and a die temperature of 260° C.

Comparative Example 10

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (7) obtained in Comparative Example 2, and the mixture was kneaded using a twin-screw kneader (TEM35 manufactured by Toshiba Machine Co., Ltd.) to obtain pellets.

(Preparation of Tube Sheet)

The pellets and low density polyethylene (Novatech SF720: density 0.928 g/cm³, manufactured by Japan Polyethylene Corp.) were processed by an inflation machine (manufactured by Sumitomo Heavy Industries Modern, Ltd.) to produce a tube sheet (L) with a thickness of 250 μm, consisting of a layer of the hydrogenated ring-open polymer (7) (thickness: 30 μm) and a layer of the low density polyethylene (thickness: 220 μm) under the conditions of a lip clearance of 2.5 mm, a drawing speed of 8 m/min, and a die temperature of 285° C.

Comparative Example 11

(Preparation of Tube Sheet)

A low density polyethylene (Novatech SF720: density 0.928 g/cm³, manufactured by Japan Polyethylene Corp.) was processed by an inflation machine (manufactured by Sumitomo Heavy Industries Modern, Ltd.) to produce a tube sheet (M) made of the low density polyethylene with a thickness of 250 μm under the conditions of a lip clearance of 2.5 mm, a drawing speed of 8 m/min, and a die temperature of 190° C.

The number of hydrogenated ring-open polymers of Examples 12 to 20 and Comparative Examples 8 to 11, the composition, Mw, Mw/Mn, hydrogenation degree (%), isomerization ratio (%), melting point, and the tube sheet constitution are shown in Table 5.

TABLE 5

| | Tube sheet | | | Hydrogenated ring-open polymer | | | | | Layer constitution |
| | | No. | Composition | Mw | Mw/Mn | Hydrogenation rate (%) | Isomerization rate (%) | Melting point (° C.) | |
| --- | --- | --- | --- | --- | --- | --- | --- | --- | --- |
| Example | 12 A | 1 | NB 100 | 82200 | 2.9 | 99.9 | 5 | 140 | A |
| | 13 B | 11 | NB/MNB = 98/2 | 100000 | 2.9 | 99.9 | 8 | 136 | PE/B |
| | 14 C | 14 | NB/MNB = 91/9 | 98800 | 3.8 | 99.9 | 7 | 114 | PE/C |
| | 15 D | 5 | NB 100 | 185000 | 4.4 | 99.9 | 10 | 136 | PE/D |
| | 16 E | 3 | NB 100 | 81600 | 2.8 | 99.9 | 35 | 125 | PE/E |
| | 17 F | 15 | NB/DCP = 96/4 | 81300 | 3.8 | 99.9 | 9 | 134 | F |
| | 18 G | 15 | NB/DCP = 96/4 | 81300 | 3.8 | 99.9 | 9 | 134 | PE/F |
| | 19 H | 1 | NB 100 | 82200 | 2.9 | 99.9 | 5 | 140 | PE/A/PE |
| | 20 I | 8 | NB 100 | 64200 | 1.3 | 99.75 | 0 | 143 | PE/G |
| Comparative | 8 J | 18 | NB/TCD = 89/11 | 315000 | 4.9 | 99.0 | 9 | 100 | PE/H |
| Example | 9 K | 17 | MTD/DCP = 80/20 | 55000 | 2.9 | 99.9 | — | — | PE/I |
| | 10 L | 7 | DCP 100 | — | — | — | — | 273 | PE/J |
| | 11 M | — | — | — | — | — | — | — | PE |

PE = Polyethylene

The thickness fluctuation, moisture permeability at 40° C., moisture permeability at 50° C., modulus of elasticity, strain at the time of crack generation, and haze change when salad oil was applied were measured and evaluated using the tube sheets (A) to (M). In the measurement and evaluation of the thickness fluctuation, moisture permeability at 40° C., moisture permeability at 50° C., and haze change when salad oil was applied, a sheet with a thickness of 250 μm produced by cutting the side of the tube sheet was used. The modulus of elasticity and strain at the time of crack generation were evaluated using a dumbbell form test specimen IB type with a thickness of 250 μm based on ISO527. The results are shown in Table 6.

TABLE 6

| | Tube sheet | Layer constitution | Thickness (μm) | Thickness standard deviation | Steam barrier properties 40° C. × 90% RH | Steam barrier properties 50° C. × 90% RH | Modulus of elasticity (MPa) | Strain at the time of crack generation (%) | Haze change before and after salad oil application* |
|---|---|---|---|---|---|---|---|---|---|
| Example 12 | A | A | 250 | 6.2 | 0.09 | 0.23 | 420 | 27 | 0.86 |
| 13 | B | PE/B | 220/30 | 6.5 | 0.42 | 1.48 | 362 | 30 | 0.94 |
| 14 | C | PE/C | 220/30 | 6.9 | 0.52 | 1.78 | 360 | 37 | 0.94 |
| 15 | D | PE/D | 220/30 | 7.4 | 0.47 | 1.68 | 358 | 25 | 0.97 |
| 16 | E | PE/E | 220/30 | 6.5 | 0.44 | 1.50 | 360 | 34 | 0.94 |
| 17 | F | F | 250 | 6.4 | 0.18 | 0.68 | 390 | 32 | 0.86 |
| 18 | G | PE/F | 220/30 | 7.0 | 0.52 | 1.72 | 342 | 32 | 0.94 |
| 19 | H | PE/A/PE | 110/30/110 | 6.4 | 0.43 | 1.49 | 358 | 28 | 1.00 |
| 20 | I | PE/G | 220/30 | 7.9 | 0.46 | 1.58 | 386 | 24 | 0.86 |
| Comparative Example 8 | J | PE/H | 220/30 | 7.8 | 0.68 | 2.48 | 380 | 28 | 0.98 |
| 9 | K | PE/J | 220/30 | 13.4 | 0.87 | 3.65 | 680 | 28 | 0.44 |
| 10 | L | PE/K | 220/30 | 18.4 | 0.76 | 2.86 | 720 | 17 | 0.90 |
| 11 | M | PE | 250 | 6.4 | 1.00 | 6.40 | 350 | ≧50 | 1.00 |

*Haze without treating with salad oil/haze after salad oil attachment

As shown in Table 6, the tube sheets (A) to (I), (J), and (M) of Examples 12 to and Comparative Examples 8 and 11 had small thickness standard deviation values, indicating a small thickness fluctuation. On the other hand, the tube sheets (K) and (L) of Comparative Examples 9 and 10 had comparatively large thickness standard deviation values, indicating their comparatively large thickness fluctuation.

The tube sheets (A) to (I) of Examples 12 to 20 showed excellent steam barrier properties particularly at a high temperature (50° C.). The tube sheets (J) to (M) of Comparative Examples 8 to 11 showed poor steam barrier properties particularly at a high temperature (50° C.).

The tube sheets (A) to (I) of Examples 12 to 20 and the tube sheets (J) and (M) of Comparative Examples 8 and 11 had a modulus of elasticity of 420 MPa or less, indicating their excellent pliability. On the other hand, the tube sheets (K) and (L) of Comparative Examples 9 and 10 had modulus of elasticity of 680 MPa or more, indicating their poor pliability.

The tube sheets (B), (C), and (E) to (G) of Examples 13, 14, and 16 to 18 exhibited particularly excellent mechanical properties as indicated by the strain at the time of crack generation of 30% or more. In the same manner as the tube sheets of Comparative Examples 8, 9 and 11, the tube sheets (A) to (I) of Examples 12 to 20 had excellent mechanical properties as indicated by the strain at the time of crack generation of 24% or more, indicating their excellent mechanical properties. On the other hand, the tube sheet (L) of Comparative Example 10 had a strain at the time of crack generation of 17%, indicating its poor mechanical properties.

In the same manner as the tube sheets of (J), (L), and (M) of Comparative Examples 8, 10 and 11, the tube sheets (A) to (I) of Examples 12 to 20 had excellent oil resistance as indicated by the change in the haze value due to the application of salad oil. On the other hand, the tube sheet (K) of Comparative Example 9 showed a significant change of the haze value due to salad oil application, indicating its poor oil resistance.

Since the tube sheets of Examples 12 to 20 have excellent steam barrier properties, mechanical characteristics, oil resistance, pliability, and moldability, and particularly superior steam barrier properties at a high temperature, the tube sheets are preferable as a packing material of an infusion solution bag.

(Pellet Production Example 1)

0.1 part by weight of an antioxidant (tetrakis[methylene-3-(3',5'-di-t-butyl-4'-hydroxyphenyl)propionate]methane (Irganox 1010 manufactured by Ciba Geigy), hereinafter referred to as "Antioxidant A") was added to 100 parts by weight of the hydrogenated ring-open polymer (1) and the mixture was kneaded using a twin-screw kneader (TEM35B manufactured by Toshiba Machine Co., Ltd.) to obtain pellets (A).

(Pellet Production Example 2)

0.1 part by weight of Antioxidant A was added to 100 parts by weight of the hydrogenated ring-open polymer (11) obtained in Example 6 and the mixture was kneaded using a twin-screw kneader (TEM35B manufactured by Toshiba Machine Co., Ltd.) to obtain pellets (B).

(Pellet Production Example 3)

0.1 part by weight of Antioxidant A was added to 100 parts by weight of the hydrogenated ring-open polymer (12) obtained in Example 7 and the mixture was kneaded using a twin-screw kneader (TEM35B manufactured by Toshiba Machine Co., Ltd.) to obtain pellets (C).

(Pellet Production Example 4)

0.1 part by weight of Antioxidant A was added to 100 parts by weight of the hydrogenated ring-open polymer (14) obtained in Example 9 and the mixture was kneaded using a twin-screw kneader (TEM35B manufactured by Toshiba Machine Co., Ltd.) to obtain pellets (D).

(Pellet Production Example 5)

0.1 part by weight of Antioxidant A was added to 100 parts by weight of the hydrogenated ring-open polymer (13) obtained in Example 8 and the mixture was kneaded using a twin-screw kneader to obtain pellets (E).

(Pellet Production Example 6)

0.1 part by weight of Antioxidant A was added to 100 parts by weight of the hydrogenated ring-open polymer (15) obtained in Example 10 and the mixture was kneaded using a twin-screw kneader (TEM35B manufactured by Toshiba Machine Co., Ltd.) to obtain pellets (F).

(Pellet Production Example 7)

0.1 part by weight of Antioxidant A was added to 100 parts by weight of the hydrogenated ring-open polymer (8) obtained in Reference Example 1 and the mixture was kneaded using a twin-screw kneader (TEM35B manufactured by Toshiba Machine Co., Ltd.) to obtain pellets (G).

(Pellet Production Example 8)

(Ring-opening Polymerization and Hydrogenation Reaction)

Polymerization was carried out in the same manner as in Pellet Production Example 1, except that 200 parts by weight of methyltetracyclododecene (MTD) and 50 parts by weight of dicyclopentadiene were used instead of 2-norbornene, and the amount of 1-hexene used was 0.40 parts by weight. The polymerization conversion rate was about 100%. The weight average molecular weight (Mw) of the resulting ring-open polymer (17) was 56,000, and the molecular weight distribution (Mw/Mn) was 2.0. The hydrogenation reaction was carried out in the same manner as in Pellet Production Example 3 to obtain a hydrogenated ring-open polymer (19).
(Properties of Polymer)

The degree of hydrogenation of the resulting hydrogenated ring-open polymer (19) was 99.9%, the weight average molecular weight (Mw) was 55,000, the molecular weight distribution (Mw/Mn) was 3.1, the glass transition temperature was 140° C., and a melting point was not observed.
(Preparation of Resin Composition)

0.1 part by weight of Antioxidant A was added to 100 parts by weight of the hydrogenated ring-open polymer (19) and the mixture was kneaded using a twin-screw kneader (TEM35B manufactured by Toshiba Machine Co., Ltd.) to obtain pellets (H).
(Pellet Production Example 9)
(Ring-opening Polymerization and Hydrogenation Reaction)

0.1 part by weight of Antioxidant A was added to 100 parts by weight of the hydrogenated ring-open polymer (18) obtained in Comparative Example 6 and the mixture was kneaded using a twin-screw kneader (TEM35B manufactured by Toshiba Machine Co., Ltd.) to obtain pellets (I).
(Pellet Production Example 10)

0.1 part by weight of Antioxidant A was added to 100 parts by weight of the hydrogenated ring-open polymer (7) obtained in Comparative Example 2 and the mixture was kneaded using a twin-screw kneader (TEM35B manufactured by Toshiba Machine Co., Ltd.) to obtain pellets (J).

Example 21

(Sheet Forming)

The pellets (A) were molded into a monolayer sheet (A) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (A) are shown in Table 7.
<Molding Conditions>
Die lip: 0.8 mm
Molten resin temperature: 180° C.
Width of T-die: 300 mm
Cooling roller: 120° C.
Casting roll: 130° C.

The monolayer sheet (A) obtained above was molded by blister molding at 130° C. using a medication packing machine (FBP-M2 manufactured by CKD) to obtain a process sheet (1) having 10 cylindrical portions (pockets: diameter 9 mm×height 5 mm) arranged five lengthwise and two horizontally at center intervals of 15 mm, for enclosing tablets (8 mmφ×maximum thickness of 4 mm) on the monolayer film (A). The oil resistance of the resulting process sheet (1) was evaluated. The results are shown in Table 8.

Without filling the medication, the plane on the concave side (unprojected side) of the pocket of the process sheet (1) was layered with the adhesive plane of an aluminum foil for PTP (manufactured by Nippon Foil Mfg. Co., Ltd.) (thickness 20 μm). After heat-sealing at 210° C. and inserting a slitter at 175° C., the layered material was punched to obtain a PTP (1) with a width of 37 mm, a length of 94 mm, and a corner of 5 mmR, having a total of ten pockets (five lengthwise and two horizontally). The blister moldability of the pockets of the resulting PTP (1) was evaluated. The results are shown in Table 8.

Table 8 also shows the steam barrier properties of the monolayer sheet (A).

Example 22

(Sheet Forming)

The pellets (B) were molded into a monolayer sheet (B) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (B) are shown in Table 7.
<Molding Conditions>
Die lip: 0.8 mm
Molten resin temperature: 180° C.
Width of T-die: 300 mm
Cooling roller: 120° C.
Casting roll: 130° C.

A process sheet (2) and a PTP (2) were prepared in the same manner as in Example 21, except for using the monolayer sheet (B) instead of the monolayer sheet (A). Steam barrier properties of the monolayer sheet (B), oil resistance of the resulting process sheet (2), and the blister moldability of the pockets of the PTP (2) were evaluated. The measurement results are shown in Table 8.

Table 8 also shows the steam barrier properties of the monolayer sheet (B).

Example 23

(Sheet Forming)

The pellets (C) were molded into a monolayer sheet (C1) (thickness: 250 μm), a monolayer sheet (C2) (thickness: 215 μm), and a monolayer sheet (C3) (thickness: 180 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (C1) are shown in Table 7.
<Molding Conditions>
Die lip: 0.8 mm
Molten resin temperature: 180° C.
Width of T-die: 300 mm
Cooling roller: 120° C.
Casting roll: 130° C.

A process sheet (3) was prepared in the same manner as in Example 21, except that the monolayer sheet (C1) was used instead of the monolayer sheet (A) and the blister molding temperature was 120° C. The resulting process sheet (3) was molded in the same manner as in Example 21 to obtain a PTP (3). Oil resistance of the resulting PTP (3) and blister moldability of the pockets of the PTP (3) were evaluated. The results are shown in Table 8.

Table 8 also shows the steam barrier properties of the monolayer sheet (C1).

Example 24

(Sheet Forming)

The pellets (D) were molded into a monolayer sheet (D) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (D) are shown in Table 7.
<Molding Conditions>
Die lip: 0.8 mm
Molten resin temperature: 170° C.
Width of T-die: 300 mm
Cooling roller: 100° C.
Casting roll: 110° C.

A process sheet (4) was prepared in the same manner as in Example 21, except that the monolayer sheet (D) was used instead of the monolayer sheet (A) and the blister molding temperature was 105° C. The resulting process sheet (4) was molded in the same manner as in Example 21 to obtain a PTP (4). Oil resistance of the resulting PTP (4) and blister moldability of the pockets of the PTP (4) were evaluated. The results are shown in Table 8.

Table 8 also shows the steam barrier properties of the monolayer sheet (D).

Example 25

(Sheet Forming)

The pellets (E) were molded into a monolayer sheet (E) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (E) are shown in Table 7.
<Molding Conditions>
Die lip: 0.8 mm
Molten resin temperature: 180° C.
Width of T-die: 300 mm
Cooling roller: 120° C.
Casting roll: 130° C.

A process sheet (5) was prepared in the same manner as in Example 21, except for using the monolayer sheet (E) instead of the monolayer sheet (A). Steam barrier properties of the monolayer sheet (E), oil resistance of the resulting process sheet (5) and the PTP (5), and blister moldability of the pockets of the PTP (5) were evaluated. The results are shown in Table 8.

Table 8 also shows the steam barrier properties of the monolayer sheet (E).

Example 26

(Sheet Forming)

The pellets (F) were molded into a monolayer sheet (F) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (F) are shown in Table 7.
<Molding Conditions>
Die lip: 0.8 mm
Molten resin temperature: 180° C.
Width of T-die: 300 mm
Cooling roller: 120° C.
Casting roll: 130° C.

A process sheet (6) was prepared in the same manner as in Example 21, except for using the monolayer sheet (F) instead of the monolayer sheet (A). The resulting process sheet (6) was molded in the same manner as in Example 21 to obtain a PTP (6). Steam barrier properties of the monolayer sheet (F), oil resistance of the resulting process sheet (6), and the blister processability of the pockets of the PTP (6) were evaluated. The results are shown in Table 8.

Table 8 also shows the steam barrier properties of the monolayer sheet (F).

Example 27

(Sheet Forming)

The pellets (G) were molded into a monolayer sheet (G) (thickness: 250 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (G) are shown in Table 7.
<Molding Conditions>
Die lip: 0.8 mm
Molten resin temperature: 180° C.
Width of T-die: 300 mm
Cooling roller: 120° C.
Casting roll: 130° C.

A process sheet (7) and a PTP (7) were prepared in the same manner as in Example 21, except for using the monolayer sheet (G) instead of the monolayer sheet (A). Steam barrier properties of the monolayer sheet (G) and blister processability of the pockets of the resulting process sheet (7) and the PTP (7) were evaluated. The results are shown in Table 8.

Table 8 also shows the steam barrier properties of the monolayer sheet (G).

Example 28

A non-stretched polypropylene film (Pylene Film-CT, manufactured by Toyobo Co., Ltd. thickness: 30 μm) was attached to one side of the monolayer film (C2) via a urethane adhesive at 70° C. to obtain a multilayer film (1) (total thickness: 250 μm).

A process sheet (8) was prepared in the same manner as in Example 21, except for using the multilayer sheet (1) instead of the monolayer sheet (A). The resulting process sheet (8) was molded in the same manner as in Example 21 to obtain a PTP (8) with the non-stretched polypropylene film layer being disposed on the convex side of the PTP (8). Oil resistance of the resulting process sheet (8) and blister moldability of the pockets of the PTP (8) were evaluated. The results are shown in Table 9.

Table 9 also shows steam barrier properties of the multilayer sheet (1).

Example 29

The pellets (C) and a linear low density polyethylene having a melting point of 126° C. and a density of 0.937 g/cm$^3$ (UMERIT 4040F manufactured by Ube Industries, Ltd.) were molded into a multilayer sheet consisting of the pellet (C) and the linear low density polyethylene (thickness: pellet (C): 165 µm, linear low density polyethylene: 50 µm, total: 215 µm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
(Pellet (C)) Molten resin temperature: 180° C.
(Linear low density polyethylene) Molten resin temperature: 180° C.
Width of T-die: 300 mm
Cooling roller: 110° C.
Casting roll: 120° C.

A non-stretched nylon film (Rayfan NO manufactured by Toyobo Advanced Film Co., Ltd., thickness: 30 µm) was attached to one side of the resulting multilayer film of pellet (C) and the linear low density polyethylene via a urethane adhesive at 70° C. to obtain a multilayer film (2) (total thickness: 250 µm).

A process sheet (9) was prepared in the same manner as in Example 21, except for using the multilayer sheet (2) instead of the monolayer sheet (A). The resulting process sheet (9) was molded in the same manner as in Example 21 to obtain a PTP (9) with the non-stretched nylon film layer being disposed on the convex side of the PTP (9). Oil resistance of the resulting process sheet (9) and blister moldability of the pockets of the PTP (9) were evaluated. The results are shown in Table 9.

Table 9 also shows steam barrier properties of the multilayer sheet (2).

Example 30

A non-stretched polypropylene film (Pylene Film-CT, manufactured by Toyobo Co., Ltd. thickness: 30 µm) was attached to both sides of the monolayer film (C3) via a urethane adhesive at 70° C. to obtain a multilayer film (3) (total thickness: 250 µm).

A process sheet (10) was prepared in the same manner as in Example 21, except for using the multilayer sheet (3) instead of the monolayer sheet (A). The resulting process sheet (10) was molded in the same manner as in Example 21 to obtain a PTP (10). Steam barrier properties of the multilayer sheet (3), oil resistance of the resulting process sheet (10), and blister moldability of the pockets of the PTP (10) were evaluated. The results are shown in Table 9.

Table 9 also shows steam barrier properties of the multilayer sheet (3).

Comparative Example 12

(Sheet Forming)
The pellets (H) were molded into a monolayer sheet (H1) (thickness: 250 µm) and a monolayer sheet (H2) (thickness: 180 µm) by T-die molding using a hanger manifold T-die film melt extruding press machine (stationary type manufactured by GSI Creos Corp.) equipped with a screw having a screw diameter of 20 mm, a compression ratio of 2.5, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (H1) are shown in Table 7.

<Molding Conditions>
Die lip: 0.8 mm
Molten resin temperature: 230° C.
Width of T-die: 300 mm
Cooling roller: 85° C.
Casting roll: 95° C.

A process sheet (11) was prepared in the same manner as in Example 21, except that the monolayer sheet (H1) was used instead of the monolayer sheet (A) and the blister molding temperature was 110° C. The resulting process sheet (11) was molded in the same manner as in Example 21 to obtain a PTP (11). Oil resistance of the resulting PTP (11) and blister moldability of the pockets of the PTP (11) were evaluated. The results are shown in Table 8.

Table 8 also shows steam barrier properties of the monolayer sheet (H1).

Comparative Example 13

(Sheet Forming)
The pellets (I) were molded into a monolayer sheet (1) (thickness: 250 µm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (1) are shown in Table 7.

<Molding Conditions>
Die lip: 0.8 mm
Molten resin temperature: 150° C.
Width of T-die: 300 mm
Cooling roller: 80° C.
Casting roll: 90° C.

A process sheet (12) was prepared in the same manner as in Example 21, except that the monolayer sheet (1) was used instead of the monolayer sheet (A) and the blister molding temperature was 95° C. The resulting process sheet (12) was molded in the same manner as in Example 21 to obtain a PTP (12).

Oil resistance of the resulting process sheet (12) and blister moldability of the pockets of the PTP (12) were evaluated. The results are shown in Table 8.

Table 8 also shows steam barrier properties of the monolayer sheet (1).

Comparative Example 14

(Sheet Forming)
The pellets (J) were molded into a monolayer sheet (J) (thickness: 250 µm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

The type, composition, Mw, Mw/Mn, hydrogenation degree (%), isomerization ratio (%), and melting point (° C.) of the hydrogenated ring-open polymer forming the monolayer sheet (J) are shown in Table 7.

<Molding Conditions>
Die lip: 0.8 mm
Molten resin temperature: 310° C.
Width of T-die: 300 mm
Cooling roller: 220° C.
Casting roll: 230° C.

The experiment of preparing a process sheet was carried out in the same manner as in Example 21, except that the monolayer sheet (J) was used instead of the monolayer sheet (A) and the blister molding temperature of 260° C., which is around the upper limit of the molding machine, was employed. The pocket portions were not dented, failing to produce a process sheet.

Table 8 shows steam barrier properties of the monolayer sheet (J).

Comparative Example 15

A multilayer sheet (4), a process sheet (13) and a PTP (13) were prepared in the same manner as in Example 21, except for using the monolayer sheet (H2) instead of the monolayer sheet (A).

Oil resistance of the resulting process sheet (13) and blister moldability of the pockets of the PTP (13) were evaluated. The results are shown in Table 9.

Table 9 also shows steam barrier properties of the multilayer sheet (4).

TABLE 7

|  | | Monolayer sheet | | Hydrogenated ring-open polymer | | | | |
|---|---|---|---|---|---|---|---|---|
|  | | | No. | Composition | Mw | Mw/Mn | Hydrogenation rate (%) | Isomerization degree (%) | Melting point (° C.) |
| Example | 21 | A | 1 | NB 100 | 82200 | 2.9 | 99.9 | 5 | 140 |
|  | 22 | B | 11 | NB/MNB = 98/2 | 100000 | 2.9 | 99.9 | 8 | 136 |
|  | 23 | C1 | 12 | NB/MNB = 96/4 | 80000 | 2.9 | 99.9 | 8 | 133 |
|  | 24 | D | 14 | NB/MNB = 91/9 | 98800 | 3.8 | 99.9 | 7 | 114 |
|  | 25 | E | 13 | NB/DCP = 99/1 | 160000 | 1.8 | 99.9 | 0 | 139 |
|  | 26 | F | 15 | NB/DCP = 96/4 | 81300 | 3.8 | 99.9 | 9 | 134 |
|  | 27 | G | 8 | NB 100 | 64200 | 1.3 | 99.75 | 0 | 143 |
| Comparative Example | 12 | H1 | 19 | DCP 100 | 53000 | 3.6 | 99.9 | — | — |
|  | 13 | I | 17 | NB/TCD = 89/11 | 315000 | 4.9 | 99.0 | 9 | 100 |
|  | 14 | J | 7 | DCP 100 | — | — | — | — | 273 |

TABLE 8

|  | | Monolayer sheet | Steam barrier properties of monolayer sheet (g/(m² · 24 h)) | | Process sheet | Oil resistance of process sheet | PTP | Blister moldability (number of crushed pockets) |
|---|---|---|---|---|---|---|---|---|
|  | | | 40° C. × 90% RH | 50° C. × 90% RH | | | | |
| Example | 21 | A | 0.07 | 0.21 | 1 | After 6 days | 1 | 5 |
|  | 22 | B | 0.12 | 0.25 | 2 | After 6 days | 2 | 1 |
|  | 23 | C1 | 0.15 | 0.28 | 3 | After 5 days | 3 | 0 |
|  | 24 | D | 0.21 | 0.36 | 4 | After 5 days | 4 | 0 |
|  | 25 | E | 0.11 | 0.26 | 5 | After 8 days | 5 | 4 |
|  | 26 | F | 0.17 | 0.30 | 6 | After 4 days | 6 | 0 |
|  | 27 | G | 0.09 | 0.23 | 7 | After 4 days | 7 | 10 |
| Comparative Example | 12 | H1 | 0.43 | 0.80 | 11 | Within 1 hour | 11 | 3 |
|  | 13 | I | 0.31 | 0.64 | 12 | After 7 days | 12 | 83 |
|  | 14 | J | 0.40 | 0.70 | — | — | — | — |

TABLE 9

|  | | Multilayer sheet | Layer constitution | Steam barrier properties of multilayer sheet (g/(m² · 24 h)) | | Process sheet | Oil resistance of process sheet | PTP | Blister moldability (number of crushed pockets) |
|---|---|---|---|---|---|---|---|---|---|
|  | | | | 40° C. × 90% RH | 50° C. × 90% RH | | | | |
| Example | 28 | 1 | C2/PP | 0.07 | 0.21 | 8 | No change for 10 days or more | 8 | 0 |
|  | 29 | 2 | Ny/C/PE | 0.12 | 0.25 | 9 | No change for 10 days or more | 9 | 0 |
|  | 30 | 3 | PP/C3/PP | 0.15 | 0.28 | 10 | No change for 10 days or more | 10 | 0 |
| Comparative Example | 15 | 4 | PP/H2/PP | 0.45 | 1.00 | 13 | No change for 10 days or more | 13 | 2 |

PP = Polypropylene, PE = Polyethylene, Ny = Nylon

As can be seen from Tables 8 and 9, the blister molded sheets of Examples 21 to 27 and Examples 28 to 30 (monolayer sheets (A) to (G) and multilayer sheets (1) to (3)) had a moisture permeability of 0.21 g/(m²·24 h) or less at 40° C. and 90% RH, and 0.36 g/(m²·24 h) or less at 50° C. and 90% RH, showing excellent steam barrier properties, particularly at a high temperature. On the other hand, the blister molded sheets of Comparative Examples 12 to 15 (monolayer sheets (H1) to (J) and multilayer sheet (4)) had a moisture permeability of 0.31 to 0.45 g/(m²·24 h) at 40° C. and 90% RH, and 0.64 to 1.0 g/(m²·24 h) at 50° C. and 90% RH, showing inferior steam barrier properties, particularly at a high temperature.

The number of crushed pockets in the PTPs (1) to (10) of Examples 21 to 27 and Examples 28 to 30 and PTPs (11) and (13) of Comparative Examples 12 and 15 was 10 out of 100 pockets, showing excellent blister moldability. On the other hand, in the PTP (12) of Comparative Example 13, 83 pockets out of 100 pockets were crushed, indicating poor blister moldability.

The process sheets (1) to (10) of Examples 21 to 27 and Examples 28 to 30 and the process sheets (12) of Comparative Example 2 required four days or more before being whitened, showing excellent oil resistance. On the other hand, the process sheet (11) of Comparative Example 12 was whitened within one hour in the oil resistance evaluation test, indicating poor oil resistance.

The monolayer sheet (J) had too high a melting point to be blister molded.

Based on the above results, the blister molding sheet and the blister-molded article of the present invention were confirmed to have excellent steam barrier properties particularly at a high temperature, superior blister moldability, and good oil resistance.

(Film Production Example 1)

The pellets (A) obtained in Pellet Production Example 1 were molded into a monolayer film (A) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm
Cooling roller: 120° C.
Casting roll: 130° C.

(Film Production Example 2)

The pellets (B) obtained in Pellet Production Example 2 were molded into a monolayer film (B) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm
Cooling roller: 120° C.
Casting roll: 130° C.

(Film Production Example 3)

The pellets (C) obtained in Pellet Production Example 3 were molded into a monolayer film (C) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm
Cooling roller: 120° C.
Casting roll: 130° C.

(Film Production Example 4)

The pellets (D) obtained in Pellet Production Example 4 were molded into a monolayer film (D) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 170° C.
Width of T-die: 300 mm
Cooling roller: 100° C.
Casting roll: 110° C.

(Film Production Example 5)

The pellets (E) obtained in Pellet Production Example 5 were molded into a monolayer film (E) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm
Cooling roller: 120° C.
Casting roll: 130° C.

(Film Production Example 6)

The pellets (F) obtained in Pellet Production Example 6 were molded into a monolayer film (F) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm
Cooling roller: 120° C.
Casting roll: 130° C.

(Film Production Example 7)

The pellets (G) obtained in Pellet Production Example 7 were molded into a monolayer film (G1) (thickness: 30 μm) and a monolayer film (G2) (thickness: 50 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.

<Molding Conditions>
Die lip: 0.8 mm
Molten resin temperature: 180° C.
Width of T-die: 300 mm Cooling roller: 120° C.
Casting roll: 130° C.
(Film Production Example 8)

0.1 part by weight of Antioxidant A was added to 100 parts by weight of the hydrogenated ring-open polymer (9) obtained in Comparative Example 3 and the mixture was kneaded using a twin-screw kneader (TEM35B manufactured by Toshiba Machine Co., Ltd.) to obtain pellets (K).
(Film Forming)

The pellets (K) were molded into a monolayer film (H) (thickness: 30 μm) by T-die molding using a hanger manifold T-die film melt extruding press machine (stationary type manufactured by GSI Creos Corp.) equipped with a screw having a screw diameter of 20 mm, a compression ratio of 2.5, and L/D=30 under the following conditions.
<Molding Conditions>
Die lip: 0.8 mm
Molten resin temperature: 250° C.
Width of T-die: 300 mm
Cooling roller: 125° C.
Casting roll: 135° C.
(Film Production Example 9)

The pellets (I) obtained in Pellet Production Example 9 were molded into a monolayer film (I) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.
<Molding Conditions>
Die lip: 0.8 mm
Molten resin temperature: 150° C.
Width of T-die: 300 mm
Cooling roller: 80° C.
Casting roll: 90° C.
(Film Production Example 10)

The pellets (J) obtained in Pellet Production Example 10 were molded into a monolayer film (J) (thickness: 30 μm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions. A high temperature was necessary for molding the pellets (J), and coloration due to resin burning was observed on the resulting monolayer film.
<Molding Conditions>
Die lip: 0.8 mm
Molten resin temperature: 310° C.
Width of T-die: 300 mm
Cooling roller: 220° C.
Casting roll: 230° C.

The weight average molecular weight, molecular weight distribution, melting point, and isomerization ratio of the monolayer films (A) to (J) obtained in Film Production Examples 1 to 10 are shown in Table 10.

TABLE 10

| Monolayer film | | Hydrogenated ring-open polymer | | | | | |
|---|---|---|---|---|---|---|---|
| | | No. | Composition | Mw | Mw/Mn | Hydrogenation rate (%) | Isomerization degree (%) | Melting point (° C.) |
| Film Production Example | 1 A | 1 | NB 100 | 82200 | 2.9 | 99.9 | 5 | 140 |
| | 2 B | 11 | NB/MNB = 98/2 | 100000 | 2.9 | 99.9 | 8 | 136 |
| | 3 C | 12 | NB/MNB = 96/4 | 80000 | 2.9 | 99.9 | 8 | 133 |
| | 4 D | 14 | NB/MNB = 91/9 | 98800 | 3.8 | 99.9 | 7 | 114 |
| | 5 F | 13 | NB/DCP = 99/1 | 160000 | 1.8 | 99.9 | 0 | 139 |
| | 6 E | 15 | NB/DCP = 96/4 | 81300 | 3.8 | 99.9 | 9 | 134 |
| | 7 G | 8 | NB 100 | 64200 | 1.3 | 99.75 | 0 | 143 |
| | 8 H | 9 | MTD/DCP = 80/20 | 55000 | 3.1 | 99.9 | — | — |
| | 9 I | 18 | NB/TCD = 89/11 | 315000 | 4.9 | 99.0 | 9 | 100 |
| | 10 J | 7 | DCP 100 | — | — | — | — | 273 |

Example 31

The monolayer film (A) was attached to one side of an ethylene-vinyl alcohol copolymer film with an ethylene content of 32% (Eval F manufactured by Kuraray Co., Ltd. thickness: 15 μm) via a urethane adhesive (Takenate/Takelac manufactured by Mitsui Takeda Chemical Co., Ltd.) at 70° C. to obtain a multilayer film (1) (total thickness: 50 μm). The steam barrier properties and oil resistance of the resulting multilayer film (1) were evaluated. The results are shown in Table 11.

The resulting multilayer film (1) was cut into 20 cm squares. Two sheets of the square cut film were layered with the ethylene-vinyl alcohol copolymer film layers being face to face, and three sides were heat-sealed with a hot melt adhesive (Aron Melt PPET manufactured by Toagosei Co., Ltd) at 190° C. and 0.2 MPa for two seconds using a heat-sealing tester (TP-701-B manufactured by Tester Industrial Co, Ltd.) to obtain a bag (1).

The bag (1) was filled with 70 ml of 5% brine and the open side was heat-sealed in the same manner as above to obtain a brine pack (1). The brine pack (1) had no defects such as breaking, cracks, inadequate sealing, and the like. Impact resistance of the brine pack (1) was evaluated. The results are shown in Table 11.

Example 32

A multilayer film (2), a bag (2), and a brine pack (2) were prepared in the same manner as in Example 31, except for using the monolayer film (B) instead of the monolayer film (A). The brine pack (2) had no defects such as breaking, cracks, inadequate sealing, and the like.

Steam barrier properties and oil resistance of the resulting multilayer film (2) and impact resistance of the brine pack (2) were evaluated. The results are shown in Table 11.

Example 33

A multilayer film (3), a bag (3), and a brine pack (3) were prepared in the same manner as in Example 31, except for using the monolayer film (C) instead of the monolayer film (A). The brine pack (3) had no defects such as breaking, cracks, inadequate sealing, and the like.

Steam barrier properties and oil resistance of the resulting multilayer film (3) and impact resistance of the brine pack (3) were evaluated. The results are shown in Table 11.

Example 34

A multilayer film (4), a bag (4), and a brine pack (4) were prepared in the same manner as in Example 31, except for using the monolayer film (D) instead of the monolayer film (A). The brine pack (4) had no defects such as breaking, cracks, inadequate sealing, and the like.

Steam barrier properties and oil resistance of the resulting multilayer film (4) and impact resistance of the brine pack (4) were evaluated. The results are shown in Table 11.

Example 35

A multilayer film (5), a bag (5), and a brine pack (5) were prepared in the same manner as in Example 35, except for using the monolayer film (E) instead of the monolayer film (A). The brine pack (5) had no defects such as breaking, cracks, inadequate sealing, and the like.

Steam barrier properties and oil resistance of the resulting multilayer film (5) and impact resistance of the brine pack (5) were evaluated. The results are shown in Table 11.

Example 36

A multilayer film (6), a bag (6), and a brine pack (6) were prepared in the same manner as in Example 31, except for using the monolayer film (F) instead of the monolayer film (A). The brine pack (6) had no defects such as breaking, cracks, inadequate sealing, and the like.

Steam barrier properties and oil resistance of the resulting multilayer film (6) and impact resistance of the brine pack (6) were evaluated. The results are shown in Table 11.

Example 37

The pellets (C) and a linear low density polyethylene (UMERIT 4040F manufactured by Ube Industries, Ltd.) were molded into a multilayer film (7), consisting of the pellet (C) and the linear low density polyethylene (thickness: pellet (C): 30 µm, linear low density polyethylene: 20 µm, total: 50 µm) by T-die molding using a hanger manifold T-die film melt extruding press machine (stationary type manufactured by GSI Creos Corp.) equipped with a screw having a screw diameter of 20 mm, a compression ratio of 3.1, and L/D=30 under the following conditions.
<Molding Conditions>
Die lip: 0.8 mm
(Pellet (C)) Molten resin temperature: 180° C.
(Linear low density polyethylene) Molten resin temperature: 180° C.
Width of T-die: 300 mm
Cooling roller: 110° C.
Casting roll: 120° C.

The steam barrier properties and oil resistance of the resulting multilayer film (7) were evaluated. The results are shown in Table 11.

The resulting multilayer film (7) was cut into 20 cm squares. Two sheets of the square cut film were layered with the linear low density polyethylene layers being face to face, and three sides were heat-sealed at 190° C. and 0.2 MPa for two seconds using a heat-sealing tester (TP-701-B manufactured by Tester Industrial Co, Ltd.) to obtain a bag (7).

The bag (7) was filled with 70 ml of 5% brine and the open side was heat-sealed in the same manner as above to obtain a brine pack (7). The brine pack (7) had no defects such as breaking, cracks, inadequate sealing, and the like. Impact resistance of the brine pack (7) was evaluated. The results are shown in Table 11.

Example 38

A biaxial stretched nylon film (Harden Film manufactured by Toyobo Co., Ltd. thickness: 15 µm) was attached to one side of the monolayer film (C) obtained above via a urethane adhesive (Takenate/Takelac manufactured by Mitsui Takeda Chemical Co., Ltd.) at 70° C. to obtain a multilayer film (8) (total thickness: 50 µm). The steam barrier properties and oil resistance of the resulting multilayer film (8) were evaluated. The results are shown in Table 11.

The resulting multilayer film (8) was cut into 20 cm squares. Two sheets of the square cut film were layered with the layers of pellets (C) being face to face, and three sides were heat-sealed at 190° C. and 0.2 MPa for two seconds using a heat-sealing tester (TP-701-B manufactured by Tester Industrial Co, Ltd.) to obtain a bag (8).

The bag (8) was filled with 70 ml of 5% brine and the open side was heat-sealed in the same manner as above to obtain a brine pack (8). The brine pack (8) had no defects such as breaking, cracks, inadequate sealing, and the like. Impact resistance of the brine pack (8) was evaluated. The results are shown in Table 11.

Example 39

A multilayer film (9), a bag (9), and a brine pack (9) were prepared in the same manner as in Example 38, except for using the monolayer film (G1) instead of the monolayer film (C). The brine pack (9) had no defects such as breaking, cracks, inadequate sealing, and the like.

Steam barrier properties and oil resistance of the resulting multilayer film (9) and impact resistance of the brine pack (9) were evaluated. The results are shown in Table 11.

Comparative Example 16

A multilayer film (10), a bag (10), and a brine pack (10) were prepared in the same manner as in Example 31, except for using the monolayer film (H) instead of the monolayer film (A). The brine pack (10) had no defects such as breaking, cracks, inadequate sealing, and the like.

Steam barrier properties and oil resistance of the resulting multilayer film (10) and impact resistance of the brine pack (10) were evaluated. The results are shown in Table 11.

Comparative Example 17

A multilayer film (11), a bag (11), and a brine pack (11) were prepared in the same manner as in Example 31, except for using the monolayer film (I) instead of the monolayer film (A). The brine pack (11) had no defects such as breaking, cracks, inadequate sealing, and the like.

Steam barrier properties and oil resistance of the resulting multilayer film (11) and impact resistance of the brine pack (12) were evaluated. The results are shown in Table 11.

Comparative Example 18

A multilayer film (12) was prepared in the same manner as in Example 31, except for using the monolayer film (J)

instead of the monolayer film (A). A bag (12) and a brine pack (12) were also obtained. The brine pack (12) had no defects such as breaking, cracks, inadequate sealing, and the like.

The steam barrier properties and oil resistance of the resulting multilayer film (12) were evaluated. The results are shown in Table 11.

Comparative Example 19

A bag (13) and a brine pack (13) were prepared in the same manner as in Example 31, except for using the monolayer film (G2) instead of the multilayer film (1). The brine pack (13) had no defects such as breaking, cracks, inadequate sealing, and the like.

Steam barrier properties and oil resistance of the resulting monolayer film (G2) and impact resistance of the brine pack (13) were evaluated. The results are shown in Table 11.

Symbols shown in Table 11 have the following meanings.
EV: Ethylene-vinyl alcohol copolymer film layer
AD: Urethane adhesive layer
A to F, G1, G2, and H to K: Hydrogenated norbornene ring-open polymer layer
LPE: Linear low density polyethylene layer
NY: Biaxial stretched nylon film layer

TABLE 11

|  |  | Film | Layer constitution | Steam barrier properties (g/(m² · 24 h)) | Brine bag | Impact resistance of brine bag | Oil resistance |
|---|---|---|---|---|---|---|---|
| Example | 31 | Multilayer film (1) | EV/AD/A | 1.7 | 1 | 11 | Whitened after 6 days |
|  | 32 | Multilayer film (2) | EV/AD/B | 1.8 | 2 | 4 | Whitened after 6 days |
|  | 33 | Multilayer film (3) | EV/AD/C | 1.8 | 3 | 1 | Whitened after 5 days |
|  | 34 | Multilayer film (4) | EV/AD/D | 2.5 | 4 | 0 | Whitened after 5 days |
|  | 35 | Multilayer film (5) | EV/AD/E | 1.7 | 5 | 6 | Whitened after 8 days |
|  | 36 | Multilayer film (6) | EV/AD/F | 2 | 6 | 2 | Whitened after 4 days |
|  | 37 | Multilayer film (7) | C/LPE | 1.9 | 7 | 1 | Whitened after 5 days |
|  | 38 | Multilayer film (8) | NY/AD/C | 2 | 8 | 0 | Whitened after 5 days |
|  | 39 | Multilayer film (9) | NY/AD/G1 | 1.7 | 9 | 10 | Whitened after 4 days |
| Comparative Example | 16 | Multilayer film (10) | EV/AD/H | 5 | 10 | 58 | Whitened within one hour |
|  | 17 | Multilayer film (11) | EV/AD/I | 4.1 | 11 | 46 | Whitened after 7 days |
|  | 18 | Multilayer film (12) | EV/AD/J | 3.3 | 12 | 72 | Whitened after 8 days |
|  | 19 | Monolayer film (G2) | G2 | 1.1 | 13 | 97 | Whitened after 4 days |

As shown in Table 11, the multilayer films (multilayer articles) of Examples 31 to 39 and the monolayer film of Comparative Example 19 showed excellent steam barrier properties. On the other hand, the multilayer films of Comparative Examples 16 to 18 exhibited poor steam barrier properties.

The multilayer films of Examples 31 to 39, the multilayer films of Comparative Examples 17 and 18, and the monolayer film of Comparative Example 19 exhibited excellent oil resistance. On the other hand, the multilayer film of Comparative Example 16 exhibited poor oil resistance.

Furthermore, the brine packs (packing material) of Examples 31 to 39 exhibited excellent impact resistance. On the other hand, the brine pack of Comparative Examples 16 to 19 exhibited poor impact resistance.

Example 40

The multilayer film (1) obtained above was cut into two A4 size sheets. Two sheets were layered with the ethylene-vinyl alcohol copolymer film layers being face to face, and the four sides were heat-sealed with a hot melt adhesive (Aron Melt PPET manufactured by Toagosei Co., Ltd) at 190° C. and 0.2 MPa for two seconds using a heat-sealing tester (TP-701-B manufactured by Tester Industrial Co, Ltd.) to obtain a bag. The bag was put into and left in boiling water for 30 minutes and a 15 cm square in the center was cut to obtain a boiled film (1).

Gas barrier properties of the multilayer film (1) and the boiled film (1) were evaluated. The results are shown in Table 12.

Example 41

A boiled film (2) was obtained in the same manner as in Example 40, except for using the multilayer film (3) instead of the multilayer film (1).

Gas barrier properties of the multilayer film (3) and the boiled film (2) were evaluated. The results are shown in Table 12.

Example 42

A boiled film (3) was obtained in the same manner as in Example 40, except for using the multilayer film (6) instead of the multilayer film (1).

Gas barrier properties of the multilayer film (6) and the boiled film (3) were evaluated. The results are shown in Table 12.

Comparative Example 20

A boiled film (4) was obtained in the same manner as in Example 40, except for using the multilayer film (10) instead of the multilayer film (1).

Gas barrier properties of the multilayer film (10) and the boiled film (4) were evaluated. The results are shown in Table 12.

Comparative Example 21

A boiled film (5) was obtained in the same manner as in Example 40, except for using the multilayer film (11) instead of the multilayer film (1).

Gas barrier properties of the multilayer film (11) and the boiled film (5) were evaluated. The results are shown in Table 12.

Comparative Example 22

A multilayer film (13) and a boiled film (6) were obtained in the same manner as in Example 40, except for using a biaxial stretched polypropyrene film (Pylene Film OT manufactured by Toyobo Co., Ltd. thickness: 30 μm) instead of the multilayer film (1).

Gas barrier properties of the resulting multilayer film (13) and the boiled film (6) were evaluated. The results are shown in Table 12.

TABLE 12

| | Multilayer film | Layer constitution | Gas barrier properties of multilayer film ($cm^{-3} \cdot m^{-2} \cdot day^{-1} \cdot atm^{-1}$) | Boiled film | Gas barrier properties of boiled film ($cm^{-3} \cdot m^{-2} \cdot day^{-1} \cdot atm^{-1}$) |
|---|---|---|---|---|---|
| Example | 40 | 1 | EV/AD/A | 0.32 | 1 | 0.39 |
| | 41 | 3 | EV/AD/C | 0.33 | 2 | 0.41 |
| | 42 | 6 | EV/AD/F | 0.35 | 3 | 0.42 |
| Comparative | 20 | 10 | EV/AD/H | 0.34 | 4 | 3.80 |
| Example | 21 | 11 | EV/AD/J | 0.34 | 5 | 3.10 |
| | 22 | 13 | EV/AD/PP | 0.32 | 6 | 7.00 |

As shown in Table 12, the multilayer films having a gas barrier resin layer of Examples 40 to 42 showed excellent gas barrier properties both before and after the boiling treatment. On the other hand, the multilayer films having a gas barrier resin layer of Comparative Examples 20 to 22 showed excellent gas barrier properties before the boiling treatment, but poor gas barrier properties after the boiling treatment.

Example 43

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (1) obtained in Example 1 and the mixture was kneaded using a twin-screw kneader (TEM35 manufactured by Toshiba Machine Co., Ltd.) to obtain a pelletized resin composition (A2).

(Fabrication of Blow-Molded Container)

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (A3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (A4) with dimensions of 50 mm×100 mm×1 mm was prepared from the blow-molded container (A3) by cutting the container barrel in the shape of a 50 mm×100 mm rectangle, of which the center was at 60 mm from the bottom. Steam barrier properties and haze of the resulting plate (A4) were measured. The results are shown in Table 13 and Table 14.

Example 44

0.1 part by weight of an antioxidant (tetrakis[methylene3-(3',5'-di-t-butyl-4'-hydroxyphenyl)propionate]methane (Irganox 1010 manufactured by Ciba Geigy)) was added to 100 parts by weight of the hydrogenated ring-open polymer (10) obtained in Example 10 and the mixture was kneaded using a twin-screw kneader (TEM35 manufactured by Toshiba Machine Co., Ltd.) to obtain a pelletized resin composition (B2).

(Fabrication of Blow-Molded Container)

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (B3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (B4) with dimensions of 50 mm×100 mm×1 mm was prepared from the blow-molded container (B3) by cutting the container barrel in the shape of a 50 mm×l 100 mm rectangle, of which the center was at 60 mm from the bottom. Steam barrier properties and haze of the resulting plate (B4) were measured. The results are shown in Table 13 and Table 14.

Example 45

0.1 part by weight of an antioxidant (tetrakis[methylene3-(3',5'-di-t-butyl-4'-hydroxyphenyl)propionate]methane (Irganox 1010 manufactured by Ciba Geigy)) was added to 100 parts by weight of the hydrogenated ring-open polymer (5) obtained in Example 5 and the mixture was kneaded using a twin-screw kneader (TEM35 manufactured by Toshiba Machine Co., Ltd.) to obtain a pelletized resin composition (C2).

(Fabrication of Blow-Molded Container)

The pellets were molded by injection molding using a stretching blow molding machine (manufactured by Nissei ASB Machine Co., Ltd.) at a cylinder temperature of 210° C. and an injection mold die temperature of 60° C., and blow molded at a heating pot temperature of 100° C., a blowing pressure of 1 MPa, and a blow die temperature of 60° C. to obtain a blow-molded container (C3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (C4) with dimensions of 50 mm×100 mm×1 mm was prepared from the blow-molded container (C3) by cutting the side of the container in the shape of a 50 mm×100 mm rectangle, of which the center was at 60 mm from the bottom. Steam barrier properties and haze of the resulting plate (C4) were measured. The results are shown in Table 13 and Table 14.

Example 46

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (8) obtained in Reference Example 1 and the mixture was kneaded using a twin-screw kneader (TEM35 manufactured by Toshiba Machine Co., Ltd.) to obtain a pelletized resin composition (D2).

(Fabrication of Blow-Molded Container)

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (D3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (D4) with dimensions of 50 mm×100 mm×1 mm was prepared from the blow-molded container (D3) by cutting the container barrel in the shape of a 50 mm×100 mm rectangle, of which the center was at 60 mm from the bottom. Steam barrier properties and haze of the resulting plate (D4) were measured. The results are shown in Table 13 and Table 14.

Example 47

0.1 part by weight of an antioxidant (tetrakis[methylene3-(3',5'-di-t-butyl-4'-hydroxyphenyl)propionate]methane (Irganox 1010 manufactured by Ciba Geigy)) was added to 100 parts by weight of the hydrogenated ring-open polymer (11) obtained in Example 6 and the mixture was kneaded using a twin-screw kneader (TEM35 manufactured by Toshiba Machine Co., Ltd.) to obtain a pelletized resin composition (E2).

(Fabrication of Blow-Molded Container)

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (E3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (E4) with dimensions of 50 mm×100 mm×1 mm was prepared from the blow-molded container (E3) by cutting the container barrel in the shape of a 50 mm×100 mm rectangle, of which the center was at 60 mm from the bottom. Steam barrier properties and haze of the resulting plate (E4) were measured. The results are shown in Table 13 and Table 14.

Example 48

(Fabrication of Blow-Molded Container)

The pellet-like resin composition (E2) obtained in Example 47 and polyethylene terephthalate (PET: Novapet manufactured by Mitsubishi Engineering-Plastics Corporation) were co-injected to obtain a multilayer preform having a PET/resin composition (E2) layer constitution. The multilayer preform was blow molded using a stretching blow molding machine (manufactured by Nissei ASB Machine Co., Ltd.) to obtain a blow-molded container (F3) having a layer constitution of outer layer/inner layer/outer layer=PET/resin composition (E2)/PET (outer layer/inner layer/outer layer=300 μm/600 μm/100 μm) and dimensions of 60 mm (depth)×60 mm (width)×180 mm (height). The injection temperature when preparing the preform was 290° C.

A plate (F4) with dimensions of 50 mm×100 mm×1 mm was prepared from the blow-molded container (F3) by cutting the side of the container in the shape of a 50 mm×100 mm rectangle, of which the center was at 60 mm from the bottom. Steam barrier properties and haze of the resulting plate (F4) were measured. The results are shown in Table 13 and Table 14.

Example 49

(Fabrication of Blow-Molded Container)

The pellet-like resin composition (E2) obtained in Example 5, an ethylene-vinyl alcohol copolymer with an ethylene content of 32% (EVOH: EVAL F manufactured by Kuraray Co., Ltd.), and, as an adhesive layer, a maleic acid-modified olefin polymer (Modic manufactured by Mitsubishi Chemical Corp.) were blow molded using a multilayer blow molding machine (manufactured by Tahara Machinery Ltd.) to obtain a stretched multilayer blow-molded container (G3) having a layer constitution of outermost layer/adhesive layer/gas barrier layer/adhesive layer/innermost layer=resin composition (E2)/adhesive/EVOH/adhesive/resin composition (E2) (outermost layer/adhesive layer/gas barrier layer/adhesive layer/innermost layer=500 μm/20 μm/60 μm/20 μm/400 μm) and dimensions of 60 mm (depth)×60 mm (width)×180 mm (height).

A plate (G4) with dimensions of 50 mm×100 mm×1 mm was prepared from the blow-molded container (G3) by cutting the container barrel in the shape of a 50 mm×100 mm rectangle, of which the center is at 60 mm from the bottom. Steam barrier properties and haze of the resulting plate (G4) were measured. The results are shown in Table 13 and Table 14.

Comparative Example 23

An autoclave equipped with a stirrer was charged with 33.4 parts by weight of a 70 wt % 2-norbornene solution in toluene, 2.86 parts by weight of dicyclopentadiene, 0.020 parts by weight of 1-hexene, and 49.3 parts by weight of cyclohexane, and the mixture was stirred. Then, a solution containing 0.023 parts by weight of bis(tricyclohexylphosphine)benzylidyneruthenium (IV) dichloride in 8.6 parts by weight of toluene was added, and the reaction was carried out at 60° C. for 30 minutes. The polymerization conversion rate was about 100%. The weight average molecular weight (Mw) of the resulting ring-open polymer (25) was 81,000, and the molecular weight distribution (Mw/Mn) was 3.6.

(Hydrogenation Reaction)

0.020 parts by weight of ethyl vinyl ether was added to the polymer solution obtained above and the mixture was stirred, followed by a hydrogenation reaction under hydrogen pressure of 1.0 MPa at 150° C. for 20 hours. After cooling to room temperature, a suspension of 0.5 parts by weight of activated carbon in 10 parts by weight of cyclohexane was added and the mixture was reacted under hydrogen pressure of 1.0 MPa at 150° C. for two hours. The reaction mixture was filtered through a filter with a pore diameter of 0.2 μm to remove activated carbon. The reaction solution was poured into a large amount of isopropanol to cause the polymer to completely precipitate. The precipitate was collected by filtration. After washing with acetone, the hydrogenated product was dried in a vacuum dryer at 100° C. under 0.13×10³ Pa for 48 hours to obtain a hydrogenated ring-open polymer (20).

(Properties of Polymer)

The degree of hydrogenation of the resulting hydrogenated ring-open polymer (20) was 99.9%, the weight average molecular weight (Mw) was 85,000, the molecular weight distribution (Mw/Mn) was 3.9, the isomerization ratio was 0%, and the melting point was 101° C.

(Preparation of Resin Composition)

0.1 part by weight of an antioxidant (tetrakis[methylene3-(3',5'-di-t-butyl-4'-hydroxyphenyl)propionate]methane (Irganox 1010 manufactured by Ciba Geigy)) was added to 100 parts by weight of the hydrogenated ring-open polymer (20) and the mixture was kneaded using a twin-screw kneader to obtain a pelletized resin composition (H2).

(Fabrication of Blow-Molded Container)

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (H3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (H4) with dimensions of 50 mm×100 mm×1 mm was prepared from the blow-molded container (H3) by cutting the container barrel in the shape of a 50 mm×100 mm rectangle, of which the center was at 60 mm from the bottom. Steam barrier properties and haze of the resulting plate (H4) were measured. The results are shown in Table 13 and Table 14.

Comparative Example 24

0.1 part by weight of an antioxidant (tetrakis[methylene-3-(3',5'-di-t-butyl-4'-hydroxyphenyl)propionate]methane (Irganox 1010 manufactured by Ciba Geigy)) was added to 100 parts by weight of the hydrogenated ring-open polymer (9) obtained in Comparative Example 3 and the mixture was kneaded using a twin-screw kneader (TEM35 manufactured by Toshiba Machine Co., Ltd.) to obtain a pelletized resin composition (12).

(Fabrication of Blow-Molded Container)

A preform was prepared from the above pellets using a stretching blow molding machine (manufactured by Nissei ASB Machine Co., Ltd.) by injection molding at a cylinder temperature of 300° C. and an injection mold die temperature of 120° C. Next, the preform was processed by blow molding at a preform heating pot temperature of 250° C., a blowing pressure of 0.5 MPa, and a blow die temperature of 120° C. to obtain a monolayer stretched blow-molded container (13) with a lengthwise stretching magnification y of 2.3 times, a horizontal stretching magnification x of 2.1 times, and dimensions of 60 mm (depth)×60 mm (width)×180 mm (height)×1 mm (thickness).

A plate (14) with dimensions of 50 mm×100 mm×1 mm was prepared from the blow-molded container (13) by cutting the side of the container in the shape of a 50 mm×100 mm rectangle, of which the center was at 60 mm from the bottom. Steam barrier properties and haze of the resulting plate (14) were measured. The results are shown in Table 13 and Table 14.

Comparative Example 25

0.1 part by weight of an antioxidant (tetrakis[methylene3-(3',5'-di-t-butyl-4'-hydroxyphenyl)propionate]methane (Irganox 1010 manufactured by Ciba Geigy)) was added to 100 parts by weight of the hydrogenated ring-open polymer (16) obtained in Comparative Example 5 and the mixture was kneaded using a twin-screw kneader (TEM35 manufactured by Toshiba Machine Co., Ltd.) to obtain a pelletized resin composition (J2).

A preform was prepared from the above pellets using a stretching blow molding machine (manufactured by Nissei ASB Machine Co., Ltd.) by injection molding at a cylinder temperature of 200° C. and an injection mold die temperature of 60° C. Next, the preform was processed by blow molding at a preform heating pot temperature of 100° C., a blowing pressure of 0.5 MPa, and a blow die temperature of 60° C. to obtain a monolayer stretched blow-molded container (J3) with a lengthwise stretching magnification y of 2.3 times, a horizontal stretching magnification x of 2.1 times, and dimensions of 60 mm (depth)×60 mm (width)×180 mm (height)×1 mm (thickness).

A plate (J4) with dimensions of 50 mm×100 mm×1 mm was prepared from the blow-molded container (J3) by cutting the container barrel in the shape of a 50 mm×100 mm rectangle, of which the center is at 60 mm from the bottom. Steam barrier properties and haze of the resulting plate (J4) were measured. The results are shown in Table 13 and Table 14.

TABLE 13

| | | Blow molded container code | | Hydrogenated ring-open polymer | | | | | | | Pellet code |
|---|---|---|---|---|---|---|---|---|---|---|---|
| | | | No. | Monomer (wt %) | Hydrogenation rate (%) | Mw | Mw/Mn | Isomerization rate (%) | Melting Point (° C.) | Code | |
| Example | 43 | A3 | 1 | 2-NB (100) | 99.9 | 82,200 | 2.9 | 5 | 140 | A1 | A2 |
| | 44 | B3 | 15 | 2-NB/DCP (96/4) | 99.9 | 81,300 | 3.8 | 9 | 134 | B1 | B2 |
| | 45 | C3 | 5 | 2-NB (100) | 99.9 | 185,000 | 4.4 | 10 | 136 | C1 | C2 |
| | 46 | D3 | 8 | 2-NB (100) | 99.75 | 64,200 | 1.3 | 0 | 143 | D1 | D2 |
| | 47 | E3 | 11 | 2-NB/MNB (98/2) | 99.9 | 100,000 | 2.9 | 8 | 136 | E1 | E2 |
| | 48 | F3 | 11 | 2-NB/MNB (98/2) | 99.9 | 100,000 | 2.9 | 8 | 136 | E1 | E2 |

TABLE 13-continued

|  | Blow molded container code | No. | Hydrogenated ring-open polymer ||||||| Code | Pellet code |
|  |  |  | Monomer (wt %) | Hydrogenation rate (%) | Mw | Mw/Mn | Isomerization rate (%) | Melting Point (° C.) |  |  |
| --- | --- | --- | --- | --- | --- | --- | --- | --- | --- | --- |
|  | 49 G3 | 11 | 2-NB/MNB (98/2) | 99.9 | 100,000 | 2.9 | 8 | 136 | E1 | E2 |
| Comparative Example | 23 H3 | 20 | 2-NB/DCP (89/11) | 99.9 | 85,000 | 3.9 | 0 | 101 | H1 | H2 |
|  | 24 I3 | 9 | DCP (100) | — | — | — | — | 273 | I1 | I2 |
|  | 25 J3 | 16 | MTD/DCP (80/20) | 99.9 | 55,000 | 2.9 | — | Tg = 140° C. | J1 | J2 |

TABLE 14

|  |  | Blow molded container |||||| 
|  | Layer constitution (thickness: μm) | Steam barrier properties (g/(m²·24 h)) | Falling strength* | Blow moldability standard deviation (σ) | Oil resistance | Haze (%) |
| --- | --- | --- | --- | --- | --- | --- |
| Example | 43 A2 (1000) | 0.023 | 28/30 | 0.05 mm | Not whitened | ≦20 |
|  | 44 B2 (1000) | 0.030 | 30/30 | 0.05 mm | Not whitened | ≦20 |
|  | 45 C2 (1000) | 0.031 | 30/30 | 0.15 mm | Very slightly whitened at the bottom | ≦20 |
|  | 46 D2 (1000) | 0.023 | 24/30 | 0.30 mm | Not whitened | ≦20 |
|  | 47 E2 (1000) | 0.023 | 30/30 | 0.05 mm | Not whitened | ≦20 |
|  | 48 PET/E2/PET (300/600/100) | 0.037 | 30/30 | 0.10 mm | Not whitened | ≦10 |
|  | 49 E2/AD/EVOH/AD/E2 (500/20/60/20/400) | 0.025 | 30/30 | 0.10 mm | Not whitened | ≦20 |
| Comparative Example | 23 H2 (1000) | 0.081 | 30/30 | 0.05 mm | Not whitened | ≦20 |
|  | 24 I2 (1000) | 0.050 | 18/30 | 0.25 mm | Not whitened | ≧50 |
|  | 25 J2 (1000) | 0.110 | 28/30 | 0.05 mm | Clouded | ≦5 |

*Falling strength: Number of no cracked or leaking containers out of 30 containers It can be seen from Tables 13 and 14 that the moisture permeability of the stretched blow molded containers of Examples 43 to 49 was 0.045 g/(m²·24 h) or less, indicating excellent steam barrier properties.

The moisture permeability of the stretched blow molded container of Comparative Example 26 was 0.050 g/(m²·24 h), indicating slightly poor steam barrier properties.

On the other hand, the moisture permeability of the stretched blow molded containers of Comparative Examples 23 and 25 was 0.080 g/(m²·24 h), indicating poor steam barrier properties.

No cracks or leaks were observed in the stretched blow molded containers of Examples 44, 45, and 47 to 49, and the stretched blow molded container of Comparative Example 23 in a test where 30 containers were caused to fall from a height of 1 m, indicating excellent falling strength.

On the other hand, the stretched blow molded container of Comparative Example 24 showed poor falling strength.

The stretched blow molded containers of Examples 43 to 45 and 47 to 49, and the stretched blow molded containers of Comparative Examples 23 and 25 exhibited excellent blow moldability.

The stretched blow molded containers of Examples 43, 44, and 46 to 49, and the stretched blow molded containers of Comparative Examples 23 and 24 exhibited remarkably excellent oil resistance. The stretched blow molded container of Comparative Example 25 showed poor oil resistance.

The stretched blow molded containers of Examples 43 to 49 had a haze value of 20% or less, indicating their excellent transparency. The stretched blow molded container of Example 48 particularly had a haze value of 10% or less, indicating very good transparency. The stretched blow molded container of Comparative Example 24 had a haze value of 50% or more, indicating poor transparency.

Based on the above results, the blow molded containers of Examples 43 to 49 can be regarded to be excellent in all performance, including steam barrier properties, mechanical properties, processability, oil resistance, and transparency demanded in recent years in the fields of information processing, food industries, medical supplies, engineering works, and the like.

Example 50

The Antioxidant A was added to and dissolved in a colorless transparent solution of a hydrogenated ring-open polymer (1) obtained in the same manner as in Example 1 in an amount of 0.1 part by weight per 100 parts by weight of the polymer solid component.

The solution was filtered through a metal fiber filter (pore diameter: 0.5 μm, manufactured by Nichidai Filter Corporation) and the filtrate was filtered through another filter Zeta Plus Filter 30S (pore diameter: 0.5 to 1 μm manufactured by Quno Corp.). The resulting filtrate was further filtered through still another metal fiber filter (pore diameter: 0.2 μm, manufactured by Nichidai Filter Corporation) to remove foreign matter. The finally obtained filtrate was heated to 200° C. using a preheater and continuously supplied to a thin film dryer under a pressure of 3 MPa (manufactured by Hitachi, Ltd.). The thin film dryer was operated under conditions of a pressure of 13.4 kPa or less and a temperature of the concentrated polymer solution in the drier of 240° C. (first drying step).

Next, the concentrated solution was continuously removed from the thin film drier and supplied to another thin film drier of the same type under a pressure of 1.5 MPa while maintaining the temperature at 240° C. This dryer was operated under the conditions of a pressure of 0.7 kPa and a temperature of 240° C. (second drying step).

The polymer was continuously removed from the thin film drier in a melted state, extruded from a mold die in a class 100 clean room, cooled with water, and cut using a pelletizer (OSP-2 manufactured by Osada Seisakusho Co., Ltd.) to obtain pellets of a molding material (A).

The amount of organic substances released from the molding material (A) and the transition metal content of the molding material (A) were measured. The results are shown in Table 15.

(Preparation of Wafer Carrier)

The molding material (A) was injected using an injection molding machine (manufactured by Fanuc, Ltd.) under the conditions of a cylinder temperature of 240° C., a die temperature of 120° C., an injection speed of 50 cm$^3$/s, an injection pressure of $1.47 \times 10^8$ Pa, a support pressure of $9.8 \times 10^7$ Pa, and a back pressure of $6.9 \times 10^6$ Pa to obtain an 8 inch wafer carrier (A) shown in FIG. 1.

The amount of increased foreign matter and heat resistance of the resulting wafer carrier (A) were evaluated. The results are shown in Table 15.

Example 51

A solution containing a hydrogenated ring-open polymer (15) obtained in the same manner as in Example 10 was prepared. A molding material (B) was obtained in the same manner as in Example 50 using the solution of the hydrogenated ring-open polymer (15).

The amount of organic substances released from the molding material (B) and the transition metal content of the molding material (B) were measured. The results are shown in Table 15.

(Preparation of Wafer Carrier)

A wafer carrier (B) was prepared in the same manner as in Example 50, except for using the molding material (B) instead of the molding material (A). The amount of increased foreign matter and heat resistance of the resulting wafer carrier (B) were evaluated. The results are shown in Table 15.

Example 52

A solution containing a hydrogenated ring-open polymer (11) obtained in the same manner as in Example 6 was prepared. A molding material (C) was obtained in the same manner as in Example 50 using the solution of the hydrogenated ring-open polymer (11).

The amount of organic substances released from the molding material (C) and the transition metal content of the molding material (C) were measured. The results are shown in Table 15.

(Preparation of Wafer Carrier)

A wafer carrier (C) was prepared in the same manner as in Example 50, except for using the molding material (C) instead of the molding material (A).

The amount of increased foreign matter and heat resistance of the resulting wafer carrier (C) were evaluated. The results are shown in Table 15.

Comparative Example 26

The Antioxidant A was added to a solution of a hydrogenated ring-open polymer (20) obtained in the same manner as in Comparative Example 23 in an amount of 0.5 parts by weight per 100 parts by weight of the polymer. A molding material (D) was obtained in the same manner as in Example 50.

The amount of organic substances released from the resin composition (D) and the transition metal content of the resin composition (D) were measured. The results are shown in Table 15.

(Preparation of Wafer Carrier)

A wafer carrier (D) was prepared in the same manner as in Example 50, except that the molding material (D) was used instead of the molding material (A) and the cylinder temperature and the die temperature were respectively 210° C. and 80° C. The amount of increased foreign matter and heat resistance of the resulting wafer carrier (D) were evaluated. The results are shown in Table 15.

Comparative Example 27

(Ring-Opening Copolymerization and Hydrogenation Reaction)

Polymerization and hydrogenation reactions were carried out in the same manner as in Comparative Example 23, except that 6-methyl-1,4:5,8-dimethano-1,4,4a,5,6,7,8,8a-octahydronaphthalene (hereinafter referred to from time to time as "MDO") was used instead of 2-norbornene, and the amount of 1-hexene used was 0.40 parts by weight, and a hydrogenated ring-open polymer (21) was obtained.

(Properties of Polymer)

The degree of hydrogenation of the resulting hydrogenated ring-open polymer (21) was 99.9%, the weight average molecular weight (Mw) was 70,000, the molecular weight distribution (Mw/Mn) was 2.5, the glass transition temperature was 140° C., and a melting point was not observed.

(Preparation of Resin Composition)

A molding material (E) was obtained in the same manner as in Example 50 using the solution of the hydrogenated ring-open polymer (21), except that the thin film drier was operated at 260° C. in the first drying step and at 270° C. in the second drying step.

The amount of organic substances released from the molding material (E) and the transition metal content of the molding material (E) were measured. The results are shown in Table 15.

(Preparation of Wafer Carrier)

A wafer carrier (E) was prepared in the same manner as in Example 50, except that the molding material (E) was used instead of the molding material (A) and the cylinder temperature and the die temperature were respectively 300° C. and 130° C.

The amount of increased foreign matter and heat resistance of the resulting wafer carrier (E) were evaluated. The results are shown in Table 15.

TABLE 15

| | | | Hydrogenated ring-open polymer | | | | | | | | | |
|---|---|---|---|---|---|---|---|---|---|---|---|---|
| | | Molding material | Monomer (wt %) | No. | Mw | Mw/Mn | Melting point (° C.) | Isomerization rate (%) | Organic substances (ppb) | Transition metal (ppm) | Wafer carrier | Heat resistance | Foreign matter increase* |
| Example | 50 | A | 2-NB (100) | 1 | 82,200 | 2.9 | 140 | 5 | 6 | <1 | A | Good | 220 |
| | 51 | B | 2-NB/DCPD (96/4) | 15 | 81,300 | 3.8 | 134 | 9 | 8 | <1 | B | Good | 210 |
| | 52 | C | 2-NB/MNB (98/2) | 11 | 100,000 | 2.9 | 136 | 8 | 6 | <1 | C | Good | 180 |
| Comparative Example | 26 | D | 2-NB/DCPD (89/11) | 20 | 85,000 | 3.9 | 101 | 0 | 60 | <1 | D | Bad | 250 |
| | 27 | E | MDO (100) | 21 | 70,000 | 2.5 | 140 | — | 35 | <1 | E | Good | 1800 |

*Number of foreign matter particles

As can be seen from Table 15, the wafer carriers of Examples 50 to 52 exhibited excellent heat resistance and the amounts of discharged organic substances and increased foreign matter were smaller than the corresponding amounts of the wafer carriers of Comparative Examples 26 and 27. On the other hand, the wafer carrier of Comparative Example 26 exhibited poor heat resistance and the wafer carrier of Comparative Example 27 exhibited a particularly large increase in the amount of foreign matter.

Industrial Applicability

The hydrogenated ring-open polymer and the resin composition of the present invention are useful as a resin material for molding which is excellent in all performance, including steam barrier properties, heat resistance, oil resistance, mechanical properties, transparency and processability demanded in recent years in the fields of information processing, food industries, medical supplies, engineering works, and the like.

Since the molded article of the present invention has excellent heat resistance, discharges only a small amount of organic substances, and generates only a small amount of foreign matter, the molded article can be suitably used as a material for fabricating electron processing instruments.

The resin film and sheet of the present invention are useful as a film or a sheet used in the fields of information processing, food industries, medical supplies, engineering works, and the like, since the resin film and sheet exhibit excellent performance, including steam barrier properties, heat resistance, oil resistance, mechanical properties, transparency, and processability.

The multilayer laminate of the present invention is useful as a wrapping material for toys, household goods, and the like, in addition to packing material in the fields of foods, medical supplies, displays, energy, and other industrial fields. A packing material with a desired shape and size can be prepared by secondary fabrication of the multilayer laminate of the present invention.

Due to the possession of excellent steam barrier properties and impact resistance, the packing material of the present invention is useful as a medical supply container and the like such as an infusion solution bag, a PTP (press through package), a syringe and the like.

The blister molded article of the present invention is useful as a container, a blister pack, or the like for medical supplies such as a press through package (PTP), a syringe, and the like; foods; precision components such as electric and electronic parts, semiconductor parts, and printed circuit boards; solar energy power generation system components; fuel cell components; alcohol-containing fuel system components; and the like.

Due to the possession of those various characteristics, the blow molded container of the present invention can be suitably used as various containers demanded in recent years in the fields of food industries, medical supplies, engineering works, and the like.

The invention claimed is:

1. A hydrogenated norbornene ring-open polymer obtained by hydrogenating 80% or more of carbon-carbon double bonds of a ring-open polymer which is obtained by ring-opening copolymerization of 2-norbornene and a substituent-containing norbornene monomer, the proportion of a repeating unit (A) derived from the 2-norbornene with respect to all repeating units being 90 to 99 wt % and the proportion of a repeating unit (B) derived from the substituent-containing norbornene monomer with respect to all repeating units being 1 to 10 wt %, and the hydrogenated norbornene ring-open polymer having a melting point of 110 to 145° C.

2. The hydrogenated norbornene ring-open polymer according to claim 1, having a weight average molecular weight (Mw) determined by gel permeation chromatography (GPC) of 50,000 to 200,000.

3. The hydrogenated norbornene ring-open polymer according to claim 1, having a ratio (Mw/Mn) of the weight average molecular weight (Mw) to the number average molecular weight (Mn) of 1.5 to 10.0.

4. A resin composition comprising the hydrogenated norbornene ring-open polymer according to claim 1.

5. The resin composition according to claim 4, further comprising 0.01 to 1 part by weight of an antioxidant per 100 parts by weight of the hydrogenated norbornene ring-open polymer.

6. A resin film or sheet obtained by molding the hydrogenated norbornene ring-open polymer according to claim 1.

7. A resin film or sheet obtained by molding the resin composition according to claim 4.

8. A molding material comprising the hydrogenated norbornene ring-open polymer of claim 1.

9. The molding material according to claim 8, wherein the content of transition metals is not more than 1 ppm.

10. A molded article obtained by molding the molding material according to claim 8.

11. A multilayer laminate comprising two or more resin layers of which at least one layer is a layer of a hydrogenated norbornene ring-open polymer according to claim 1.

12. The multilayer laminate according to claim 11, wherein at least one layer is a layer containing a gas barrier resin.

13. A packing material fabricated from the multilayer laminate according to claim 11.

14. A medical supply packing material having at least one resin layer which is a layer of the hydrogenated norbornene ring-open polymer according to claim 1.

15. The medical supply packing material according to claim 14, further comprising at least one polyolefin resin layer.

16. A blister molding sheet having at least one resin layer which is a layer of the hydrogenated norbornene ring-open polymer according to claim 1.

17. The blister molding sheet according to claim 16, which is a multilayer laminate comprising at least one polyolefin resin layer.

18. The blister molding sheet according to claim 17, wherein the polyolefin resin is a polypropylene resin.

19. A blister molded article obtained by molding the blister molding sheet according to claim 16.

20. A blow-molded container having at least one resin layer which is a layer of the hydrogenated norbornene ring-open polymer according to claim 1.

* * * * *